United States Patent
Suzuki et al.

(10) Patent No.: US 12,419,331 B2
(45) Date of Patent: Sep. 23, 2025

(54) SOLID PASTE COMPOSITION FOR COOKING AND METHOD FOR PRODUCING SAME

(71) Applicant: MIZKAN HOLDINGS CO., LTD., Aichi (JP)

(72) Inventors: Makoto Suzuki, Aichi (JP); Kiyoshi Endo, Aichi (JP); Yusuke Tange, Aichi (JP); Naruhiro Hibi, Aichi (JP); Takuya Nakayama, Aichi (JP); Yasushi Ogasawara, Aichi (JP); Yukiko Kawamura, Aichi (JP); Junichiro Ihara, Aichi (JP)

(73) Assignee: MIZKAN HOLDINGS CO., LTD., Aichi (JP)

( * ) Notice: Subject to any disclaimer, the term of this patent is extended or adjusted under 35 U.S.C. 154(b) by 615 days.

(21) Appl. No.: 17/682,725

(22) Filed: Feb. 28, 2022

(65) Prior Publication Data
US 2022/0174998 A1 Jun. 9, 2022

Related U.S. Application Data

(63) Continuation of application No. PCT/JP2020/031309, filed on Aug. 19, 2020.

(30) Foreign Application Priority Data

Aug. 30, 2019 (JP) .................................. 2019-158330
Mar. 18, 2020 (WO) .................. PCT/JP2020/012135

(51) Int. Cl.
*A23L 11/00* (2025.01)
*A23L 7/109* (2016.01)
*A23P 30/20* (2016.01)

(52) U.S. Cl.
CPC ............... *A23L 7/109* (2016.08); *A23L 11/05* (2016.08); *A23P 30/20* (2016.08)

(58) Field of Classification Search
CPC . A23L 19/09; A23L 7/10; A23L 7/109; A23L 5/10; A23L 5/40; A23L 5/00;
(Continued)

(56) References Cited

U.S. PATENT DOCUMENTS 4,540,592 A * 9/1985 Myer ...................... A23P 30/20
426/558
4,985,269 A * 1/1991 Irvin ........................ A23L 7/13
426/560

(Continued)

FOREIGN PATENT DOCUMENTS

CN 107927587 A 4/2018
CN 108041459 A 5/2018
(Continued)

OTHER PUBLICATIONS

Shereen Lehman, https://www.verywellfit.com/what-is-garbanzo-bean-flour-4151184 (Year: 2019).*
(Continued)

*Primary Examiner* — Drew E Becker
(74) *Attorney, Agent, or Firm* — Osha Bergman Watanabe & Burton LLP

(57) ABSTRACT

A solid paste composition for cooking, which has elasticity, suppresses a rubber-like texture, and has a good chewy texture. The solid paste composition satisfies containing 2.0 mass % or more of an insoluble dietary fiber in terms of dry mass, 15 mass % or more of a starch in terms of dry mass, and 5.5 mass % or more of a protein in terms of dry mass. The solid paste composition further satisfies at least either of the ratio of the number of CBB-stained sites having an area of at least 200 μm² and a roundness coefficient of at least 0.3, (Continued)

to the number of CBB-stained sites being 3% or more, and the ratio of the total area of CBB-stained sites having an area of at least 200 μm$^2$ and a roundness coefficient of at least 0.3, to the image area of a cross-section of the composition being 0.3% or more.

17 Claims, 28 Drawing Sheets

(58) Field of Classification Search
CPC ... A23L 11/05; A21D 6/001; A23V 2200/044; A23V 2250/5118; A23V 2300/31; A23V 2300/48; A23P 30/20
See application file for complete search history.

(56) References Cited

U.S. PATENT DOCUMENTS

| | | | | |
|---|---|---|---|---|
| 5,429,835 A * | 7/1995 | Wenger | ............... | A23L 7/111 |
| | | | | 426/559 |
| 5,989,620 A * | 11/1999 | Wang | ............... | A23L 7/109 |
| | | | | 426/443 |
| 6,010,732 A * | 1/2000 | van Lengerich | ........ | A23P 30/34 |
| | | | | 426/621 |
| 12,256,769 B2 * | 3/2025 | Kittleson | ............... | A23P 30/20 |
| 2005/0064079 A1 * | 3/2005 | Allen | ............... | A23K 50/42 |
| | | | | 426/549 |
| 2006/0275536 A1 * | 12/2006 | Reid | ............... | A23L 7/115 |
| | | | | 426/549 |
| 2007/0092621 A1 * | 4/2007 | Sohn | ............... | A23P 30/20 |
| | | | | 426/557 |
| 2008/0241332 A1 * | 10/2008 | Anand | ............... | A23P 30/20 |
| | | | | 426/455 |
| 2012/0164297 A1 | 6/2012 | Anfinsen et al. | | |
| 2013/0022732 A1 * | 1/2013 | Khan | ............... | A23L 19/01 |
| | | | | 426/446 |
| 2014/0010916 A1 * | 1/2014 | Pibarot | ............... | A23K 40/20 |
| | | | | 426/574 |
| 2018/0360079 A1 * | 12/2018 | Al-Katib | ............... | A23P 30/20 |
| 2018/0360085 A1 * | 12/2018 | Wang | ............... | A23L 25/30 |
| 2019/0373929 A1 | 12/2019 | Higuchi et al. | | |
| 2019/0373942 A1 | 12/2019 | Higuchi et al. | | |
| 2019/0387774 A1 * | 12/2019 | Kittleson | ............... | A23L 3/02 |
| 2021/0169108 A1 * | 6/2021 | Suzuki | ............... | A23P 10/22 |
| 2022/0174998 A1 * | 6/2022 | Suzuki | ............... | A23L 19/09 |
| 2022/0264917 A1 * | 8/2022 | Hibi | ............... | A23L 5/13 |
| 2023/0180815 A1 * | 6/2023 | Suzuki | ............... | A23L 29/212 |
| | | | | 426/46 |
| 2024/0016197 A1 * | 1/2024 | Tange | ............... | A23L 7/198 |

FOREIGN PATENT DOCUMENTS

| | | |
|---|---|---|
| CN | 108244501 A | 7/2018 |
| JP | 2007508822 A | 4/2007 |
| JP | 2017055672 A | 3/2017 |
| WO | 2019069490 A1 | 4/2019 |
| WO | 2019138596 A1 | 7/2019 |

OTHER PUBLICATIONS

Office Action issued in counterpart Chinese Patent Application No. CN 202080060406.2 issued Jun. 17, 2022 (16 pages).
N. Wang et al., "Pasta-Like Product from Pea Flour by Twin-Screw Extrusion," Journal of Food Science, vol. 64, No. 4, pp. 671-678, 1999 (8 pages).
Kagawa, Standard Tables of Food Composition in Japan, 7th Revision, 2016 (26 pages).
International Search Report issued in corresponding Japanese Application No. PCT/JP2020/031309; mailed Oct. 27, 2020 (3 pages).
Written Opinion of the International Searching Authority issued in corresponding Japanese Application No. PCT/JP2020/031309; dated Oct. 27, 2020 (5 pages).

* cited by examiner

FIG. 1A

Table 1

| | | Raw Material | | Measurements for Paste Dough Composition | | | | | | | Dry Mass Basis Moisture Content |
|---|---|---|---|---|---|---|---|---|---|---|---|
| | | | | Starch | | Protein | | | Insoluble Dietary Fiber | | |
| | | Raw Material(s) Used | D₅₀ after Amylase/Protease and Ultrasonic Treatment (μm) | Average Longest Diameter of CFW-Stained Sites after Amylase/Protease Treatment (μm) | Origin (Main Raw Material) | Mass % (Wet Mass Basis) | Origin (Main Raw Material) | Mass % (Wet Mass Basis) | Origin (Main Raw Material) | Mass % (Wet Mass Basis) | Mass % |
| Test Example | 1 | Dried Yellow Pea Starch + Dried Yellow Pea Protein | 11 | 32 | Yellow Pea | 51.7 | Yellow Pea | 5.5 | Yellow Pea | 3.4 | 50 |
| Test Example | 2 | Dried Yellow Pea Starch + Dried Yellow Pea Protein | 35 | 84 | Yellow Pea | 38.5 | Yellow Pea | 4.1 | Yellow Pea | 2.6 | 100 |
| Test Example | 3 | Dried Yellow Pea Starch + Dried Yellow Pea Protein | 25 | 56 | Yellow Pea | 51.7 | Yellow Pea | 5.5 | Yellow Pea | 3.4 | 50 |
| Test Example | 4 | Dried Yellow Pea Starch + Purified Dried Yellow Pea Protein | 61 | 126 | Yellow Pea | 43.3 | Yellow Pea | 13.4 | Yellow Pea | 8.3 | 30 |
| Test Example | 5 | Dried Yellow Pea Starch + Pea Protein | 168 | 322 | Yellow Pea | 35.7 | Yellow Pea | 21.4 | Yellow Pea | 4.6 | 50 |
| Test Example | 6 | Dried Yellow Pea Starch + Dried Yellow Pea Protein | 185 | 423 | Yellow Pea | 13.9 | Pea | 48.6 | Yellow Pea | 4.2 | 50 |
| Test Example | 7 | Dried Yellow Pea Starch + Dried Yellow Pea Protein | 68 | 150 | Yellow Pea | 10.8 | Pea | 59.0 | Yellow Pea | 4.2 | 50 |
| Test Example | 8 | Dried Yellow Pea Flour (d90 < 250μm, Pin Mill) + Dried Yellow Pea Protein | 195 | 262 | Yellow Pea | 20.8 | Yellow Pea, Pea | 34.7 | Yellow Pea | 4.2 | 50 |
| Test Example | 9 | Dried Yellow Pea Flour (d90 < 250μm, Pin Mill) + Dried Yellow Pea Protein | 219 | 368 | Yellow Pea | 17.4 | Yellow Pea, Pea | 41.7 | Yellow Pea | 4.2 | 50 |
| Test Example | 10 | Dried Yellow Pea Starch + Soybean Protein | 65 | 121 | Yellow Pea | 35.7 | Soybean | 17.9 | Yellow Pea, Soybean | 3.6 | 50 |
| Test Example | 11 | Dried Yellow Pea Starch + Pumpkin Seed Protein | 416 | n.a. | Yellow Pea | 35.7 | Pumpkin Seed | 12.9 | Yellow Pea, Pumpkin Seed | 21.8 | 50 |
| Test Example | 12 | Dried Yellow Pea Starch + Hemp Seed Protein | 360 | n.a. | Yellow Pea | 39.3 | Hemp Seed | 14.3 | Yellow Pea, Hemp Seed | 27.9 | 50 |
| Test Example | 13 | Mung Bean Starch + Dried Yellow Pea Protein | 84 | 261 | Mung Bean | 52.0 | Yellow Pea | 11.2 | Mung Bean, Yellow Pea | 4.0 | 30 |
| Test Example | 14 | Mung Bean Starch + Pea Protein | 198 | 326 | Mung Bean | 34.7 | Pea | 13.9 | Pea | 4.2 | 50 |
| Test Example | 15 | Mung Bean Starch + Purified Soybean Protein | 165 | 268 | Mung Bean | 38.2 | Soybean | 15.6 | Mung Bean | 4.2 | 50 |
| Test Example | 16 | Mung Bean Starch + Purified Soybean Protein | 166 | 351 | Mung Bean | 56.0 | Soybean | 8.0 | Mung Bean | 4.0 | 30 |
| Test Example | 17 | Mung Bean Starch + Hemp Protein | 166 | 230 | Mung Bean | 38.2 | Hemp Seed | 10.4 | Mung Bean, Hemp Seed | 4.2 | 50 |
| Test Example | 18 | Mung Bean Starch + Purified Wheat Protein | 166 | 169 | Mung Bean | 38.2 | Wheat | 13.5 | Mung Bean | 4.2 | 50 |

FIG. 1B

Table 1

| | Raw Material | | | Measurements for Paste Dough Composition | | | | | | | Dry Mass Basis Moisture Content |
|---|---|---|---|---|---|---|---|---|---|---|---|
| | | | | Starch | | Protein | | | Insoluble Dietary Fiber | | |
| | Raw Material(s) Used | $D_{50}$ after Amylase/Protease and Ultrasonic Treatment (μm) | Average Longest Diameter of CFW-Stained Sites after Amylase/Protease Treatment (μm) | Origin (Main Raw Material) | Mass % (Wet Mass Basis) | Origin (Main Raw Material) | Mass % (Wet Mass Basis) | Origin (Main Raw Material) | Mass % (Wet Mass Basis) | Mass % |
| Test Example 19 | Potato Starch + Pea Protein | 300 | 430 | Potato | 35.7 | Yellow Pea | 21.4 | Potato | 1.6 | 50 |
| Test Example 20 | Potato Starch + Purified Soybean Protein | 326 | 368 | Potato | 38.2 | Soybean | 17.4 | Soybean | 4.2 | 50 |
| Test Example 21 | Potato Starch + Dried Yellow Pea Protein | 336 | 433 | Mung Bean | 64.0 | Yellow Pea | 4.8 | Yellow Pea | 4.0 | 30 |
| Test Example 22 | Potato Starch + Hemp Seed Protein | 428 | 536 | Potato | 60.0 | Hemp Seed | 4.4 | Hemp Seed | 4.0 | 30 |
| Test Example 23 | Wheat Starch + Dried Yellow Pea Protein | 16 | 31 | Wheat | 64.0 | Yellow Pea | 5.4 | Yellow Pea | 4.0 | 30 |
| Test Example 24 | Wheat Starch + Pumpkin Seed Protein | 280 | 369 | Wheat | 56.0 | Pumpkin Seed | 5.3 | Pumpkin Seed | 4.0 | 30 |
| Test Example 25 | Wheat Starch + Purified Pea Protein | 350 | 450 | Wheat | 32.1 | Pea | 21.4 | Pea | 1.4 | 50 |
| Test Example 26 | Wheat Starch + Purified Soybean Protein | 350 | 490 | Wheat | 38.2 | Soybean | 15.1 | Soybean | 4.2 | 50 |
| Test Example 27 | Wheat Starch + Hemp Protein | 450 | 560 | Wheat | 39.3 | Hemp Seed | 10.7 | Hemp Seed | 3.6 | 50 |
| Test Example 28 | Corn Starch + Pea Protein | 25 | 51 | Corn | 64.0 | Pea | 5.3 | Corn, Pea | 4.0 | 30 |
| Test Example 29 | Corn Starch + Wheat Protein | 23 | 32 | Corn | 56.0 | Wheat | 7.5 | Corn, Wheat | 4.0 | 30 |
| Test Example 30 | Dried Lentil Flour (d90 < 500μm, Stone Mill) | 440 | 498 | Lentil | 29.0 | Lentil | 18.5 | Lentil | 2.5 | 50 |
| Test Example 31 | Dried Black Kidney Bean Flour (d90 < 400μm, Stone Mill) | 369 | 489 | Black Kidney Bean | 15.9 | Black Kidney Bean | 31.4 | Black Kidney Bean | 13.8 | 50 |
| Test Example 32 | Dried Chickpea Flour (d90 < 200μm, Pin Mill) | 145 | 262 | Chickpea | 35.5 | Chickpea | 11.0 | Chickpea | 16.1 | 60 |
| Test Example 33 | Dried Mung Bean Flour (d90 < 150μm, Airflow Mill) | 103 | 165 | Mung Bean | 27.5 | Mung Bean | 17.3 | Mung Bean | 9.7 | 50 |
| Test Example 34 | Dried White Pea Flour (d90 < 250μm, Pin Mill) | 156 | 321 | White Pea | 37.9 | White Pea | 15.0 | White Pea | 11.2 | 50 |
| Test Example 35 | Semi-Hard Wheat Flour + Dried Yellow Pea Flour (d90 < 250μm, Pin Mill) | 156 | 256 | Wheat, Yellow Pea | 42.2 | Wheat, Yellow Pea | 12.2 | Wheat, Yellow Pea | 3.2 | 50 |
| Test Example 36 | Dried Yellow Pea Flour (d90 < 50μm, Pin Mill) | 35 | 65 | Yellow Pea | 32.4 | Yellow Pea | 11.4 | Yellow Pea | 3.2 | 60 |

FIG. 1C

Table 1

| | | Raw Material | | Measurements for Paste Dough Composition | | | | | | | Dry Mass Basis Moisture Content |
|---|---|---|---|---|---|---|---|---|---|---|---|
| | | | | Starch | | | Protein | | Insoluble Dietary Fiber | | |
| | | Raw Material(s) Used | D₆₀ after Amylase/Protease and Ultrasonic Treatment (μm) | Average Longest Diameter of CFW-Stained Sites after Amylase/Protease Treatment (μm) | Origin (Main Raw Material) | Mass % (Wet Mass Basis) | Origin (Main Raw Material) | Mass % (Wet Mass Basis) | Origin (Main Raw Material) | Mass % (Wet Mass Basis) | Mass % |
| Test Example | 37 | Dried Yellow Pea Flour (d90 < 250μm, Airflow) -> Treated at Dry Mass Basis Moisture Content 50%, Highest Temperature 120°C, SME 900 kJ/kg, then Cut into 1cm³ Chips -> Dried until Dry Mass Basis Moisture Content Reached 10%, then Re-Crushed (d90 < 50μm, Pin Mill) | 132 | 145 | Yellow Pea | 35.2 | Yellow Pea | 13.8 | Yellow Pea | 5.6 | 50 |
| Test Example | 38 | Dried Yellow Pea Crushed at Dry Mass Basis Moisture Content 5%, Highest Temperature 80°C (d90 < 250μm, Stone Mill) | 161 | 232 | Yellow Pea | 35.2 | Yellow Pea | 13.8 | Yellow Pea | 5.6 | 50 |
| Test Example | 39 | Dried Yellow Pea Flour (d90 < 250μm, Pin Mill) | 100 | 166 | Yellow Pea | 50.2 | Yellow Pea | 17.7 | Yellow Pea | 7.5 | 50 |
| Test Example | 40 | Dried Yellow Pea Flour (d90 < 250μm, Pin Mill) | 146 | 262 | Yellow Pea | 34.6 | Yellow Pea | 12.2 | Yellow Pea | 5.2 | 50 |
| Test Example | 41 | Dried Yellow Pea Flour (d90 < 50μm, Jet Mill) | 15 | 22 | Yellow Pea | 44.0 | Yellow Pea | 13.6 | Yellow Pea | 20.0 | 30 |
| Test Example | 42 | Dried Yellow Pea Flour (d90 < 250μm, Pin Mill) | 136 | 213 | Yellow Pea | 31.4 | Yellow Pea | 9.7 | Yellow Pea | 14.3 | 80 |
| Test Example | 43 | Dried Yellow Pea Flour (d90 < 250μm, Pin Mill) | 123 | 143 | Yellow Pea | 35.5 | Yellow Pea | 11.0 | Yellow Pea | 16.1 | 60 |
| Test Example | 44 | Dried Yellow Pea Flour (with Seed Skins) (d90 < 250μm, Pin Mill) | 150 | 166 | Yellow Pea | 35.5 | Yellow Pea | 11.0 | Yellow Pea | 16.1 | 60 |
| Test Example | 45 | Dried Yellow Pea Flour (d90 < 50μm, Pin Mill) | 30 | 45 | Yellow Pea | 32.4 | Yellow Pea | 11.4 | Yellow Pea | 3.2 | 60 |
| Test Example | 46 | Dried Yellow Pea Flour (d90 < 50μm, Pin Mill) | 30 | 55 | Yellow Pea | 32.4 | Yellow Pea | 11.4 | Yellow Pea | 3.2 | 60 |
| Test Example | 47 | Dried Yellow Pea Flour (with Seed Skins) (d90 < 50μm, Pin Mill) | 35 | 46 | Yellow Pea | 34.6 | Yellow Pea | 16.1 | Yellow Pea | 5.2 | 50 |
| Test Example | 48 | Dried Yellow Pea Flour (with Seed Skins) (d90 < 250μm, Pin Mill) | 210 | 365 | Yellow Pea | 32.4 | Yellow Pea | 11.4 | Yellow Pea | 3.2 | 60 |
| Test Example | 49 | Dried Yellow Pea Flour (d90 < 50μm, Pin Mill) | 24 | 32 | Yellow Pea | 32.4 | Yellow Pea | 11.4 | Yellow Pea | 3.2 | 80 |
| Test Example | 50 | Dried Yellow Pea Flour (d90 < 50μm, Pin Mill) | 46 | 55 | Yellow Pea | 32.4 | Yellow Pea | 11.4 | Yellow Pea | 3.2 | 60 |
| Test Example | 51 | Dried Yellow Pea Flour (d90 < 50μm, Pin Mill) | 24 | 36 | Yellow Pea | 32.4 | Yellow Pea | 11.4 | Yellow Pea | 3.2 | 60 |
| Test Example | 52 | Dried Yellow Pea Flour (d90 < 120μm, Pin Mill) | 85 | 116 | Yellow Pea | 32.4 | Yellow Pea | 11.4 | Yellow Pea | 3.2 | 60 |
| Test Example | 53 | Dried Yellow Pea Flour (d90 < 250μm, Pin Mill) | 192 | 216 | Yellow Pea | 32.4 | Yellow Pea | 11.4 | Yellow Pea | 3.2 | 60 |

FIG. 1D

Table 1

| | Raw Material | | | Measurements for Paste Dough Composition | | | | | | Dry Mass Basis Moisture Content |
|---|---|---|---|---|---|---|---|---|---|---|
| | | | | Starch | | Protein | | Insoluble Dietary Fiber | | |
| | Raw Material(s) Used | D$_{50}$ after Amylase/Protease and Ultrasonic Treatment (μm) | Average Longest Diameter of CFW-Stained Sites after Amylase/Protease Treatment (μm) | Origin (Main Raw Material) | Mass % (Wet Mass Basis) | Origin (Main Raw Material) | Mass % (Wet Mass Basis) | Origin (Main Raw Material) | Mass % (Wet Mass Basis) | Mass % |
| Test Example 54 | Dried Yellow Pea Flour (with Seed Skins) (d90 < 350μm, Pin Mill) | 315 | 415 | Yellow Pea | 32.4 | Yellow Pea | 11.4 | Yellow Pea | 3.2 | 60 |
| Test Example 55 | Dried Yellow Pea Flour (with Seed Skins) (d90 < 50μm, Pin Mill) | 40 | 68 | Yellow Pea | 32.4 | Yellow Pea | 11.4 | Yellow Pea | 3.2 | 60 |
| Test Example 56 | Dried Yellow Pea Flour (with Seed Skins) (d90 < 50μm, Pin Mill) | 40 | 79 | Yellow Pea | 32.4 | Yellow Pea | 11.4 | Yellow Pea | 3.2 | 60 |
| Test Example 57 | Dried Yellow Pea Flour (with Seed Skins) (d90 < 50μm, Pin Mill) | 40 | 89 | Yellow Pea | 32.4 | Yellow Pea | 11.4 | Yellow Pea | 3.2 | 60 |
| Test Example 58 | Dried Yellow Pea Flour (with Seed Skins) (d90 < 50μm, Pin Mill) | 40 | 51 | Yellow Pea | 32.4 | Yellow Pea | 11.4 | Yellow Pea | 3.2 | 60 |
| Test Example 59 | Dried Yellow Pea Flour (d90 < 50μm, Pin Mill) | 35 | 43 | Yellow Pea | 32.4 | Yellow Pea | 11.4 | Yellow Pea | 3.2 | 60 |
| Test Example 60 | Dried Yellow Pea Flour (d90 < 50μm, Pin Mill) | 35 | 45 | Yellow Pea | 32.4 | Yellow Pea | 11.4 | Yellow Pea | 3.2 | 60 |
| Test Example 61 | Dried Yellow Pea Flour (d90 < 50μm, Pin Mill) | 24 | 32 | Yellow Pea | 32.4 | Yellow Pea | 11.4 | Yellow Pea | 3.2 | 30 |
| Test Example 62 | Dried Yellow Pea Flour (d90 < 50μm, Pin Mill) | 24 | 32 | Yellow Pea | 32.4 | Yellow Pea | 11.4 | Yellow Pea | 3.2 | 45 |
| Test Example 63 | Dried Yellow Pea Flour (d90 < 50μm, Pin Mill) | 24 | 32 | Yellow Pea | 32.4 | Yellow Pea | 11.4 | Yellow Pea | 3.2 | 75 |
| Test Example 64 | Dried Yellow Pea Flour (d90 < 50μm, Pin Mill) | 24 | 32 | Yellow Pea | 32.4 | Yellow Pea | 11.4 | Yellow Pea | 3.2 | 125 |
| Test Example 65 | Dried Yellow Pea Flour (d90 < 50μm, Pin Mill) | 24 | 32 | Yellow Pea | 32.4 | Yellow Pea | 11.4 | Yellow Pea | 3.2 | 175 |
| Comparative Example 1 | Dried Yellow Pea Starch | 12 | 15 | Yellow Pea | 62.5 | - | 0.0 | Yellow Pea | 0.0 | 50 |
| Comparative Example 2 | Dried Yellow Pea Starch + Purified Pea Protein | 58 | 69 | Yellow Pea | 57.1 | Yellow Pea | 3.6 | Yellow Pea | 4.6 | 50 |
| Comparative Example 3 | Dried Yellow Pea Flour (d90 < 250μm, Pin Mill) + Dried Yellow Pea Protein | 238 | 258 | Yellow Pea | 9.0 | Yellow Pea, Pea | 52.1 | Yellow Pea | 4.2 | 50 |
| Comparative Example 4 | Dried Yellow Pea-Derived Starch + Purified Whey Protein | 15 | 20 | Yellow Pea | 49.1 | Whey | 24.4 | Yellow Pea | 4.1 | 50 |
| Comparative Example 5 | Mung Bean Starch + Purified Whey Protein | 8 | 9 | Mung Bean | 38.2 | Whey | 17.3 | Mung Bean | 4.2 | 50 |

FIG. 1E

Table 1

| | | Raw Material | | Measurements for Paste Dough Composition | | | | | | | |
|---|---|---|---|---|---|---|---|---|---|---|---|
| | | | | | Starch | | Protein | | Insoluble Dietary Fiber | | Dry Mass Basis Moisture Content |
| | | Raw Material(s) Used | D₅₀ after Amylase/Protease and Ultrasonic Treatment (μm) | Average Longest Diameter of CFW-Stained Sites after Amylase/Protease Treatment (μm) | Origin (Main Raw Material) | Mass % (Wet Mass Basis) | Origin (Main Raw Material) | Mass % (Wet Mass Basis) | Origin (Main Raw Material) | Mass % (Wet Mass Basis) | Mass % |
| Comparative Example | 6 | Commercial Product: Spaghetti | N.A. | N.A. | Wheat | | Wheat | N.A. | Wheat | N.A. | N.A. |
| Comparative Example | 7 | Commercial Product: Mung Bean Harusame | | | Mung Bean | | Mung Bean | | Mung Bean | | |
| Comparative Example | 8 | Commercial Product: Udon | | | Wheat | | Wheat | | Wheat | | |
| Comparative Example | 9 | Dried Yellow Pea Flour (d90 < 50μm, Pin Mill) | 46 | 69 | Yellow Pea | 32.4 | Yellow Pea | 11.4 | Yellow Pea | 3.2 | 60 |
| Comparative Example | 10 | Dried Yellow Pea Flour (d90 < 50μm, Pin Mill) | 36 | 56 | Yellow Pea | 34.6 | Yellow Pea | 16.1 | Yellow Pea | 5.2 | 50 |
| Comparative Example | 11 | Dried Yellow Pea Flour (with Seed Skins) (d90 < 250μm, Pin Mill) | 241 | 295 | Yellow Pea | 32.4 | Yellow Pea | 11.4 | Yellow Pea | 3.2 | 60 |
| Comparative Example | 12 | Dried Yellow Pea Flour (d90 < 50μm, Pin Mill) | 22 | 35 | Yellow Pea | 32.4 | Yellow Pea | 11.4 | Yellow Pea | 3.2 | 60 |
| Comparative Example | 13 | Dried Yellow Pea Flour (d90 < 50μm, Pin Mill) | 32 | 35 | Yellow Pea | 32.4 | Yellow Pea | 11.4 | Yellow Pea | 3.2 | 60 |
| Comparative Example | 14 | Dried Yellow Pea Flour (d50 = 約500μm, Pin Mill) | 672 | 756 | Yellow Pea | 32.4 | Yellow Pea | 11.4 | Yellow Pea | 3.2 | 60 |
| Comparative Example | 15 | Dried Yellow Pea Flour (d90 < 50μm, Pin Mill) | 24 | 32 | Yellow Pea | 32.4 | Yellow Pea | 11.4 | Yellow Pea | 3.2 | 10 |
| Comparative Example | 16 | Dried Yellow Pea Flour (d90 < 50μm, Pin Mill) | 24 | 32 | Yellow Pea | 32.4 | Yellow Pea | 11.4 | Yellow Pea | 3.2 | 20 |
| Referential Example | 1 | Dried Yellow Pea Starch + Dried Yellow Pea Protein | 16 | 23 | Yellow Pea | 51.7 | Yellow Pea | 5.5 | Yellow Pea | 3.4 | 50 |
| Referential Example | 2 | Dried Yellow Pea Flour (d90 < 250μm, Airflow) -> Treated at Dry Mass Basis Moisture Content 50%, Highest Temperature 150°C, SME 300kJ/kg -> Dried until Dry Mass Basis Moisture Content Reaches 10%, then Crushed (d90 < 250μm, Pin Mill) | 151 | 265 | Pea | 38.3 | Pea | 9.8 | Pea | 4.2 | 40 |
| Referential Example | 3 | Dried Yellow Pea Flour (d90 < 50μm, Pin Mill) | 12 | 35 | Yellow Pea | 32.4 | Yellow Pea | 11.4 | Yellow Pea | 3.2 | 60 |
| Referential Example | 4 | Dried Yellow Pea Flour (d90 < 50μm, Pin Mill) | 16 | 26 | Yellow Pea | 32.4 | Yellow Pea | 11.4 | Yellow Pea | 3.2 | 60 |
| Referential Example | 5 | Dried Yellow Pea Flour (d90 < 250μm, Pin Mill) | 261 | 369 | Yellow Pea | 34.6 | Yellow Pea | 16.1 | Yellow Pea | 5.2 | 50 |
| Referential Example | 6 | Dried Yellow Pea Flour (with Seed Skins) (d90 < 250μm, Pin Mill) | 215 | 452 | Yellow Pea | 32.4 | Yellow Pea | 11.4 | Yellow Pea | 3.2 | 60 |
| Referential Example | 7 | Dried Yellow Pea Flour (d90 < 50μm, Pin Mill) | 26 | 42 | Yellow Pea | 32.4 | Yellow Pea | 11.4 | Yellow Pea | 3.2 | 60 |

FIG. 2A

Table 2

| | | Equipment used | | | Processing Conditions | | | | | | | | | | | | Post-Treatment | |
|---|---|---|---|---|---|---|---|---|---|---|---|---|---|---|---|---|---|---|
| | Equipment Type | Ratio of Flight Screw Part % | Kneading Part | Water Injection Method | Temperature Conditions for Each Barrel Part | | | | | | | | Barrel Rotation Speed rpm | Kneading Strength (SME) kJ/kg | Internal Pressure (Outlet Pressure) MPa | Drying Conditions | Retention Time with Dry Basis Moisture Content of ≥ 25 Mass % Hour |
| | | | | | (1) (Inlet Temp.) °C | (2) °C | (3) °C | (4) °C | (5) °C | (6) °C | (7) °C | (8) °C | (9) (Outlet Temp.) °C | | | | | |
| Test Example 1 | Biaxial Extruder | 80 | (4), (6) | All raw material powder and water were mixed as dough and injected at (1) | --- | 90 | 90 | 120 | 120 | 120 | 120 | 100 | 80 | 325 | 849 | 6.5 | After immersion in water, dried at normal temperature | 12 |
| Test Example 2 | Biaxial Extruder | 80 | (4), (6) | All raw material powder and water were mixed as dough and injected at (1) | --- | 90 | 90 | 120 | 120 | 120 | 120 | 100 | 80 | 325 | 849 | 6.5 | Dried at normal temperature | 12 |
| Test Example 3 | Biaxial Extruder | 80 | (4), (6) | All raw material powder and water were mixed as dough and injected at (1) | --- | 90 | 90 | 100 | 100 | 100 | 120 | 100 | 80 | 325 | 1004 | 6.3 | Dried at normal temperature | 1 |
| Test Example 4 | Biaxial Extruder | 80 | (4), (6) | All raw material powder and water were mixed as dough and injected at (1) | --- | 90 | 90 | 120 | 120 | 120 | 120 | 95 | 80 | 325 | 502 | 0.5 | Dried with airflow | 0.1 |
| Test Example 5 | Biaxial Extruder | 80 | (4), (6) | All raw material powder and water were mixed as dough and injected at (1) | --- | 90 | 100 | 120 | 120 | 120 | 120 | 95 | 80 | 325 | 656 | 6.6 | Dried at normal temperature | 1 |
| Test Example 6 | Biaxial Extruder | 80 | (4), (6) | All raw material powder and water were mixed as dough and injected at (1) | --- | 90 | 100 | 120 | 120 | 120 | 120 | 95 | 80 | 325 | 927 | 6.6 | Dried at normal temperature | 1 |
| Test Example 7 | Biaxial Extruder | 80 | (4), (6) | All raw material powder and water were mixed as dough and injected at (1) | --- | 90 | 100 | 120 | 120 | 120 | 120 | 95 | 80 | 325 | 927 | 6.6 | Dried at normal temperature | 1 |
| Test Example 8 | Biaxial Extruder | 80 | (4), (6) | All raw material powder and water were mixed as dough and injected at (1) | --- | 90 | 100 | 100 | 120 | 120 | 120 | 95 | 80 | 325 | 772 | 6.6 | Dried at normal temperature | 1 |
| Test Example 9 | Biaxial Extruder | 80 | (4), (6) | All raw material powder and water were mixed as dough and injected at (1) | --- | 90 | 100 | 120 | 120 | 120 | 120 | 95 | 80 | 325 | 927 | 6.6 | Dried at normal temperature | 1 |
| Test Example 10 | Biaxial Extruder | 80 | (4), (6) | All raw material powder and water were mixed as dough and injected at (1) | --- | 90 | 100 | 120 | 120 | 120 | 120 | 95 | 80 | 325 | 927 | 6.6 | Dried at normal temperature | 1 |
| Test Example 11 | Biaxial Extruder | 80 | (4), (6) | All raw material powder and water were mixed as dough and injected at (1) | --- | 90 | 100 | 120 | 120 | 120 | 120 | 95 | 80 | 325 | 927 | 6.6 | Dried at normal temperature | 1 |
| Test Example 12 | Biaxial Extruder | 80 | (4), (6) | All raw material powder and water were mixed as dough and injected at (1) | --- | 90 | 90 | 120 | 120 | 120 | 120 | 100 | 80 | 325 | 927 | 6.5 | Dried at normal temperature | 1 |
| Test Example 13 | Biaxial Extruder | 80 | (4), (6) | All raw material powder and water were mixed as dough and injected at (1) | --- | 90 | 100 | 120 | 120 | 120 | 120 | 95 | 80 | 325 | 849 | 6.5 | Dried at normal temperature | 1 |
| Test Example 14 | Biaxial Extruder | 80 | (4), (6) | All raw material powder and water were mixed as dough and injected at (1) | --- | 90 | 100 | 120 | 120 | 120 | 120 | 95 | 80 | 325 | 463 | 6.6 | Dried at normal temperature | 1 |
| Test Example 15 | Biaxial Extruder | 80 | (4), (6) | All raw material powder and water were mixed as dough and injected at (1) | --- | 90 | 100 | 120 | 120 | 120 | 120 | 95 | 80 | 325 | 927 | 6.6 | Dried at normal temperature | 1 |

FIG. 2B

Table 2

| | | Equipment used | | | Processing Conditions | | | | | | | | | | | | Post-Treatment | |
|---|---|---|---|---|---|---|---|---|---|---|---|---|---|---|---|---|---|---|
| | | | | | Water Injection Method | Temperature Conditions for Each Barrel Part | | | | | | | | Barrel Rotation Speed | Kneading Strength (SME) | Internal Pressure (Outlet Pressure) | Drying Conditions | Retention Time with Dry Basis Moisture Content of ≥ 25 Mass % |
| | | Equipment Type | Ratio of Flight Screw Part | Kneading Part | | (1) (Inlet Temp.) | (2) | (3) | (4) | (5) | (6) | (7) | (8) | (9) (Outlet Temp.) | | | | | |
| | | | % | | | °C | °C | °C | °C | °C | °C | °C | °C | °C | rpm | kJ/kg | MPa | | Hour |
| Test Example 16 | | Biaxial Extruder | 80 | (4), (6) | All raw material powder and water were mixed as dough and injected at (1) | — | 90 | 90 | 120 | 120 | 120 | 120 | 100 | 80 | 325 | 849 | 6.5 | Dried at normal temperature | 1 |
| Test Example 17 | | Biaxial Extruder | 80 | (4), (6) | All raw material powder and water were mixed as dough and injected at (1) | — | 90 | 100 | 120 | 120 | 120 | 120 | 95 | 80 | 325 | 927 | 6.6 | Dried at normal temperature | 1 |
| Test Example 18 | | Biaxial Extruder | 80 | (4), (6) | All raw material powder and water were mixed as dough and injected at (1) | — | 90 | 100 | 120 | 120 | 120 | 120 | 95 | 80 | 325 | 927 | 6.6 | Dried at normal temperature | 1 |
| Test Example 19 | | Biaxial Extruder | 80 | (4), (6) | All raw material powder and water were mixed as dough and injected at (1) | — | 90 | 100 | 120 | 120 | 120 | 120 | 95 | 80 | 325 | 927 | 6.6 | Dried at normal temperature | 1 |
| Test Example 20 | | Biaxial Extruder | 80 | (4), (6) | All raw material powder and water were mixed as dough and injected at (1) | — | 90 | 90 | 120 | 120 | 120 | 120 | 95 | 80 | 325 | 618 | 6.6 | Dried at normal temperature | 1 |
| Test Example 21 | | Biaxial Extruder | 80 | (4), (6) | All raw material powder and water were mixed as dough and injected at (1) | — | 90 | 90 | 120 | 120 | 120 | 120 | 100 | 80 | 325 | 849 | 6.5 | Dried at normal temperature | 1 |
| Test Example 22 | | Biaxial Extruder | 80 | (4), (6) | All raw material powder and water were mixed as dough and injected at (1) | — | 90 | 90 | 120 | 120 | 120 | 120 | 100 | 80 | 325 | 849 | 6.5 | Dried at normal temperature | 1 |
| Test Example 23 | | Biaxial Extruder | 80 | (4), (6) | All raw material powder and water were mixed as dough and injected at (1) | — | 90 | 90 | 120 | 120 | 120 | 120 | 100 | 80 | 325 | 558 | 6.5 | Dried at normal temperature | 1 |
| Test Example 24 | | Biaxial Extruder | 80 | (4), (6) | All raw material powder and water were mixed as dough and injected at (1) | — | 90 | 90 | 120 | 120 | 120 | 120 | 100 | 80 | 325 | 849 | 6.6 | Dried at normal temperature | 1 |
| Test Example 25 | | Biaxial Extruder | 80 | (4), (6) | All raw material powder and water were mixed as dough and injected at (1) | — | 90 | 100 | 120 | 120 | 120 | 120 | 95 | 80 | 325 | 927 | 6.6 | Dried at normal temperature | 1 |
| Test Example 26 | | Biaxial Extruder | 80 | (4), (6) | All raw material powder and water were mixed as dough and injected at (1) | — | 90 | 100 | 120 | 120 | 120 | 120 | 95 | 80 | 325 | 927 | 6.6 | Dried at normal temperature | 1 |
| Test Example 27 | | Biaxial Extruder | 80 | (4), (6) | All raw material powder and water were mixed as dough and injected at (1) | — | 90 | 100 | 120 | 120 | 120 | 120 | 95 | 80 | 325 | 927 | 6.6 | Dried at normal temperature | 1 |
| Test Example 28 | | Biaxial Extruder | 80 | (4), (6) | All raw material powder and water were mixed as dough and injected at (1) | — | 90 | 90 | 120 | 120 | 120 | 120 | 100 | 80 | 325 | 849 | 6.5 | Dried at normal temperature | 1 |
| Test Example 29 | | Biaxial Extruder | 80 | (4), (6) | All raw material powder and water were mixed as dough and injected at (1) | — | 90 | 100 | 120 | 120 | 120 | 120 | 95 | 80 | 325 | 849 | 6.5 | Dried at normal temperature | 1 |
| Test Example 30 | | Biaxial Extruder | 80 | (4), (6) | All raw material powder and water were mixed as dough and injected at (1) | — | 90 | 100 | 120 | 120 | 120 | 120 | 95 | 80 | 325 | 656 | 0.5 | Dried with airflow | 0.5 |

FIG. 2C

Table 2

| | | Equipment used | | | Processing Conditions | | | | | | | | | | | Post-Treatment | |
|---|---|---|---|---|---|---|---|---|---|---|---|---|---|---|---|---|---|
| | | | | | | Temperature Conditions for Each Barrel Part | | | | | | | | | | | |
| | Equipment Type | Ratio of Flight Screw Part % | Kneading Part | Water Injection Method | (1) (Inlet Temp.) °C | (2) °C | (3) °C | (4) °C | (5) °C | (6) °C | (7) °C | (8) °C | (9) (Outlet Temp.) °C | Barrel Rotation Speed rpm | Kneading Strength (SME) kJ/kg | Internal Pressure (Outlet Pressure) MPa | Drying Conditions | Retention Time with Dry Basis Moisture Content of ≥ 25 Mass % Hour |
| Test Example 31 | Biaxial Extruder | 80 | (4), (6) | All raw material powder and water were mixed as dough and injected at (1) | — | 90 | 100 | 120 | 120 | 120 | 120 | 95 | 80 | 325 | 734 | 0.5 | Dried with airflow | 0.3 |
| Test Example 32 | Biaxial Extruder | 80 | (4), (6) | All raw material powder and water were mixed as dough and injected at (1) | — | 90 | 100 | 120 | 120 | 120 | 120 | 95 | 80 | 325 | 927 | 6.6 | Dried at normal temperature | 1 |
| Test Example 33 | Biaxial Extruder | 80 | (4), (6) | All raw material powder and water were mixed as dough and injected at (1) | — | 90 | 100 | 120 | 120 | 120 | 120 | 95 | 80 | 325 | 927 | 6.6 | Dried at normal temperature | 1 |
| Test Example 34 | Biaxial Extruder | 80 | (4), (6) | All raw material powder and water were mixed as dough and injected at (1) | — | 90 | 100 | 120 | 120 | 120 | 120 | 95 | 80 | 325 | 927 | 6.6 | Dried at normal temperature | 1 |
| Test Example 35 | Biaxial Extruder | 80 | (4), (6) | All raw material powder and water were mixed as dough and injected at (1) | — | 90 | 100 | 120 | 120 | 120 | 120 | 95 | 80 | 325 | 927 | 6.6 | Dried at normal temperature | 1 |
| Test Example 36 | Biaxial Extruder | 80 | (4), (6) | All raw material powder and water were mixed as dough and injected at (1) | — | 90 | 100 | 100 | 120 | 120 | 120 | 95 | 80 | 325 | 618 | 2.5 | Dried at normal temperature | 1 |
| Test Example 37 | Uniaxial Extruder | 40 | (4), (5), (6), (7) | All raw material powder and water were mixed as dough and injected at (1) | — | 90 | 100 | 120 | 120 | 120 | 120 | 95 | 80 | 100 | 540 | 3.4 | Dried at normal temperature | 1 |
| Test Example 38 | Biaxial Extruder | 80 | (4), (6) | All raw material powder and water were mixed as dough and injected at (1) | — | 90 | 100 | 120 | 120 | 120 | 120 | 95 | 80 | 325 | 927 | 6.6 | Dried at normal temperature | 1 |
| Test Example 39 | Biaxial Extruder | 80 | (4), (6) | All raw material powder and water were mixed as dough and injected at (1) | — | 90 | 100 | 120 | 120 | 120 | 120 | 95 | 80 | 325 | 927 | 6.6 | None | 1 |
| Test Example 40 | Biaxial Extruder | 80 | (4), (6) | All raw material powder and water were mixed as dough and injected at (1) | — | 90 | 100 | 120 | 120 | 120 | 120 | 95 | 80 | 325 | 541 | 0.5 | Dried at normal temperature | 2 |
| Test Example 41 | Biaxial Extruder | 80 | (4), (6) | All raw material powder and water were mixed as dough and injected at (1) | — | 90 | 100 | 120 | 120 | 120 | 120 | 95 | 80 | 325 | 927 | 6.6 | Dried at normal temperature | 1 |
| Test Example 42 | Biaxial Extruder | 80 | (4), (6) | All raw material powder and water were mixed as dough and injected at (1) | — | 90 | 100 | 120 | 120 | 120 | 120 | 95 | 80 | 325 | 927 | 6.6 | Dried at normal temperature | 3 |
| Test Example 43 | Biaxial Extruder | 80 | (4), (6) | All raw material powder and water were mixed as dough and injected at (1) | — | 90 | 100 | 120 | 120 | 120 | 120 | 95 | 80 | 325 | 927 | 6.6 | Dried at normal temperature | 2 |
| Test Example 44 | Biaxial Extruder | 80 | (4), (6) | All raw material powder and water were mixed as dough and injected at (1) | — | 90 | 100 | 120 | 120 | 120 | 120 | 95 | 40 | 325 | 927 | 6.6 | Dried at normal temperature | 12 |
| Test Example 45 | Biaxial Extruder | 100 | — | All raw material powder and water were mixed as dough and injected at (1) | — | 90 | 100 | 120 | 120 | 120 | 120 | 95 | 80 | 325 | 772 | 6.6 | Dried at normal temperature | 1 |

FIG. 2D

Table 2

| | | Equipment used | | | Processing Conditions | | | | | | | | | | | | Post-Treatment | |
|---|---|---|---|---|---|---|---|---|---|---|---|---|---|---|---|---|---|---|
| | | | | | Water Injection Method | Temperature Conditions for Each Barrel Part | | | | | | | | Barrel Rotation Speed | Kneading Strength (SME) | Internal Pressure (Outlet Pressure) | Drying Conditions | Retention Time with Dry Basis Moisture Content of ≥ 25 Mass % |
| | | Equipment Type | Ratio of Flight Screw Part | Kneading Part | | (1) (Inlet Temp.) | (2) | (3) | (4) | (5) | (6) | (7) | (8) | (9) (Outlet Temp.) | | | | | |
| | | | % | | | °C | °C | °C | °C | °C | °C | °C | °C | °C | rpm | kJ/kg | MPa | | Hour |
| Test Example 46 | | Biaxial Extruder | 80 | (4), (6) | All raw material powder and water were mixed as dough and injected at (1) | — | 90 | 100 | 120 | 120 | 120 | 120 | 95 | 80 | 325 | 927 | 6.6 | Dried at normal temperature | 1 |
| Test Example 47 | | Biaxial Extruder | 80 | (4), (6) | All raw material powder and water were mixed as dough and injected at (1) | — | 90 | 100 | 120 | 120 | 120 | 120 | 95 | 80 | 325 | 1081 | 10.4 | Dried at normal temperature | 1 |
| Test Example 48 | | Biaxial Extruder | 80 | (4), (6) | All raw material powder and water were mixed as dough and injected at (1) | — | 90 | 100 | 120 | 120 | 120 | 120 | 95 | 80 | 325 | 927 | 6.6 | Dried at normal temperature | 1 |
| Test Example 49 | | Biaxial Extruder | 80 | (4), (6) | All raw material powder and water were mixed as dough and injected at (1) | — | 90 | 100 | 120 | 120 | 120 | 120 | 95 | 80 | 325 | 502 | 0.3 | Dried at normal temperature | 2 |
| Test Example 50 | | Biaxial Extruder | 80 | (4), (6) | All raw material powder and water were mixed as dough and injected at (1) | — | 90 | 90 | 140 | 140 | 140 | 140 | 95 | 80 | 325 | 849 | 5.4 | Dried at normal temperature | 1 |
| Test Example 51 | | Biaxial Extruder | 80 | (4), (6) | All raw material powder and water were mixed as dough and injected at (1) | — | 90 | 90 | 160 | 160 | 160 | 160 | 95 | 80 | 325 | 965 | 7.0 | Dried at normal temperature | 1 |
| Test Example 52 | | Biaxial Extruder | 80 | (4), (6) | All raw material powder and water were mixed as dough and injected at (1) | — | 90 | 100 | 120 | 120 | 120 | 120 | 95 | 80 | 325 | 849 | 6.5 | Dried at normal temperature | 1 |
| Test Example 53 | | Biaxial Extruder | 80 | (4), (6) | All raw material powder and water were mixed as dough and injected at (1) | — | 90 | 100 | 120 | 120 | 120 | 120 | 95 | 80 | 325 | 849 | 6.5 | Dried at normal temperature | 1 |
| Test Example 54 | | Biaxial Extruder | 80 | (4), (6) | All raw material powder and water were mixed as dough and injected at (1) | — | 90 | 100 | 120 | 120 | 120 | 120 | 95 | 80 | 325 | 849 | 6.5 | Dried at normal temperature | 1 |
| Test Example 55 | | Biaxial Extruder | 80 | (4), (6) | All raw material powder and water were mixed as dough and injected at (1) | — | 90 | 100 | 120 | 120 | 120 | 120 | 95 | 55 | 325 | 965 | 10 | Dried at normal temperature | 5 |
| Test Example 56 | | Uniaxial Extruder | 40 | (4), (5), (6), (7) | All raw material powder and water were mixed as dough and injected at (1) | — | 90 | 100 | 120 | 120 | 120 | 120 | 95 | 80 | 100 | 350 | 3.4 | Dried at normal temperature | 1 |
| Test Example 57 | | Uniaxial Extruder | 40 | (4), (5), (6), (7) | All raw material powder and water were mixed as dough and injected at (1) | — | 90 | 100 | 120 | 120 | 120 | 120 | 95 | 80 | 100 | 540 | 3.4 | After immersion in water, dried at normal temperature | 10 |
| Test Example 58 | | Uniaxial Extruder | 40 | (4), (5), (6), (7) | All raw material powder and water were mixed as dough and injected at (1) | — | 90 | 100 | 120 | 120 | 120 | 120 | 95 | 80 | 100 | 410 | 3.4 | Dried at normal temperature | 1 |
| Test Example 59 | | Uniaxial Extruder | 40 | (4), (5), (6), (7) | All raw material powder and water were mixed as dough and injected at (1) | — | 90 | 100 | 120 | 120 | 120 | 120 | 95 | 80 | 100 | 380 | 3.4 | Dried at normal temperature | 1 |
| Test Example 60 | | Uniaxial Extruder | 40 | (4), (5), (6), (7) | All raw material powder and water were mixed as dough and injected at (1) | — | 90 | 100 | 120 | 120 | 120 | 120 | 95 | 80 | 100 | 390 | 3.4 | Dried at normal temperature | 1 |

FIG. 2E

| Table 2 | Equipment used | | | | Processing Conditions | | | | | | | | | | | Post-Treatment | |
|---|---|---|---|---|---|---|---|---|---|---|---|---|---|---|---|---|---|
| | Equipment Type | Ratio of Flight Screw Part % | Kneading Part | Water Injection Method | Temperature Conditions for Each Barrel Part | | | | | | | | Barrel Rotation Speed rpm | Kneading Strength (SME) kJ/kg | Internal Pressure (Outlet Pressure) MPa | Drying Conditions | Retention Time with Dry Basis Moisture Content of ≥ 25 Mass % Hour |
| | | | | | (1) (Inlet Temp.) °C | (2) °C | (3) °C | (4) °C | (5) °C | (6) °C | (7) °C | (8) °C | (9) (Outlet Temp.) °C | | | | | |
| Test Example 61 | Biaxial Extruder | 80 | (4), (6) | All raw material powder and water were mixed as dough and injected at (1) | --- | 90 | 100 | 120 | 120 | 120 | 120 | 95 | 85 | 325 | 410 | 0.3 | Dried at normal temperature | 0.3 |
| Test Example 62 | Biaxial Extruder | 80 | (4), (6) | All raw material powder and water were mixed as dough and injected at (1) | --- | 90 | 100 | 120 | 120 | 120 | 120 | 95 | 85 | 325 | 457 | 0.3 | Dried at normal temperature | 1 |
| Test Example 63 | Biaxial Extruder | 80 | (4), (6) | All raw material powder and water were mixed as dough and injected at (1) | --- | 90 | 100 | 120 | 120 | 120 | 120 | 95 | 85 | 325 | 625 | 1.5 | Dried at normal temperature | 3 |
| Test Example 64 | Biaxial Extruder | 80 | (4), (6) | All raw material powder and water were mixed as dough and injected at (1) | --- | 90 | 100 | 120 | 120 | 120 | 120 | 95 | 85 | 325 | 869 | 5.1 | Dried at normal temperature | 10 |
| Test Example 65 | Biaxial Extruder | 80 | (4), (6) | All raw material powder and water were mixed as dough and injected at (1) | --- | 90 | 100 | 120 | 120 | 120 | 120 | 95 | 85 | 325 | 905 | 8.5 | Dried at normal temperature | 15 |
| Comparative Example 1 | Biaxial Extruder | 80 | (4), (6) | All raw material powder and water were mixed as dough and injected at (1) | --- | 90 | 100 | 120 | 120 | 120 | 120 | 95 | 80 | 325 | 927 | 6.6 | Dried at normal temperature | 1 |
| Comparative Example 2 | Biaxial Extruder | 80 | (4), (6) | All raw material powder and water were mixed as dough and injected at (1) | --- | 90 | 100 | 120 | 120 | 120 | 120 | 95 | 80 | 325 | 927 | 6.6 | Dried at normal temperature | 1 |
| Comparative Example 3 | Biaxial Extruder | 80 | (4), (6) | All raw material powder and water were mixed as dough and injected at (1) | --- | 90 | 100 | 120 | 120 | 120 | 120 | 95 | 80 | 325 | 927 | 6.6 | Dried at normal temperature | 1 |
| Comparative Example 4 | Biaxial Extruder | 80 | (4), (6) | All raw material powder and water were mixed as dough and injected at (1) | --- | 90 | 100 | 120 | 120 | 120 | 120 | 95 | 80 | 325 | 888 | 7 | Dried at normal temperature | 1 |
| Comparative Example 5 | Biaxial Extruder | 80 | (4), (6) | All raw material powder and water were mixed as dough and injected at (1) | --- | 90 | 100 | 120 | 120 | 120 | 120 | 95 | 80 | 325 | 927 | 6.6 | Dried at normal temperature | 1 |
| Comparative Example 6 | | | | | | | | | | | | | | | | | | |
| Comparative Example 7 | | | | | N.A. (Commercial Products) | | | | | | | | | | | | | |
| Comparative Example 8 | | | | | | | | | | | | | | | | | | |
| Comparative Example 9 | Biaxial Extruder | 80 | (4), (6) | All raw material powder and water were mixed as dough and injected at (1) | --- | 40 | 40 | 40 | 40 | 40 | 40 | 40 | 40 | 325 | 1313 | 10.5 | Dried at normal temperature | 5 |
| Comparative Example 10 | Biaxial Extruder | 80 | (4), (6) | All raw material powder and water were mixed as dough and injected at (1) | --- | 80 | 80 | 80 | 80 | 80 | 80 | 80 | 80 | 325 | 1158 | 6 | Dried at normal temperature | 1 |
| Comparative Example 11 | Biaxial Extruder | 80 | (4), (6) | All raw material powder and water were mixed as dough and injected at (1) | --- | 60 | 80 | 80 | 80 | 80 | 80 | 80 | 80 | 325 | 1004 | 6.3 | Dried at normal temperature | 2 |

FIG. 2F

Table 2

| | | Equipment used | | | Processing Conditions | | | | | | | | | | | | Post-Treatment | |
|---|---|---|---|---|---|---|---|---|---|---|---|---|---|---|---|---|---|---|
| | | Equipment Type | Ratio of Flight Screw Part % | Kneading Part | Water Injection Method | Temperature Conditions for Each Barrel Part | | | | | | | | Barrel Rotation Speed rpm | Kneading Strength (SME) kJ/kg | Internal Pressure (Outlet Pressure) MPa | Drying Conditions | Retention Time with Dry Basis Moisture Content of ≥ 25 Mass % Hour |
| | | | | | | (1) (Inlet Temp.) °C | (2) °C | (3) °C | (4) °C | (5) °C | (6) °C | (7) °C | (8) °C | (9) (Outlet Temp.) °C | | | | | |
| Comparative Example 12 | Biaxial Extruder | 100 | — | All raw material powder and water were mixed as dough and injected at (1) | — | 60 | 80 | 100 | 100 | 100 | 100 | 100 | 80 | 150 | 428 | 6.1 | Dried at normal temperature | 1 |
| Comparative Example 13 | Biaxial Extruder | 80 | (4), (6) | All raw material powder and water were mixed as dough and injected at (1) | — | 60 | 80 | 100 | 100 | 100 | 100 | 100 | 80 | 325 | 927 | 5.8 | Dried at normal temperature | 1 |
| Comparative Example 14 | Biaxial Extruder | 80 | (4), (6) | All raw material powder and water were mixed as dough and injected at (1) | — | 90 | 100 | 120 | 120 | 120 | 120 | 95 | 80 | 325 | 927 | 6.6 | Dried at normal temperature | 1 |
| Comparative Example 15 | Biaxial Extruder | 80 | (4), (6) | All raw material powder and water were mixed as dough and injected at (1) | — | 90 | 100 | 120 | 120 | 120 | 120 | 95 | 85 | 325 | 250 | 0.1 | Dried at normal temperature | 0.01 |
| Comparative Example 16 | Biaxial Extruder | 80 | (4), (6) | All raw material powder and water were mixed as dough and injected at (1) | — | 90 | 100 | 120 | 120 | 120 | 120 | 95 | 85 | 325 | 355 | 0.1 | Dried at normal temperature | 0.1 |
| Referential Example 1 | Biaxial Extruder | 80 | (4), (6) | All raw material powder and water were mixed as dough and injected at (1) | — | 90 | 90 | 120 | 120 | 120 | 120 | 100 | 80 | 325 | 849 | 6.5 | Dried at normal temperature | 1 |
| Referential Example 2 | Biaxial Extruder | 100 | — | All raw material powder and water were mixed as dough and injected at (1) | — | 90 | 100 | 120 | 120 | 120 | 120 | 95 | 80 | 150 | 270 | 1.5 | Dried at normal temperature | 1 |
| Referential Example 3 | Biaxial Extruder | 80 | (4), (6) | Raw material powder was injected at (1), and all water was injected at (3) | — | 90 | 90 | 120 | 120 | 120 | 120 | 100 | 80 | 325 | 927 | 5.8 | Dried at normal temperature | 1 |
| Referential Example 4 | Biaxial Extruder | 80 | (4), (6) | Raw material powder was injected at (1), and all water was injected at (3) | — | 100 | 100 | 120 | 120 | 120 | 120 | 100 | 80 | 325 | 927 | 5.8 | Dried at normal temperature | 1 |
| Referential Example 5 | Biaxial Extruder | 80 | (4), (6) | All raw material powder and water were mixed as dough and injected at (1) | — | 90 | 140 | 180 | 180 | 180 | 180 | 130 | 80 | 325 | 965 | 5.5 | Dried at normal temperature | 1 |
| Referential Example 6 | Biaxial Extruder | 80 | (4), (6) | All raw material powder and water were mixed as dough and injected at (1) | — | 90 | 120 | 180 | 180 | 180 | 180 | 95 | 80 | 325 | 849 | 6.5 | Dried at normal temperature | 1 |
| Referential Example 7 | Biaxial Extruder | 80 | (4), (6) | All raw material powder and water were mixed as dough and injected at (1) | — | 90 | 140 | 200 | 200 | 200 | 200 | 100 | 80 | 325 | 849 | 6.5 | Dried at normal temperature | 1 |

FIG. 3A

Table 3

| | Starch | Protein | Insoluble Dietary Fiber | D50 after Amylase/ Protease & Ultrasonic Treatment | Moisture Content | Composition Shape | Measurements for Composition Image Analysis with 200x Magnification of Frozen Section along Transverse Axis (Composition Heated at 90°C for 6 Min in Water) | | | | CFW-Stained Sites | |
|---|---|---|---|---|---|---|---|---|---|---|---|---|
| | | | | | | | CBB-Stained Sites with Degrees of Roundness of ≥ 0.3 and Areas of ≥ 200μm² | | 90th Percentile Score of Areas of Stained Sites | Number of Stained Sites with Largest Diameters of ≥ 200μm | Average Largest Diameter | Average Aspect Ratio |
| | | | | | | | Number of Specific Stained Sites/ Number of All Stained Sites | Total Area of Specific Stained Sites /Total Viewing Area | | | | |
| | Mass % (Dry Mass Basis) | Mass % (Dry Mass Basis) | Mass % (Dry Mass Basis) | μm | Mass % | | % | % | μm² | | μm | |
| Test Example 1 | 75.0 | 8.0 | 7.5 | 8 | 5 | Noodles with 1 mm Dia. | 23.3% | 6.4% | 1117.0 | 0 | 17 | 1.8 |
| Test Example 2 | 75.0 | 8.0 | 7.5 | 33 | 5 | Noodles with 1 mm Dia. | 17.8% | 4.9% | 844.0 | 0 | 48 | 1.8 |
| Test Example 3 | 75.0 | 8.0 | 7.5 | 20 | 5 | Noodles with 1 mm Dia. | 16.7% | 4.6% | 929.6 | 0 | 30 | 1.7 |
| Test Example 4 | 55.0 | 17.0 | 10.5 | 56 | 3 | Noodles with 3 mm Dia. | 24.6% | 11.1% | 1937.5 | 16 | 67 | 1.9 |
| Test Example 5 | 50 | 30.0 | 6.5 | 163 | 10 | Noodles with 1 mm Dia. | 33.7% | 8.1% | 3439.3 | 0 | 163 | 2.3 |
| Test Example 6 | 20.0 | 70.0 | 2.5 | 115 | 6 | Noodles with 1 mm Dia. | 13.9% | 4.1% | 714.7 | 0 | 112 | 1.9 |
| Test Example 7 | 15.5 | 85.0 | 2.2 | 35 | 6 | Noodles with 1 mm Dia. | 17.7% | 5.7% | 2220.2 | 2 | 30 | 1.6 |
| Test Example 8 | 30.0 | 50.0 | 7.5 | 160 | 6 | Noodles with 1 mm Dia. | 20.7% | 6.5% | 1951.3 | 22 | 289 | 2.6 |
| Test Example 9 | 25.0 | 60.0 | 6.0 | 200 | 6 | Noodles with 1 mm Dia. | 14.5% | 2.6% | 2985.1 | 25 | 296 | 2.2 |
| Test Example 10 | 50 | 25.0 | 5.0 | 51 | 10 | Noodles with 1 mm Dia. | 6.8% | 1.5% | 718.7 | 0 | 53 | 1.8 |
| Test Example 11 | 50 | 18.0 | 30.5 | 360 | 10 | Noodles with 1 mm Dia. | 5.3% | 0.5% | 464.3 | 0 | 462 | 5.0 |
| Test Example 12 | 55 | 20.0 | 15.0 | 168 | 10 | Noodles with 1 mm Dia. | 8.6% | 2.5% | 1468.6 | 0 | 205 | 1.9 |
| Test Example 13 | 65.0 | 14.0 | 10.5 | 61 | 5 | Noodles with 1 mm Dia. | 53.8% | 9.1% | 2083.3 | 0 | 82 | 1.9 |
| Test Example 14 | 50 | 20.0 | 2.3 | 156 | 6 | Noodles with 1 mm Dia. | 41.1% | 14.3% | 9783.3 | 0 | 228 | 2.6 |
| Test Example 15 | 55 | 22.5 | 4.0 | 112 | 6 | Noodles with 1 mm Dia. | 27.3% | 6.0% | 2204.2 | 0 | 186 | 2.3 |
| Test Example 16 | 70.0 | 10.0 | 12.0 | 130 | 5 | Noodles with 1 mm Dia. | 11.5% | 3.7% | 283.6 | 0 | 162 | 2.2 |
| Test Example 17 | 55 | 15.0 | 9.0 | 121 | 6 | Noodles with 1 mm Dia. | 28.6% | 9.9% | 2199.5 | 0 | 144 | 2.1 |
| Test Example 18 | 55 | 19.5 | 4.0 | 110 | 6 | Noodles with 1 mm Dia. | 28.6% | 13.0% | 809.3 | 0 | 110 | 2.0 |
| Test Example 19 | 50.0 | 30.0 | 2.2 | 350 | 10 | Noodles with 1 mm Dia. | 42.5% | 7.2% | 2793.7 | 0 | 485 | 3.6 |
| Test Example 20 | 55 | 25.0 | 2.3 | 256 | 6 | Noodles with 1 mm Dia. | 26.7% | 9.7% | 3587.3 | 0 | 319 | 2.5 |
| Test Example 21 | 80.0 | 6.0 | 6.7 | 264 | 5 | Noodles with 1 mm Dia. | 40.6% | 6.5% | 1095.8 | 0 | 319 | 2.7 |
| Test Example 22 | 75.0 | 5.5 | 14.0 | 360 | 5 | Noodles with 1 mm Dia. | 35.1% | 9.4% | 1425.7 | 0 | 477 | 3.5 |

FIG. 3B

Table 3 — Measurements for Composition Image Analysis with 200× Magnification of Frozen Section along Transverse Axis (Composition Heated at 90°C for 6 Min in Water)

| Table 3 | Starch Mass % (Dry Mass Basis) | Protein Mass % (Dry Mass Basis) | Insoluble Dietary Fiber Mass % (Dry Mass Basis) | D50 after Amylase/Protease & Ultrasonic Treatment μm | Dry Mass Basis Moisture Content Mass % | Composition Shape | CBB-Stained Sites with Degrees of Roundness of ≥ 0.3 and Areas of ≥ 200μm² — Number of Specific Stained Sites/Number of All Stained Sites % | Total Area of Specific Stained Sites/Total Viewing Area % | 90th Percentile Score of Areas of Stained Sites μm² | Number of Stained Sites with Largest Diameters of ≥ 200μm | CFW-Stained Sites — Average Largest Diameter μm | CFW-Stained Sites — Average Aspect Ratio |
|---|---|---|---|---|---|---|---|---|---|---|---|---|
| Test Example 23 | 80.0 | 6.8 | 6.7 | 4 | 5 | Noodles with 1 mm Dia. | 53.4% | 13.1% | 5474.4 | 0 | 10 | 1.2 |
| Test Example 24 | 70.0 | 6.6 | 18.0 | 186 | 5 | Noodles with 1 mm Dia. | 16.6% | 3.4% | 385.1 | 0 | 486 | 4.8 |
| Test Example 25 | 45.0 | 30.0 | 2.0 | 350 | 10.0 | Noodles with 1 mm Dia. | 40.8% | 17.8% | 3069.3 | 5 | 418 | 3.9 |
| Test Example 26 | 55 | 21.7 | 4.0 | 361 | 6 | Noodles with 1 mm Dia. | 41.9% | 13.5% | 2403.1 | 0 | 456 | 3.8 |
| Test Example 27 | 55.0 | 15.0 | 5.0 | 420 | 10.0 | Noodles with 1 mm Dia. | 23.7% | 5.2% | 3275.2 | 5 | 479 | 4.5 |
| Test Example 28 | 80.0 | 6.6 | 2.0 | 13 | 5 | Noodles with 1 mm Dia. | 3.8% | 1.8% | 154.1 | 0 | 19 | 1.7 |
| Test Example 29 | 70.0 | 9.4 | 2.6 | 10 | 5 | Noodles with 1 mm Dia. | 6.3% | 2.0% | 161.6 | 0 | 17 | 1.6 |
| Test Example 30 | 42.0 | 26.8 | 3.6 | 366 | 5 | Noodles with 1 mm Dia. | 10.3% | 2.6% | 775.8 | 5 | 504 | 3.8 |
| Test Example 31 | 22.6 | 44.6 | 19.6 | 360 | 8 | Noodles with 1 mm Dia. | 6.5% | 2.2% | 808.6 | 10 | 488 | 4.0 |
| Test Example 32 | 55.0 | 17.0 | 25.0 | 94 | 5 | Noodles with 2 mm Dia. | 7.2% | 1.6% | 775.5 | 0 | 167 | 2.1 |
| Test Example 33 | 39.9 | 25.1 | 14.0 | 80 | 5 | Noodles with 1 mm Dia. | 24.0% | 7.1% | 1292.4 | 0 | 148 | 2.2 |
| Test Example 34 | 55.0 | 21.7 | 16.2 | 69 | 5 | Noodles with 1 mm Dia. | 16.4% | 4.5% | 624.4 | 0 | 124 | 2.1 |
| Test Example 35 | 59.3 | 17.1 | 4.5 | 86 | 9.7 | Noodles with 1 mm Dia. | 24.1% | 9.1% | 796.7 | 0 | 188 | 2.2 |
| Test Example 36 | 50.2 | 17.7 | 7.5 | 19 | 5 | Noodles with 1 mm Dia. | 6.7% | 2.3% | 953.2 | 0 | 21 | 1.7 |
| Test Example 37 | 50.0 | 19.6 | 8.0 | 16 | 8 | Noodles with 1 mm Dia. | 12.5% | 2.6% | 1526.7 | 0 | 23 | 1.6 |
| Test Example 38 | 50.0 | 19.6 | 8.0 | 65 | 8 | Noodles with 2 mm Dia. | 10.5% | 1.8% | 1385.8 | 0 | 67 | 1.8 |
| Test Example 39 | 50.2 | 17.7 | 7.5 | 68 | 50 | Noodles with 1 mm Dia. | 13.2% | 2.4% | 1846.4 | 0 | 124 | 2.2 |
| Test Example 40 | 50.2 | 17.7 | 7.5 | 49 | 5 | Plates in 1mm x 10mm | 11.8% | 2.1% | 1744.6 | 21 | 80 | 1.9 |
| Test Example 41 | 55.0 | 17.0 | 25.0 | 10 | 5 | Noodles with 2 mm Dia. | 10.0% | 2.5% | 6332.6 | 0 | 13 | 1.6 |
| Test Example 42 | 55.0 | 17.0 | 25.0 | 69 | 5 | Noodles with 1 mm Dia. | 6.8% | 1.7% | 1184.6 | 0 | 105 | 2.0 |
| Test Example 43 | 55.0 | 17.0 | 25.0 | 78 | 5 | Noodles with 2 mm Dia. | 8.5% | 2.6% | 797.9 | 0 | 116 | 2.1 |
| Test Example 44 | 55.0 | 17.0 | 25.0 | 69 | 5 | Noodles with 2 mm Dia. | 9.6% | 3.0% | 576.2 | 0 | 110 | 2.2 |

FIG. 3C

Table 3

| | Starch Mass % (Dry Mass Basis) | Protein Mass % (Dry Mass Basis) | Insoluble Dietary Fiber Mass % (Dry Mass Basis) | D50 after Amylase/ Protease & Ultrasonic Treatment μm | Moisture Content Mass % | Composition Shape | Measurements for Composition Image Analysis with 200× Magnification of Frozen Section along Transverse Axis (Composition Heated at 90°C for 6 Min in Water) | | | | |
|---|---|---|---|---|---|---|---|---|---|---|---|
| | | | | | | | CBB-Stained Sites with Degrees of Roundness of ≥ 0.3 and Areas of ≥ 200μm² | | | CFW-Stained Sites | |
| | | | | | | | Number of Specific Stained Sites/ Number of All Stained Sites % | Total Area of Specific Stained Sites /Total Viewing Area % | 90th Percentile Score of Areas of Stained Sites μm² | Number of Stained Sites with Largest Diameters of ≥ 200μm | Average Largest Diameter μm | Average Aspect Ratio |
| Test Example45 | 50.2 | 17.7 | 7.5 | 21 | 5 | Noodles with 1 mm Dia. | 11.2% | 4.0% | 757.1 | 23 | 29 | 1.7 |
| Test Example46 | 50.2 | 17.7 | 7.5 | 13 | 5 | Noodles with 1 mm Dia. | 10.1% | 1.7% | 876.7 | 0 | 10 | 1.5 |
| Test Example47 | 50.2 | 23.4 | 7.5 | 32 | 5 | Noodles with 1 mm Dia. | 12.6% | 3.4% | 964.0 | 0 | 40 | 1.9 |
| Test Example48 | 50.2 | 17.7 | 15.5 | 162 | 5 | Noodles with 1 mm Dia. | 10.7% | 2.1% | 935.2 | 0 | 257 | 3.0 |
| Test Example49 | 50.2 | 17.7 | 7.5 | 9 | 5 | Noodles with 1 mm Dia. | 7.7% | 2.1% | 704.9 | 21 | 8 | 1.4 |
| Test Example50 | 50.2 | 17.7 | 7.5 | 30 | 5 | Noodles with 20 mm Dia. | 12.1% | 2.1% | 1275.0 | 0 | 29 | 1.7 |
| Test Example51 | 50.2 | 17.7 | 7.5 | 12 | 5 | Noodles with 1 mm Dia. | 14.1% | 1.9% | 2475.4 | 0 | 40 | 1.8 |
| Test Example52 | 50.2 | 17.7 | 7.5 | 48 | 5 | Noodles with 1 mm Dia. | 15.3% | 3.4% | 941.7 | 0 | 67 | 1.9 |
| Test Example53 | 50.2 | 17.7 | 7.5 | 149 | 5 | Noodles with 1 mm Dia. | 11.2% | 2.7% | 776.9 | 0 | 461 | 3.6 |
| Test Example54 | 50.2 | 17.7 | 7.5 | 23 | 5 | Noodles with 1 mm Dia. | 12.7% | 3.2% | 9949.9 | 23 | 82 | 2.2 |
| Test Example55 | 50.2 | 21.0 | 25.0 | 32 | 5 | Noodles with 1 mm Dia. | 13.3% | 3.0% | 971.0 | 0 | 49 | 2.1 |
| Test Example56 | 50.2 | 17.7 | 25.0 | 20 | 5 | Noodles with 1 mm Dia. | 7.5% | 0.8% | 1792.8 | 0 | 29 | 1.9 |
| Test Example57 | 50.2 | 17.7 | 7.5 | 16 | 5 | Noodles with 1 mm Dia. | 16.0% | 5.4% | 862.1 | 0 | 48 | 2.0 |
| Test Example58 | 50.2 | 17.7 | 7.5 | 23 | 5 | Noodles with 1 mm Dia. | 5.9% | 1.7% | 1337.9 | 0 | 67 | 2.2 |
| Test Example59 | 50.2 | 17.7 | 7.5 | 21 | 5 | Noodles with 1 mm Dia. | 7.7% | 2.8% | 1105.7 | 0 | 67 | 1.9 |
| Test Example60 | 50.2 | 17.7 | 7.5 | 19 | 5 | Noodles with 1 mm Dia. | 7.9% | 1.7% | 1211.1 | 0 | 15 | 1.5 |
| Test Example61 | 50.2 | 17.7 | 7.5 | 15 | 5 | Noodles with 20 mm Dia. | 3.8% | 1.0% | 161.0 | 31 | 28 | 2.2 |
| Test Example62 | 50.2 | 17.7 | 7.5 | 9 | 5 | Noodles with 20 mm Dia. | 5.6% | 1.5% | 356.2 | 0 | 26 | 1.8 |
| Test Example63 | 50.2 | 17.7 | 7.5 | 9 | 5 | Noodles with 20 mm Dia. | 8.9% | 3.5% | 1058.5 | 0 | 16 | 1.5 |
| Test Example64 | 50.2 | 17.7 | 7.5 | 8 | 5 | Noodles with 20 mm Dia. | 17.7% | 5.9% | 2671.4 | 0 | 15 | 1.5 |
| Test Example65 | 50.2 | 17.7 | 7.5 | 8 | 5 | Noodles with 20 mm Dia. | 25.6% | 10.6% | 3515.5 | 0 | 13 | 1.4 |

FIG. 3D

Table 3

| | | Starch | Protein | Insoluble Dietary Fiber | D50 after Amylase/ Protease & Ultrasonic Treatment | Dry Mass Basis Moisture Content | Composition Shape | Measurements for Composition — Image Analysis with 200x Magnification of Frozen Section along Transverse Axis (Composition Heated at 90°C for 6 Min in Water) | | | | CFW-Stained Sites | |
|---|---|---|---|---|---|---|---|---|---|---|---|---|---|
| | | | | | | | | CBB-Stained Sites with Degrees of Roundness of ≥ 0.3 and Areas of ≥ 200 μm² | | | | | |
| | | Mass % (Dry Mass Basis) | Mass % (Dry Mass Basis) | Mass % (Dry Mass Basis) | μm | Mass % | | Number of Specific Stained Sites/ Number of All Stained Sites % | Total Area of Specific Stained Sites /Total Viewing Area % | 90th Percentile Score of Areas of Stained Sites μm² | Number of Stained Sites with Largest Diameters of ≥ 200μm | Average Largest Diameter μm | Average Aspect Ratio |
| Comparative Example 1 | 1 | 90.0 | 0.0 | 2.0 | 15 | 6 | Noodles with 1 mm Dia. | 6.3% | 0.2% | 512.0 | 0 | 19 | 1.6 |
| Comparative Example 2 | 2 | 80 | 5.0 | 6.5 | 53 | 10 | Noodles with 1 mm Dia. | 14.0% | 0.2% | 419.9 | 0 | 67 | 1.8 |
| Comparative Example 3 | 3 | 13.0 | 75.0 | 5.0 | 32 | 6 | Noodles with 1 mm Dia. | 39.3% | 0.1% | 2350.0 | 3 | 48 | 1.8 |
| Comparative Example 4 | 4 | 66.5 | 33.0 | 5.5 | 13 | 15 | Noodles with 1 mm Dia. | 1.1% | 0.6% | 286.3 | 0 | 21 | 1.9 |
| Comparative Example 5 | 5 | 55 | 24.9 | 4.0 | 5 | 6 | Noodles with 1 mm Dia. | 1.4% | 0.5% | 145.9 | 0 | 6 | 1.3 |
| Comparative Example 6 | 6 | 64.1 | 11.6 | 1.2 | 860 | 5 | Noodles with 1 mm Dia. | 1.8% | 0.1% | 466.0 | 0 | 1079 | 9.0 |
| Comparative Example 7 | 7 | 80.4 | 0.2 | 4.1 | 554 | 6 | Noodles with 1 mm Dia. | 0.4% | 0.0% | 285.8 | 0 | 804 | 6.2 |
| Comparative Example 8 | 8 | 62.7 | 8.5 | 1.8 | 650 | 13 | Noodles with 5 mm Dia. | 5.3% | 0.0% | 760.0 | 0 | 990 | 6.8 |
| Comparative Example 9 | 9 | 50.2 | 17.7 | 7.5 | 52 | 5 | Noodles with 1 mm Dia. | 2.2% | 0.1% | 712.1 | 0 | 72 | 2.2 |
| Comparative Example 10 | 10 | 50.2 | 23.4 | 7.5 | 32 | 5 | Noodles with 1 mm Dia. | 1.8% | 0.3% | 711.6 | 0 | 53 | 2 |
| Comparative Example 11 | 11 | 50.2 | 17.7 | 14.0 | 236 | 5 | Noodles with 1 mm Dia. | 5.8% | 0.3% | 1552.0 | 0 | 359 | 3.8 |
| Comparative Example 12 | 12 | 50.2 | 17.7 | 7.5 | 11 | 5 | Noodles with 1 mm Dia. | 1.2% | 0.1% | 501.6 | 34 | 13 | 1.7 |
| Comparative Example 13 | 13 | 50.2 | 17.7 | 7.5 | 23 | 5 | Noodles with 1 mm Dia. | 0.9% | 0.0% | 689.8 | 0 | 29 | 1.8 |
| Comparative Example 14 | 14 | 50.2 | 17.7 | 7.5 | 751 | 5 | Noodles with 1 mm Dia. | 0.2% | 0.0% | 48545.5 | 0 | 695 | 5.5 |
| Comparative Example 15 | 15 | 50.2 | 17.7 | 7.5 | 25 | 5 | Noodles with 20 mm Dia. | 0.1% | 0.1% | 31.5 | 125 | 32 | 3.3 |
| Comparative Example 16 | 16 | 50.2 | 17.7 | 7.5 | 19 | 5 | Noodles with 20 mm Dia. | 0.2% | 0.1% | 38.6 | 101 | 30 | 3.1 |

FIG. 4A

Table 4

| | | Measurements for Composition | | | | | Sensory Evaluation | | | | |
|---|---|---|---|---|---|---|---|---|---|---|---|
| | | Image Analysis with 200× Magnification of Frozen Section along Longitudinal Axis (Composition Heated at 90°C for 6 Min in Water) | | | | | | | | | |
| | | CBB-Stained Sites with Degrees of Roundness of ≥ 0.3 and Areas of ≥ 200μm² | | 90th Percentile Score of Areas of Stained Sites μm² | Number of Stained Sites with Largest Diameters of ≥ 200μm | CFW-Stained Sites | | Elasticity | Texture that Passes Smoothly through the Teeth when Chewed | Ease of Biting Through | Overall Evaluation | Comments |
| | | Number of Specific Stained Sites/ Number of All Stained Sites % | Total Area of Specific Stained Sites /Total Viewing Area % | | | Average Largest Diameter μm | Average Aspect Ratio | | | | | |
| Test Example | 1 | 19.2% | 5.4% | 1160.7 | 0 | 15 | 1.6 | 5 | 4 | 4 | 5 | |
| Test Example | 2 | 14.7% | 3.9% | 922.8 | 0 | 41 | 1.6 | 5 | 4 | 4 | 5 | |
| Test Example | 3 | 23.0% | 7.6% | 820.6 | 0 | 44 | 2.5 | 4 | 4 | 4 | 4 | |
| Test Example | 4 | 24.2% | 9.7% | 1287.3 | 10 | 39 | 1.1 | 5 | 5 | 4 | 5 | |
| Test Example | 5 | 31.3% | 6.0% | 2699.8 | 0 | 95 | 1.3 | 5 | 5 | 5 | 5 | |
| Test Example | 6 | 15.4% | 3.2% | 839.0 | 0 | 103 | 1.7 | 4 | 5 | 5 | 4 | |
| Test Example | 7 | 13.0% | 1.9% | 1157.5 | 1 | 5 | 1.3 | 4 | 4 | 4 | 4 | |
| Test Example | 8 | 18.6% | 3.1% | 8474.8 | 25 | 598 | 5.4 | 5 | 5 | 4 | 5 | |
| Test Example | 9 | 21.0% | 2.6% | 2076.2 | 23 | 206 | 1.5 | 5 | 5 | 4 | 5 | |
| Test Example | 10 | 11.2% | 1.2% | 710.0 | 0 | 42 | 1.9 | 5 | 4 | 4 | 4 | |
| Test Example | 11 | 3.6% | 0.5% | 739.3 | 0 | 736 | 8.0 | 5 | 5 | 4 | 4 | |
| Test Example | 12 | 9.0% | 1.8% | 1101.6 | 0 | 111 | 2.0 | 5 | 4 | 4 | 5 | |
| Test Example | 13 | 34.3% | 9.2% | 912.5 | 0 | 36 | 1.8 | 4 | 5 | 5 | 5 | |
| Test Example | 14 | 25.3% | 2.4% | 2232.7 | 0 | 9 | 1.5 | 5 | 5 | 5 | 4 | |
| Test Example | 15 | 22.3% | 3.8% | 2038.1 | 0 | 82 | 2.1 | 5 | 5 | 5 | 5 | |
| Test Example | 16 | 10.3% | 3.5% | 331.5 | 0 | 179 | 2.4 | 5 | 5 | 5 | 4 | |
| Test Example | 17 | 28.0% | 5.1% | 2702.7 | 0 | 91 | 2.3 | 5 | 5 | 5 | 5 | |

FIG. 4B

Table 4

| | | Measurements for Composition Image Analysis with 200× Magnification of Frozen Section along Longitudinal Axis (Composition Heated at 90°C for 6 Min in Water) | | | | | Sensory Evaluation | | | | |
|---|---|---|---|---|---|---|---|---|---|---|---|
| | | CBB-Stained Sites with Degrees of Roundness of ≥ 0.3 and Areas of ≥ 200μm² | | 90th Percentile Score of Areas of Specific Stained Sites μm² | Number of Stained Sites with Largest Diameters of ≥ 200μm | CFW-Stained Sites | | Elasticity | Texture that Passes Smoothly through the Teeth when Chewed | Ease of Biting Through | Overall Evaluation | Comments |
| | | Number of Specific Stained Sites/ Number of All Stained Sites % | Total Area of Specific Stained Sites /Total Viewing Area % | | | Average Largest Diameter μm | Average Aspect Ratio | | | | | |
| Test Example | 18 | 24.4% | 8.6% | 921.9 | 0 | 83 | 2.1 | 5 | 5 | 5 | 5 | |
| Test Example | 19 | 34.0% | 8.4% | 2289.5 | 0 | 463 | 3.4 | 4 | 5 | 4 | 4 | |
| Test Example | 20 | 24.6% | 6.7% | 2775.3 | 0 | 171 | 2.2 | 4 | 5 | 4 | 4 | |
| Test Example | 21 | 47.6% | 10.0% | 1187.8 | 0 | 407 | 3.4 | 4 | 4 | 4 | 4 | |
| Test Example | 22 | 37.5% | 6.5% | 1182.4 | 0 | 273 | 2.0 | 4 | 4 | 4 | 4 | |
| Test Example | 23 | 39.0% | 7.8% | 1773.4 | 0 | 3 | 1.4 | 4 | 4 | 4 | 4 | |
| Test Example | 24 | 16.9% | 3.0% | 585.0 | 5 | 652 | 4.4 | 4 | 4 | 4 | 4 | |
| Test Example | 25 | 40.8% | 17.8% | 3069.3 | 0 | 418 | 3.9 | 4 | 4 | 4 | 4 | |
| Test Example | 26 | 45.5% | 14.7% | 3229.4 | 8 | 667 | 5.6 | 4 | 5 | 4 | 4 | |
| Test Example | 27 | 23.7% | 5.2% | 3275.2 | 3 | 479 | 4.5 | 4 | 5 | 4 | 4 | |
| Test Example | 28 | 5.1% | 1.6% | 184.2 | 0 | 20 | 1.8 | 4 | 5 | 4 | 4 | |
| Test Example | 29 | 5.4% | 1.7% | 168.1 | 0 | 15 | 1.8 | 4 | 5 | 5 | 5 | |
| Test Example | 30 | 11.0% | 2.1% | 825.6 | 8 | 433 | 3.3 | 4 | 5 | 5 | 5 | |
| Test Example | 31 | 9.5% | 1.6% | 673.9 | 6 | 296 | 2.4 | 5 | 5 | 5 | 5 | |
| Test Example | 32 | 7.8% | 1.6% | 801.6 | 0 | 173 | 2.2 | 5 | 5 | 5 | 5 | Good taste, with no bitterness in the broth |
| Test Example | 33 | 27.8% | 7.7% | 1400.8 | 0 | 174 | 2.6 | 5 | 5 | 5 | 5 | |
| Test Example | 34 | 12.4% | 3.9% | 958.9 | 0 | 164 | 2.8 | 5 | 5 | 5 | 5 | |

FIG. 4C

Table 4

| | Measurements for Composition | | | | | Sensory Evaluation | | | | |
|---|---|---|---|---|---|---|---|---|---|---|
| | Image Analysis with 200x Magnification of Frozen Section along Longitudinal Axis (Composition Heated at 90°C for 6 Min in Water) | | | | | | | | | |
| | CBB-Stained Sites with Degrees of Roundness of ≥ 0.3 and Areas of ≥ 200μm² | | 90th Percentile Score of Areas of Stained Sites | Number of Stained Sites with Largest Diameters of ≥ 200μm | CFW-Stained Sites | | Elasticity | Texture that Passes Smoothly through the Teeth when Chewed | Ease of Biting Through | Overall Evaluation | Comments |
| | Number of Specific Stained Sites / Number of All Stained Sites | Total Area of Specific Stained Sites / Total Viewing Area | | | Average Largest Diameter | Average Aspect Ratio | | | | | |
| | % | % | μm² | | μm | | | | | | |
| Test Example 35 | 24.1% | 9.1% | 796.7 | 0 | 188 | 2.2 | 4 | 5 | 4 | 4 | |
| Test Example 36 | 8.3% | 2.3% | 916.7 | 0 | 20 | 1.6 | 4 | 4 | 4 | 4 | |
| Test Example 37 | 23.2% | 7.4% | 853.3 | 0 | 36 | 2.5 | 5 | 5 | 5 | 5 | |
| Test Example 38 | 15.0% | 3.0% | 1632.4 | 0 | 131 | 3.5 | 5 | 5 | 5 | 5 | |
| Test Example 39 | 14.2% | 2.2% | 1256.8 | 0 | 77 | 1.9 | 5 | 5 | 5 | 5 | |
| Test Example 40 | 15.3% | 3.1% | 1360.3 | 23 | 92 | 2.2 | 5 | 5 | 5 | 5 | |
| Test Example 41 | 6.8% | 1.8% | 582.0 | 0 | 9 | 1.6 | 5 | 5 | 5 | 5 | Good taste, with no bitterness in the broth |
| Test Example 42 | 9.6% | 3.0% | 840.9 | 0 | 131 | 2.5 | 5 | 5 | 5 | 5 | |
| Test Example 43 | 11.8% | 3.5% | 802.0 | 0 | 157 | 2.8 | 5 | 5 | 5 | 5 | Good taste, with no bitterness in the broth |
| Test Example 44 | 12.2% | 3.2% | 638.3 | 0 | 130 | 2.6 | 5 | 5 | 5 | 5 | |
| Test Example 45 | 15.4% | 4.7% | 712.1 | 22 | 31 | 1.9 | 4 | 4 | 4 | 4 | |
| Test Example 46 | 7.7% | 2.2% | 971.7 | 0 | 14 | 2.2 | 5 | 5 | 5 | 5 | Good taste, with no bitterness in the broth |
| Test Example 47 | 18.3% | 5.6% | 863.8 | 0 | 59 | 2.8 | 5 | 5 | 5 | 5 | |
| Test Example 48 | 9.5% | 2.4% | 938.9 | 0 | 294 | 3.4 | 5 | 5 | 5 | 5 | |
| Test Example 49 | 9.2% | 1.4% | 963.8 | 21 | 7 | 1.3 | 5 | 5 | 4 | 5 | |
| Test Example 50 | 18.1% | 3.0% | 1759.1 | 0 | 56 | 3.4 | 5 | 5 | 5 | 5 | |
| Test Example 51 | 9.7% | 1.4% | 1131.5 | 0 | 13 | 1.3 | 4 | 5 | 4 | 4 | |

FIG. 4D

Table 4

| | | Measurements for Composition — Image Analysis with 200× Magnification of Frozen Section along Longitudinal Axis (Composition Heated at 90°C for 6 Min in Water) | | | | | Sensory Evaluation | | | | |
|---|---|---|---|---|---|---|---|---|---|---|---|
| | | CBB-Stained Sites with Degrees of Roundness of ≥ 0.3 and Areas of ≥ 200μm² | | 90th Percentile Score of Areas of Stained Sites | Number of Stained Sites with Largest Diameters of ≥ 200μm | CFW-Stained Sites | Elasticity | Texture that Passes Smoothly through the Teeth when Chewed | Ease of Biting Through | Overall Evaluation | Comments |
| | | Number of Specific Stained Sites/ Number of All Stained Sites | Total Area of Specific Stained Sites /Total Viewing Area | | | Average Largest Diameter | Average Aspect Ratio | | | | | |
| | | % | % | μm² | | μm | | | | | | |
| Test Example | 52 | 15.4% | 4.1% | 854.2 | 0 | 73 | 2.1 | 5 | 5 | 5 | 5 | |
| Test Example | 53 | 18.4% | 5.9% | 933.0 | 0 | 1261 | 9.4 | 5 | 5 | 5 | 5 | |
| Test Example | 54 | 14.0% | 4.1% | 864.4 | 24 | 96 | 2.6 | 5 | 5 | 5 | 5 | |
| Test Example | 55 | 12.4% | 3.1% | 887.8 | 0 | 47 | 2.0 | 5 | 5 | 5 | 5 | Good taste, with little bitterness in the broth |
| Test Example | 56 | 11.6% | 1.7% | 1190.6 | 0 | 40 | 2.7 | 5 | 5 | 5 | 5 | |
| Test Example | 57 | 12.2% | 3.3% | 1309.6 | 0 | 44 | 1.9 | 5 | 5 | 5 | 5 | |
| Test Example | 58 | 4.8% | 1.1% | 1287.8 | 0 | 41 | 2.0 | 5 | 5 | 5 | 5 | |
| Test Example | 59 | 7.2% | 0.8% | 1043.0 | 0 | 18 | 1.5 | 5 | 4 | 4 | 5 | |
| Test Example | 60 | 11.4% | 2.3% | 1399.7 | 0 | 24 | 2.3 | 5 | 5 | 4 | 5 | |
| Test Example | 61 | 3.4% | 1.1% | 161.0 | 33 | 15 | 2.9 | 4 | 3 | 3 | 3 | |
| Test Example | 62 | 6.9% | 1.2% | 329.2 | 10 | 9 | 1.9 | 4 | 4 | 4 | 4 | |
| Test Example | 63 | 9.6% | 2.9% | 1548.3 | 0 | 6 | 1.3 | 5 | 5 | 5 | 5 | |
| Test Example | 64 | 19.9% | 6.9% | 2514.8 | 0 | 6 | 1.3 | 5 | 5 | 5 | 5 | |
| Test Example | 65 | 29.5% | 11.4% | 3415.0 | 0 | 3 | 1.2 | 5 | 5 | 5 | 5 | |
| Comparative Example | 1 | 15.7% | 0.8% | 841.0 | 0 | 125 | 10.5 | 5 | 1 | 1 | 1 | |
| Comparative Example | 2 | 10.0% | 0.5% | 402.9 | 0 | 160 | 4.3 | 2 | 2 | 1 | 2 | |
| Comparative Example | 3 | 14.5% | 0.6% | 1227.9 | 5 | 149 | 5.6 | 5 | 4 | 4 | 3 | |

FIG. 4E

Table 4

| | | Measurements for Composition — Image Analysis with 200× Magnification of Frozen Section along Longitudinal Axis (Composition Heated at 90°C for 6 Min in Water) | | | | | Sensory Evaluation | | | | |
|---|---|---|---|---|---|---|---|---|---|---|---|
| | | CBB-Stained Sites with Degrees of Roundness of ≥ 0.3 and Areas of ≥ 200μm² | | 90th Percentile Score of Areas of Stained Sites μm² | Number of Stained Sites with Largest Diameters of ≥ 200μm | CFW-Stained Sites | | Elasticity | Texture that Passes Smoothly through the Teeth when Chewed | Ease of Biting Through | Overall Evaluation | Comments |
| | | Number of Specific Stained Sites/ Number of All Stained Sites % | Total Area of Specific Stained Sites /Total Viewing Area % | | | Average Largest Diameter μm | Average Aspect Ratio | | | | | |
| Comparative Example 4 | 1.5% | 0.4% | 265.4 | 0 | 13 | 1.2 | 5 | 1 | 2 | 3 | |
| Comparative Example 5 | 1.1% | 0.4% | 134.7 | 0 | 4 | 1.0 | 5 | 2 | 2 | 2 | |
| Comparative Example 6 | 1.8% | 0.1% | 468.0 | 0 | 1079 | 9.0 | 2 | 4 | 5 | 4 | |
| Comparative Example 7 | 0.2% | 0.0% | 223.2 | 0 | 628 | 4.8 | 5 | 1 | 1 | 1 | |
| Comparative Example 8 | 2.1% | 0.0% | 156.5 | 0 | 204 | 1.4 | 3 | 1 | 3 | 1 | |
| Comparative Example 9 | 2.9% | 0.0% | 463.3 | 0 | 47 | 1.4 | 1 | 1 | 4 | 1 | |
| Comparative Example 10 | 2.4% | 0.2% | 821.6 | 0 | 41 | 1.5 | 2 | 2 | 3 | 2 | Unsuitable for eating, with bitterness in the broth |
| Comparative Example 11 | 5.3% | 0.2% | 462.3 | 0 | 71 | 0.8 | 2 | 3 | 3 | 2 | |
| Comparative Example 12 | 1.4% | 0.1% | 805.2 | 36 | 21 | 2.7 | 3 | 2 | 3 | 2 | |
| Comparative Example 13 | 2.1% | 0.1% | 730.5 | 0 | 30 | 1.9 | 3 | 2 | 4 | 3 | |
| Comparative Example 14 | 0.200% | 0.100% | 244049.6 | 0 | 994 | 7.9 | 1 | 1 | 1 | 1 | Pulsating and unstable during extrusion, difficult to manufacture. Non-uniform composition surface. |
| Comparative Example 15 | 0.1% | 0.1% | 31.22 | 115 | 33 | 4.9 | 1 | 1 | 1 | 1 | |
| Comparative Example 16 | 0.2% | 0.1% | 36.5 | 95 | 23 | 3.9 | 2 | 1 | 1 | 1 | |

FIG. 5A

Table 5

| | | Observation of 6% Suspension of Crushed Composition at 200x magnification | Sensory Evaluation | Absorbance Difference Iodine Staining (500nm, 20°C, 3min, filtered with 0.20μm) | | Sensory Evaluation | Analysis of 1% Glucoamylase Reaction Solution (10 mass% Sample, 20°C, 2H Treatment) | | Sensory Evaluation |
|---|---|---|---|---|---|---|---|---|---|
| | | Number of Starch Grain Structures in the View | Rough Texture | Non-crushed Composition | Crushed Composition | Stickiness of Composition Surface | Glucose Content in Reaction Solution with Composition | Ratio of Glucose Content (Reaction with Non-crushed Composition / Reaction with Crushed Composition) | Surface Smoothness |
| | | | | | | | Mass % | % | |
| Test Example | 30 | 0 | 5 | 0.11 | 0.16 | 5 | 2.15 | 41.0 | 4 |
| Test Example | 31 | 0 | 5 | 0.12 | 0.19 | 5 | 2.35 | 45.0 | 3 |
| Test Example | 41 | 0 | 5 | 0.56 | 0.88 | 4 | 0.91 | 45.0 | 4 |
| Test Example | 42 | 0 | 5 | 0.10 | 0.16 | 5 | 0.56 | 30.0 | 5 |
| Test Example | 43 | 0 | 5 | 0.09 | 0.31 | 5 | | | |
| Test Example | 44 | 0 | 5 | 0.07 | 0.15 | 5 | 0.45 | 24.0 | 5 |
| Test Example | 47 | 0 | 5 | 0.23 | 0.27 | 5 | 1.19 | 45.0 | 5 |
| Test Example | 49 | 0 | 5 | 0.12 | 0.23 | 5 | | | |
| Test Example | 50 | 0 | 5 | 0.32 | 1.12 | 4 | | | |
| Test Example | 51 | 0 | 4 | 0.41 | 1.27 | 3 | | | |
| Test Example | 52 | 0 | 5 | 0.09 | 0.34 | 5 | | | |
| Test Example | 53 | 0 | 5 | 0.19 | 0.45 | 5 | | | |
| Test Example | 54 | 0 | 4 | 0.14 | 0.45 | 5 | | | |
| Test Example | 55 | 0 | 5 | 0.11 | 0.30 | 5 | 0.59 | 30.0 | 5 |
| Test Example | 56 | 0 | 5 | 0.36 | 0.22 | 4 | 1.59 | 47.8 | 4 |
| Test Example | 57 | 0 | 5 | 0.13 | 0.16 | 5 | 0.30 | 20.0 | 5 |
| Test Example | 58 | 0 | 5 | 0.16 | 0.24 | 5 | | | |
| Test Example | 59 | 0 | 5 | 0.21 | 0.25 | 5 | | | |
| Test Example | 60 | 0 | 5 | 0.18 | 0.19 | 5 | | | |

FIG. 5B

Table 5

| | | Observation of 6% Suspension of Crushed Composition at 200x magnification | Sensory Evaluation | Absorbance Difference Iodine Staining (500nm, 20°C, 3min, filtered with 0.20μm) | | Sensory Evaluation | Analysis of 1% Glucoamylase Reaction Solution (10 mass% Sample, 20° C, 2H Treatment) | | Sensory Evaluation |
|---|---|---|---|---|---|---|---|---|---|
| | | Number of Starch Grain Structures in the View | Rough Texture | Non-crushed Composition | Crushed Composition | Stickiness of Composition Surface | Glucose Content in Reaction Solution with Composition | Ratio of Glucose Content (Reaction with Non-crushed Composition / Reaction with Crushed Composition) | Surface Smoothness |
| | | | | | | | Mass % | % | |
| Test Example | 61 | 0 | 5 | 0.69 | 0.98 | 3 | 2.25 | 49.0 | 3 |
| Test Example | 62 | 0 | 5 | 0.38 | 0.51 | 4 | 1.01 | 45.0 | 4 |
| Test Example | 63 | 0 | 5 | 0.09 | 0.13 | 5 | 0.81 | 32.0 | 5 |
| Test Example | 64 | 0 | 5 | 0.06 | 0.09 | 5 | 0.35 | 25.0 | 5 |
| Test Example | 65 | 0 | 5 | 0.05 | 0.08 | 5 | 0.19 | 20.0 | 5 |
| Comparative Example | 9 | >1000 | 1 | 0.56 | 1.50 | 3 | | | |
| Comparative Example | 10 | >1000 | 1 | 0.15 | -0.03 | 5 | 2.50 | 60.0 | 1 |
| Comparative Example | 11 | >1000 | 1 | 0.14 | 0.01 | 5 | | | |
| Comparative Example | 12 | 470 | 3 | 0.45 | 0.89 | 4 | | | |
| Comparative Example | 13 | 105 | 3 | 0.20 | 0.55 | 5 | 1.09 | 55.0 | 3 |
| Comparative Example | 14 | 0 | | | | 1 | | | |
| Comparative Example | 15 | 450 | 2 | 1.68 | 1.98 | 1 | 2.90 | 56.0 | 1 |
| Comparative Example | 16 | 325 | 2 | 1.36 | 1.69 | 2 | 2.50 | 52.0 | 1 |
| Referential Example | 1 | 0 | 5 | 0.54 | 1.40 | 2 | 0.49 | 60.0 | 3 |
| Referential Example | 2 | 352 | 2 | 0.71 | 1.3 | 2 | | | |
| Referential Example | 3 | 0 | 4 | 0.76 | 1.87 | 1 | | | |
| Referential Example | 4 | 0 | 4 | 0.87 | 1.89 | 2 | | | |
| Referential Example | 5 | 0 | 4 | 0.79 | 1.23 | 2 | | | |
| Referential Example | 6 | 0 | 4 | 0.74 | 1.34 | 2 | | | |
| Referential Example | 7 | 0 | 4 | 0.91 | 1.50 | 1 | | | |

FIG. 6A

Table 6

| | | Image Analysis with 200x magnification of Frozen Section (Dried Composition) | | | | | | | Sensory Evaluation | | Soluble Amino Acids | | | | |
|---|---|---|---|---|---|---|---|---|---|---|---|---|---|---|---|
| | | Frozen Section along Transverse Axis | | | Frozen Section along Longitudinal Axis | | | | Fragrance after Storage (15min) | Soluble GABA (Composition) | Soluble GABA (Composition)/ All Soluble Amino Acids (Composition) | Soluble GABA (Composition)/ Soluble GABA (Raw Material before Processing) | Soluble LEU (Composition) | Soluble LEU (Composition)/ All Soluble Amino Acids (Composition) | Soluble LEU (Composition)/ Soluble LEU (Raw Material before Processing) |
| | Average Thickness of Smooth Tissue Part | Presence of CBB-Stained Sites in Smooth Tissue Part | Smooth Tissue Part/ Composition Perimeter | Average Crystallinity | | Average Thickness of Smooth Tissue Part | Presence of CBB-Stained Sites in Smooth Tissue Part | Smooth Tissue Part/ Composition Perimeter | | | | | | | |
| | | | | Comparison of Crystallinity | Crystallinity Ratio (Non-smooth Tissue Part /Smooth Tissue Part) | | | | | | | | | | |
| | μm | | % | | | μm | | % | | mg% | % | % | mg% | % | % |
| Test Example 30 | 25 | CBB-Stained Sites Observed in Smooth Tissue Part | 90 | Smooth Tissue Part < Non-smooth Tissue Part (Center of Composition) | 1.5 | 29 | CBB-Stained Sites Observed in Smooth Tissue Part | 50 | 4 | | | | | | |
| Test Example 31 | 19 | CBB-Stained Sites Observed in Smooth Tissue Part | 80 | Smooth Tissue Part < Non-smooth Tissue Part (Center of Composition) | 1.1 | 19 | CBB-Stained Sites Observed in Smooth Tissue Part | 50 | 3 | | | | | | |
| Test Example 42 | 87 | CBB-Stained Sites Observed in Smooth Tissue Part | 100 | Smooth Tissue Part < Non-smooth Tissue Part (Center of Composition) | 15.2 | 85 | CBB-Stained Sites Observed in Smooth Tissue Part | 50 | 5 | 1.1 | 0.4 | 4 | 1.0 | 0.3 | 12 |
| Test Example 44 | 80 | CBB-Stained Sites Observed in Smooth Tissue Part | 100 | Smooth Tissue Part < Non-smooth Tissue Part (Center of Composition) | 1.3 | 79 | CBB-Stained Sites Observed in Smooth Tissue Part | 50 | 5 | 2.4 | 0.4 | 8 | 5.5 | 0.8 | 34 |
| Test Example 47 | 66 | CBB-Stained Sites Observed in Smooth Tissue Part | 90 | Smooth Tissue Part < Non-smooth Tissue Part (Center of Composition) | Peak Found in Non-smooth Tissue Part, No Peak Found in Smooth Tissue Part | 62 | CBB-Stained Sites Observed in Smooth Tissue Part | 40 | 4 | 2.7 | 0.4 | 17 | 5.2 | 0.8 | 36 |
| Test Example 55 | 79 | CBB-Stained Sites Observed in Smooth Tissue Part | 100 | Smooth Tissue Part < Non-smooth Tissue Part (Center of Composition) | 4.2 | 73 | CBB-Stained Sites Observed in Smooth Tissue Part | 50 | 5 | 10.4 | 1.0 | 7 | 8.0 | 0.7 | 24 |
| Test Example 57 | 121 | CBB-Stained Sites Observed in Smooth Tissue Part | 100 | Smooth Tissue Part < Non-smooth Tissue Part (Center of Composition) | 2 | 121 | CBB-Stained Sites Observed in Smooth Tissue Part | 50 | 5 | | | | | | |
| Test Example 61 | 19 | CBB-Stained Sites Observed in Smooth Tissue Part | 80 | Smooth Tissue Part < Non-smooth Tissue Part (Center of Composition) | 1.1 | 15 | CBB-Stained Sites Observed in Smooth Tissue Part | 50 | 3 | | | | | | |
| Test Example 62 | 32 | CBB-Stained Sites Observed in Smooth Tissue Part | 100 | Smooth Tissue Part < Non-smooth Tissue Part (Center of Composition) | 2.0 | 35 | CBB-Stained Sites Observed in Smooth Tissue Part | 50 | 4 | | | | | | |

FIG. 6B

Table 6: Image Analysis with 200x magnification of Frozen Section (Dried Composition) / Sensory Evaluation / Soluble Amino Acids

| Table 6 | Frozen Section along Transverse Axis | | | | Frozen Section along Longitudinal Axis | | | Sensory Evaluation | Soluble Amino Acids | | | | | |
|---|---|---|---|---|---|---|---|---|---|---|---|---|---|---|
| | Average Thickness of Smooth Tissue Part (μm) | Presence of CBB-Stained Sites in Smooth Tissue Part | Smooth Tissue Part/ Composition Perimeter (%) | Average Crystallinity | | Average Thickness of Smooth Tissue Part (μm) | Presence of CBB-Stained Sites in Smooth Tissue Part | Smooth Tissue Part/ Composition Perimeter (%) | Fragrance after Storage (15min) | Soluble GABA (Composition) (mg%) | Soluble GABA (Composition)/ Soluble All Amino Acids (Composition) (%) | Soluble GABA (Composition)/ Soluble GABA (Raw Material before Processing) (%) | Soluble LEU (Composition) (mg%) | Soluble LEU (Composition)/ Soluble All Amino Acids (Composition) (%) | Soluble LEU (Composition)/ Soluble LEU (Raw Material before Processing) (%) |
| | | | | Comparison of Crystallinity | Crystallinity Ratio (Non-smooth Tissue Part / Smooth Tissue Part) | | | | | | | | | | |
| Test Example 63 | 85 | CBB-Stained Sites Observed in Smooth Tissue Part | 100 | Smooth Tissue Part < Non-smooth Tissue Part (Center of Composition) | 15.2 | 112 | CBB-Stained Sites Observed in Smooth Tissue Part | 50 | 5 | 28.8 | 4.2 | 60 | 11.8 | 1.7 | 65 |
| Test Example 64 | 125 | CBB-Stained Sites Observed in Smooth Tissue Part | 100 | Smooth Tissue Part < Non-smooth Tissue Part (Center of Composition) | 1.3 | 135 | CBB-Stained Sites Observed in Smooth Tissue Part | 50 | 5 | - | - | - | - | - | - |
| Test Example 65 | 165 | CBB-Stained Sites Observed in Smooth Tissue Part | 100 | Smooth Tissue Part < Non-smooth Tissue Part (Center of Composition) | 1.3 | 165 | CBB-Stained Sites Observed in Smooth Tissue Part | 50 | 5 | - | - | - | - | - | - |
| Comparative Example 10 | None | - | 0 | - | - | None | - | 0 | 1 | - | - | - | - | - | - |
| Comparative Example 13 | 20 | CBB-Stained Sites Observed in Smooth Tissue Part | 50 | N.A. (Crystallinity in Smooth Tissue Part = 0) | - | 24 | CBB-Stained Sites Observed in Smooth Tissue Part | 20 | 3 | - | - | - | - | - | - |
| Comparative Example 15 | None | - | 0 | - | - | None | - | 0 | 1 | - | - | - | - | - | - |
| Comparative Example 16 | None | - | 0 | - | - | None | - | 0 | 1 | - | - | - | - | - | - |
| Referential Example 2 | None | - | 0 | - | - | None | - | 0 | 1 | - | - | - | - | - | - |

SOLID PASTE COMPOSITION FOR COOKING AND METHOD FOR PRODUCING SAME

TECHNICAL FIELD

One or more embodiments of the present invention relate to a solid paste composition for heat cooking and a method of producing the composition.

BACKGROUND

There are a wide variety of solid paste compositions for cooking all over the world, which are made from various raw materials such as cereal flour and starch, by kneading the material with water and salts into a dough, which is then made into various shapes. They are commonly in elongated shapes (e.g., pasta- and noodle-like foods), but some are there are also made into other shapes such as strips, plates, reeds, tubes, dumplings, grains, etc.

Such solid paste compositions for cooking, whether in raw or dried form, are eaten after heat cooking. It is known that the texture derived from the composition structure plays an important role in preference. Conventional solid paste compositions for heat cooking are known to have a unique texture due to their protein network structure such as gluten, as explained in Patent Literature 1.

PATENT LITERATURE

[Patent Literature 1] JP 2017-055672 A

However, the composition described in Patent Document 1 is difficult to adjust the fine texture, since its gluten network structure is uniformly formed throughout the composition. Therefore, it cannot be served for patients with gluten-unreceptive diseases. On the other hand, the conventional starch-based solid paste compositions for heat cooking becomes highly elastic and imparted a rubbery texture when its surface is hardened to enhance its crunchiness.

SUMMARY

One or more embodiments of the present invention provide a solid paste composition for heat cooking that has elasticity with less rubbery texture, and exhibits a texture that passes smoothly through the teeth when chewed, as well as a method for producing the composition.

Through intensive efforts in view of these circumstances, the inventors focused on the effects of protein, insoluble dietary fiber, and starch derived from edible plants, to which no attention was given in the conventional art, and found that a solid paste composition for heat cooking can be obtained by adjusting each of these parameters to within a range when producing the paste, and also forming CBB-stained structures with specific shapes inside the composition. In addition, the inventors focused on kneading of the dough composition with strong energy under high-temperature and high-pressure conditions, which are not typically employed in the conventional art by those skilled in the art since such conditions may denature gluten contained in wheat, etc., and found that the solid paste composition for heat cooking mentioned above can be produced according to a simple method by processing edible plant-derived raw materials under specific conditions. Based on these findings, the inventors then proceeded with further research, and have completed the following inventions.

Specifically, aspects of one or more embodiments of the present invention include Aspects [1] to [44] below.

[Aspect 1]
A solid paste composition for heat cooking satisfying the requirements (1) to (4) below.
(1) The composition has an insoluble dietary fiber content of 2.0 mass % or more in terms of dry mass basis.
(2) The composition has a starch content of 15 mass % or more in terms of dry mass basis.
(3) The composition has a protein content of 5.5 mass % or more in terms of dry mass basis.
(4) When at least one frozen section A of the composition prepared under [Condition A] below is subjected to CBB (Coomassie Brilliant Blue) staining and observed, at least either (4a) or (4b) is satisfied.
(4a) The ratio of [the number of CBB-stained sites having areas of 200 $\mu m^2$ or more and degree of roundness of 0.3 or more] to [the number of CBB-stained sites having areas of 30 $\mu m^2$ or more] is 3% or more.
(4b) The ratio of [the total area of CBB-stained sites having areas of 200 $\mu m^2$ or more and degrees of roundness of 0.3 or more] to [the total section area of the composition] is 0.3% or more.
[Condition A] The composition is heated in water at 90° C. for 6 minutes and then frozen at −25° C., and the frozen composition is cut along a certain cut plane A into a section having a thickness of 30 μm, which section is used as a frozen composition section A.

[Aspect 2]
The composition according to Aspect 1, wherein when the frozen composition section A is subjected to CBB staining and observed, the section further satisfies the at least either (4c) or (4d).
(4c) The area corresponding to the 90th percentile score in the CBB-stained sites having areas of 30 $\mu m^2$ or more is 3500 $\mu m^2$ or less.
(4d) The number of CBB-stained sites having longest diameters of 200 μm or more is 40 or less.

[Aspect 3]
The composition according to Aspect 1 or 2, wherein when the frozen composition section A is subjected to CFW (Calcofluor-white) staining and observed, the section further satisfies the at least either (5a) or (5b).
(5a) The average of the longest diameters of CFW-stained sites is 450 μm or less.
(5b) The average of the aspect ratios of CFW-stained sites is 5.0 or less.

[Aspect 4]
The composition according to any one of Aspects 1 to 3, wherein the frozen composition section A is a frozen composition section A1, which is obtained along a cut plane A1 orthogonal to the longitudinal axis of the composition.

[Aspect 5]
The composition according to any one of Aspects 1 to 3, wherein the frozen composition section A comprises a frozen composition section A1, which is obtained along a cut plane A1 orthogonal to the longitudinal axis of the composition, and a frozen composition section A2, which is obtained along a cut plane A2 parallel to the longitudinal axis of the composition.

[Aspect 6]
The composition according to any one of Aspects 1 to 5, wherein when at least one frozen composition section B prepared under [Condition B] below is measured by the X-ray diffraction method, the average crystallinity at the center of the composition section is higher than the average crystallinity at the periphery of the composition section.

[Condition B] The composition is frozen at −25° C., and the frozen composition is cut along a certain cut plane B into a section having a thickness of 30 μm, which section is observed as a frozen composition section B.

[Aspect 7]

The composition according to any one of Aspects 1 to 5, wherein when at least one frozen composition section B prepared under [Condition B] below is subjected to CBB staining and observed, a smooth tissue part with an average thickness of 20 μm or more is found along 30% or more of the perimeter of the composition section on the cut plane B.

[Condition B] The composition is frozen at −25° C., and the frozen composition is cut along a certain cut plane B into a section having a thickness of 30 μm, which section is observed as a frozen composition section B.

[Aspect 8]

The composition according to Aspect 7, wherein when the frozen composition section B is subjected to CBB staining and observed, the ratio of [the number of CBB-stained sites area 200 μm$^2$ or more and degrees of roundness of 0.3 or more in the smooth tissue part on the cut plane B] to [the number of CBB-stained sites having areas of 30 μm$^2$ or more in the smooth tissue part on the cut plane B] is 3% or more.

[Aspect 9]

The composition according to Aspect 7 or 8, wherein when the frozen composition section B is measured by the X-ray diffraction method, the average crystallinity in the non-smooth tissue part, which exists inside of the smooth tissue part of the composition, is higher than the average crystallinity in the smooth tissue part.

[Aspect 10]

The composition according to any one of Aspects 6 to 9, wherein the frozen composition section B is a frozen composition section B1, which is obtained along a cut plane B1 orthogonal to the longitudinal axis of the composition.

[Aspect 11]

The composition according to any one of Aspects 6 to 9, wherein the frozen composition section B comprises a frozen composition section B1, which is obtained along a cut plane B1 orthogonal to the longitudinal axis of the composition, and a frozen composition section B2, which is obtained along a cut plane B2 parallel to the longitudinal axis of the composition.

[Aspect 12]

The composition according to any one of Aspects 1 to 11, wherein when a 6% suspension of a crushed product of the composition is observed, the number of starch grain structures observed is 300/mm$^2$ or less.

[Aspect 13]

The composition according to any one of Aspects 1 to 12, further satisfying one or more of (6a) to (6d).

(6a) The content of soluble γ-amino butyric acid in the composition is 25 mg % or less.

(6b) The ratio of the soluble γ-amino butyric acid content to the total content of soluble proteinogenic amino acids in the composition is 1.5 mass % or less.

(6c) The content of soluble leucine in the composition is 10 mg % or less.

(6d) The ratio of the soluble leucine content to the total content of soluble proteinogenic amino acids in the composition is 1.0 mass % or less.

[Aspect 14]

The composition according to any one of Aspects 1 to 13, further satisfying at least either (7a) or (7b).

(7a) When one mass part of the composition is immersed in 9 mass parts of iodine solution (0.25 mM) at 20° C. for 3 minutes and filtered through a 0.20 μm filter, the difference in absorbance (500 nm) of the iodine solution is 0.70 or less.

(7b) When one mass part of the composition is immersed in 9 mass parts of iodine solution (0.25 mM) at 20° C. for 3 minutes and filtered through a 0.20 μm filter and the filtrate stained with iodine (final concentration 0.25 mM), the difference in absorbance (500 nm) of the iodine solution is 1.2 or less.

[Aspect 15]

The composition according to any one of Aspects 1 to 14, further satisfying at least either (8a) or (8b).

(8a) When one mass part of the composition is treated in 9 mass parts of 1% glucoamylase aqueous solution at 20° C. for 2 hours, the glucose content in the resulting reaction solution is less than 2.40 mass %.

(8b) When one mass part of the composition is treated in 9 mass parts of 1% glucoamylase aqueous solution at 20° C. for 2 hours, the glucose content in the resulting reaction solution is 50% or less of a glucose content in a reaction solution prepared by treating one mass part of a crushed product of the composition in 9 mass parts of 1% glucoamylase aqueous solution at 20° C. for 2 hours.

[Aspect 16]

The composition according to any one of Aspects 1 to 15, further satisfying at least either (9a) or (9b).

(9a) When the composition is subjected to [Treatment C] below and then to ultrasonic treatment, the particle size distribution $d_{50}$ of the resulting product is 450 μm or less.

(9b) When the composition is subjected to [Treatment C] below and then to CFW (Calcofluor-white) staining and observed under fluorescence microscope, the average of the longest diameters of CFW-stained sites is 450 μm or less.

[Treatment C] 6 mass % water suspension of the composition is treated with 0.4 volume % of protease and 0.02 mass % of α-amylase at 20° C. for 3 days.

[Aspect 17]

The composition according to any one of Aspects 1 to 16, comprising at least one edible plant as a raw material and further satisfying at least either (10a) or (10b).

(10a) The ratio of the starch content derived from the edible plant to the total starch content in the composition is 50 mass % or more in terms of dry mass basis.

(10b) The ratio of the protein content derived from the edible plant to the total protein content in the composition is 50 mass % or more in terms of dry mass basis.

[Aspect 18]

The composition according to Aspect 17, wherein the edible plant is a dried edible plant with a dry mass basis moisture content of less than 25 mass %.

[Aspect 19]

The composition according to Aspect 17 or 18, wherein the edible plant is a pulse.

[Aspect 20]

The composition according to Aspect 19, wherein the pulse is one or more species of pulse selected from *Pisum*, *Phaseolus*, *Cajanus*, *Vigna*, *Vicia*, *Cicer*, *Glycine* and *Lens* species.

[Aspect 21]

The composition according to Aspect 19 or 20, wherein the pulse is in the form of pulse flour with a particle size $d_{90}$ of 500 μm or less after subjected to ultrasonic treatment.

[Aspect 22]
The composition according to any one of Aspects 19 to 21, wherein the ratio of the starch content derived from pulse to the total starch content in the composition is 50 mass % or more in terms of dry mass basis.

[Aspect 23]
The composition according to any one of Aspects 1 to 22, which is not in the form of a swollen product.

[Aspect 24]
The composition according to any one of Aspects 1 to 23, which has a total oil and fat content of less than 17 mass % in terms of dry mass basis.

[Aspect 25]
The composition according to any one of Aspects 1 to 24, which has a dry mass basis moisture content of 60 mass % or less.

[Aspect 26]
A crushed composition prepared by crushing a composition according to any one of Aspects 1 to 25.

[Aspect 27]
A crushed composition agglomerate prepared by agglomerating a crushed composition according to Aspect 26.

[Aspect 28]
A process of producing a solid paste composition for heat cooking according to any one of Aspects 1 to 25, comprising the steps of:
(i) preparing a paste dough composition having an insoluble dietary fiber content of 1.5 mass % or more in terms of wet basis, a starch content of 5.0 mass % or more in terms of wet basis, a protein content of 3.0 mass % or more in terms of wet basis, and a dry mass basis moisture content of 25 mass % or more;
(ii) kneading the composition prepared in step (i) at a temperature of from 100° C. to 200° C. with a specific mechanical energy (SME) of 350 kJ/kg or more; and
(iii) cooling the composition kneaded in step (ii) to a temperature at which a temperature at which the composition does not swell.

[Aspect 29]
The process according to Aspect 28, wherein the paste dough composition in step (i) is prepared at least using pulse.

[Aspect 30]
The process according to Aspect 29, wherein the ratio of the content of starch derived from pulse to the total starch content in the dough composition prepared in step (i) is 50 mass % or more in terms of dry mass basis.

[Aspect 31]
The process according to Aspect 29 or 30, wherein the pulse used in step (i) is in the form of pulse flour with a particle size $d_{90}$ of 500 μm or less after subjected to ultrasonic treatment.

[Aspect 32]
The process according to Aspect 31, wherein the pulse flour used in step (i) satisfies at least either (11a) or (11b).
(11a) When the pulse flour is subjected to [Treatment D] below and then to ultrasonic treatment, the particle size distribution $d_{50}$ of the resulting flour is 450 μm or less.
(11b) When the pulse flour is subjected to [Treatment D] below and then to CFW (Calcofluor-white) staining and observed under fluorescence microscope, the average of the longest diameters of CFW-stained sites of the resulting flour is 450 μm or less.
[Treatment D] 6 mass % water suspension of the pulse flour is treated with 0.4 volume % of protease and 0.02 mass % of α-amylase at 20° C. for 3 days.

[Aspect 33]
The process according to any one of Aspects 28 to 32, wherein the kneading in step (ii) is carried out under a pressurized condition of 0.1 MPa or more.

[Aspect 34]
The process according to any one of Aspects 28 to 33, wherein the kneading in step (ii) is carried out until the soluble γ-amino butyric acid content in the composition decreases to 50 mass % or less of the soluble γ-amino butyric acid content in the composition before step (ii).

[Aspect 35]
The process according to any one of Aspects 28 to 34, wherein the kneading in step (ii) is carried out until the soluble leucine content in the composition decreases to 50 mass % or less of the soluble leucine content in the composition before step (ii).

[Aspect 36]
The process according to any one of Aspects 28 to 35, wherein the kneading in step (ii) is carried out for a period of from 0.1 to 60 minutes.

[Aspect 37]
The process according to any one of Aspects 28 to 36, wherein the composition in step (iii) is cooled to 95° C. or less.

[Aspect 38]
The process according to any one of Aspects 28 to 37, wherein the kneading in step (ii) and/or the cooling in step (iii) are/is carried out using an extruder.

[Aspect 39]
The process according to Aspect 38, wherein the extruder is a uniaxial extruder or a biaxial extruder.

[Aspect 40]
The process according to any one of Aspects 28 to 39, wherein the ratio of the length of a flight screw part to the total length of a barrel of the extruder is 95% or less.

[Aspect 41]
The process according to any one of Aspects 28 to 40, further comprising, after step (iii):
(iv) maintaining the composition after the cooling in step (iii) at a temperature at which the composition does not swell in an atmosphere with a dry mass basis moisture content of 25 mass % or more for 0.02 hours or more.

[Aspect 42]
The process according to any one of Aspects 28 to 41, further comprising, after step (iii):
(v) crushing the composition to produce a crushed composition.

[Aspect 43]
The process according to Aspect 42, further comprising, after step (v):
(vi) agglomerating the crushed composition to prepare a crushed composition agglomerate.

[Aspect 44]
A solid paste composition for heat cooking produced by a process of according to any one of Aspects 28 to 43.

One or more embodiments of the present invention provide a solid paste composition for heat cooking that has elasticity with less rubbery texture, and exhibits a texture that passes smoothly through the teeth when chewed, as well as a method for producing the composition.

BRIEF DESCRIPTION OF THE DRAWINGS

FIGS. 1A to 1E (Table 1) show conditions for producing the composition samples prepared in Test Examples, Comparative Examples, and Referential Examples.

FIGS. 2A to 2F (Table 2) show conditions for producing the composition samples prepared in Test Examples, Comparative Examples, and Referential Examples.

FIGS. 3A to 3D (Table 3) show contents, properties, and evaluation results of the composition samples prepared in Test Examples, Comparative Examples, and Referential Examples.

FIGS. 4A to 4E (Table 4) show contents, properties, and evaluation results of the composition samples prepared in Test Examples, Comparative Examples, and Referential Examples.

FIGS. 5A and 5B (Table 5) show contents, properties, and evaluation results of the composition samples prepared in Test Examples, Comparative Examples, and Referential Examples.

FIGS. 6A and 6B (Table 6) show contents, properties, and evaluation results of the composition samples prepared in Test Examples, Comparative Examples, and Referential Examples.

FIG. 9B is an enlarged photograph of a portion of the photograph in FIG. 9A. In FIG. 9B, a rough contour of the smooth are is schematically shown with a black thick curve, and the thickness direction of the smooth are is schematically shown with a black thick arrow.

In FIG. 10, an example of CBB-stained sites formed within a smooth tissue part is shown schematically with a black arrow, and a rough contour of the smooth tissue part is schematically shown with a black thick curve.

DETAILED DESCRIPTION

Figure 7:
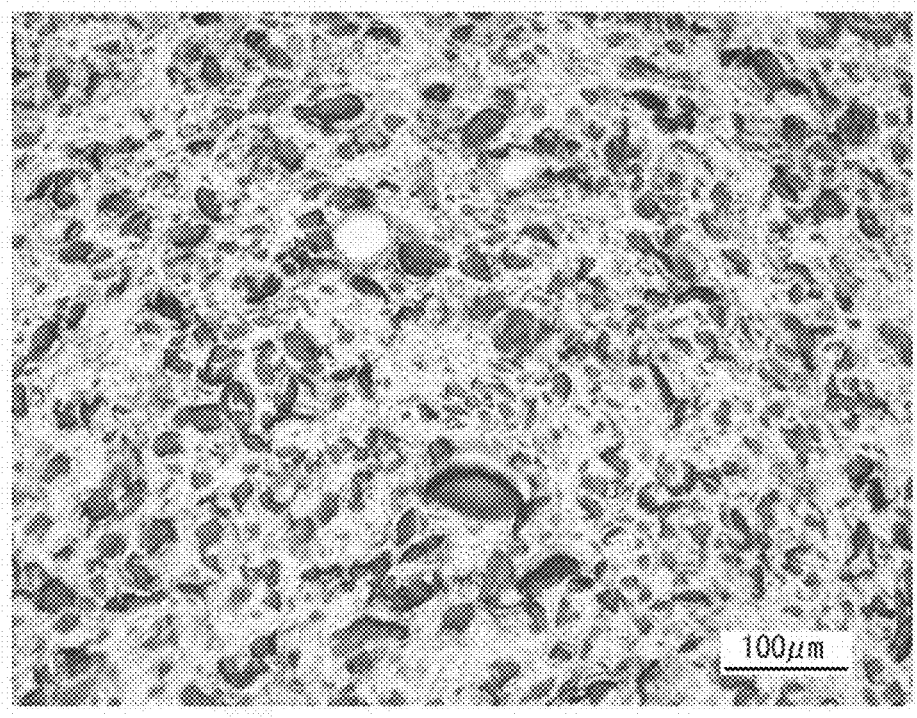
FIG. 7 is a CBB-stained photograph of a frozen section of the composition sample prepared in Test Example 42, which section was prepared by heating the composition at 90° C. for 6 minutes, freezing it at −25° C., and cutting it into 30-μm thick sections along a cut plane perpendicular to the longitudinal axis.

One or more embodiments of the present invention will now be described based on specific embodiments. These embodiments should not be construed to limit the scope of one or more embodiments of the present invention. All references, including patent publications, unexamined patent publications, and non-patent publications cited in this specification, can be incorporated by reference in their entirety for all purposes.

[I: Solid Paste Composition for Heat Cooking]

One or more embodiments of the present invention relate to a solid paste composition for heat cooking (hereinafter also referred to as "the solid paste composition of one or more embodiments of the present invention" or "the composition of one or more embodiments of the present invention").

(1) Summary of the Composition:

*Definitions

The "cooking" herein generally refers to a cooking method by raising the temperature of food via application of heat to the food, either directly with fire or microwaves or indirectly through a medium such as water or air, and generally means cooking at a heating temperature of, e.g., about 70° C. or higher, typically 80° C. to 180° C., for a time period of, e.g., 1 minute or longer to 60 minutes or shorter. Examples of such cooking methods include, although not limited to, baking, boiling, frying, and steaming. The composition for "heat cooking" according to one or more embodiments of the present invention may preferably be a composition for heat cooking, especially in a water-based liquid (preferably a liquid containing 50 mass % or more water, or 75 mass % or more water, or 90 mass % or more water). Thus, the composition of one or more embodiments of the present invention may especially preferably be a composition for heat cooking in a liquid, which is to be eaten after heat-cooked in such a water-based liquid.

The term "solid" herein refers to a composition's property of retaining its shape even when cooked.

The phrase "paste composition" herein refers to a food composition produced by kneading an ingredient derived from edible plant.

*Embodiments of the Composition

Since the composition of one or more embodiments of the present invention has the property of keeping its ingredients from eluting out in water as will be explained below, it may preferably be subjected to heat cooking in liquid (especially in water), which is a cooking environment where such elution of ingredients tends to occur. The solid paste composition for heat cooking of one or more embodiments of the present invention may preferably be a composition in the form of, e.g., noodles or noodle-like strings or strips such as pasta, since the solid paste composition of one or more embodiments of the present invention has the property of retaining its edible shape even after heat cooked in water for eating (e.g., more than 5 minutes in water at a temperature of 90° C. or higher).

Examples of the composition of one or more embodiments of the present invention include, although not limited to: pasta, Chinese noodles, udon (Japanese wheat-flour noodles), inaniwa udon, kishimen, houtou, suiton, hiyamugi, somen (variations of udon), soba (Japanese buckwheat-flour noodles), soba gaki (Japanese buckwheat-flour paste), beehun (rice vermicelli), pho, reimen (Korean cold noodles), vermicelli, oatmeal, couscous, kiritanpo (variation of Japanese rice cake in an elongate shape), tteok, and gyoza skins.

Examples of pastas include long pasta and short pasta.

The term "long pasta" is typically a generic term referring to long, thin pasta, but may also be used herein in a broader meaning encompassing udon and soba noodles. Specific examples include, although not limited to, spaghetti (diameter: 1.6 mm to 1.7 mm), spaghettini (diameter: 1.4 mm to 1.5 mm), vermicelli (diameter: 2.0 mm to 2.2 mm), cappellini (diameter: 0.8 mm to 1.0 mm), linguini (short diameter: about 1 mm, long diameter: about 3 mm), tagliatelle or fettuccine (short diameter: about 1 mm, long diameter: about 3 mm), and other types of pasta. diameter: about 1 mm, long diameter: about 3 mm), tagliatelle or fettuccine (flat noodles of about 7 mm to 8 mm in width), pappardelle (flat noodles of about 10 mm to 30 mm in width), etc. Long pasta is a product that typically has a large contact area between noodles and therefore tends to lose its surface smoothness and adhere to each other. Accordingly, making the composition of one or more embodiments of the present invention into the form of pasta may be useful and desirable.

The term "short pasta" is typically a general term referring to short pasta, but may also be used herein in a broader meaning encompassing product once shaped in long pasta and then processed into smaller sizes, such as fregola (granular pasta) and couscous. Examples include, although not limited to, macaroni (cylindrical shape with a diameter of about 3 to 5 mm), penne (cylindrical shape with both ends cut diagonally like the tip of a pen), farfalle (shaped like a butterfly), conchiglie (shaped like a seashell), and orecchiette (dome-shaped like an ear), etc.

*Composition in Dry State:

Conventional solid paste compositions for heat cooking, especially those in the dry state, can exhibit a strong elasticity and a rubbery texture if the surface is hardened to enhance its crunchiness after cooking before eating. In contrast, the composition of one or more embodiments of the present invention has sufficient elasticity after cooking, but the rubbery texture is suppressed, resulting in a crispy texture. Accordingly, the composition of one or more embodiments of the present invention is particularly useful when applied to compositions in a dry state.

The "dry" state herein refers to a state in which the moisture content is less than 25 mass % on a dry weight basis and the water activity value is less than 0.85. The composition of one or more embodiments of the present invention in such a dry state may preferably have a moisture content of less than 20 mass %, or even less than 15 mass % on a dry weight basis, and a water activity value of 0.80 or less, and even 0.75 or less. The water content in a solid paste composition can be measured by subjecting the dried powder to the decompression heating and drying method described below, and the water activity value can be measured by using a general water activity measurement device (e.g., "LabMaster-aw NEO," manufactured by Novavacina, which includes an electrical resistance (electrolyte) humidity sensor) according to a standard method.

The phrase "a texture that passes smoothly through the teeth when chewed" herein refers to a texture which can be felt at the beginning of chewing a composition. When a composition with a strong texture that passes smoothly through the teeth is chewed, the surface of the composition quickly breaks at the beginning of chewing, and a desirable texture can be felt at the early stage of mastication.

The term "elasticity" herein refers to a texture which can be felt from the beginning to the end of chewing of a composition. When a composition with strong elasticity is chewed, a moderate rebound can be felt on the teeth from the beginning to the end of mastication.

The phrase "rubbery texture" herein refers to a texture which can be felt at the end of chewing a composition. When a composition with a strong rubbery texture is chewed, it exhibits a strong repulsion at the end of chewing and is difficult to chew through.

*Composition Made into Elongated Form:

Conventional solid paste compositions for heat cooking, especially those formed into long and thin pieces such as long pasta, are prone to the aforementioned problem that when the surface is hardened to enhance its crunchiness, the elasticity becomes stronger and a rubbery texture is imparted. In contrast, the composition of one or more embodiments of the present invention has elasticity even after heat cooking, but the rubbery texture is suppressed, resulting in a crispy texture. Accordingly, the composition of one or more embodiments of the present invention is particularly useful when applied to compositions made into elongated forms.

The composition of one or more embodiments of the present invention made into such an elongated form may preferably have a diameter of, although not limited to, typically 20 mm or smaller, preferably 10 mm or smaller, more preferably 5 mm or smaller, even more preferably 3 mm or smaller, even further preferably 2 mm or smaller. The "diameter" of a solid paste composition herein refers to the length of the longest diagonal line of a cut surface of the solid paste composition when cut perpendicular to its longitudinal direction (the maximum length of line segments connecting any two points on the contour of the cross-section), and means its diameter if the cut surface is circular, its major axis if the cut surface is oval, or its diagonal if the cut surface is rectangular (e.g., in the case of a composition formed into a plate).

(2) Constituents of the Composition:

The constituents of the composition of one or more embodiments of the present invention are not particularly limited, but may preferably contain at least one edible plant. The type of edible plant is not particularly limited, but may preferably include at least a dry edible plant, i.e., one having a dry mass basis moisture content of less than 25 mass %, preferably less than 20 mass %, and ore preferably less than 15 mass %, and a water activity of 0.85 or less, preferably 0.80 or less, and even more preferably 0.75 or less. The edible plant may also preferably be in a refined and powdered form. As a specific edible plant, at least one species of pulse (legume) may preferably be used. Embodiments in which pulse is used as a raw material will be described in details later. However, the materials for the composition of one or more embodiments of the present invention are not limited thereto, and edible plants other than pulse and other raw materials may be used in combination, as long as the various characteristics described below are satisfied. The details of pulse and other edible plants and other ingredients used as raw materials for the composition of one or more embodiments of the present invention will be explained separately.

*Insoluble Dietary Fiber:

The composition of one or more embodiments of the present invention contains insoluble dietary fiber. The term "insoluble dietary fiber" herein refers to a water-insoluble fraction of indigestible food components which are not digested by human digestive enzymes. The insoluble dietary fiber in a sample can be quantified using, e.g., the Prosky method in accordance with the Japan Standard Tables for Food Composition 2015 (7th revised edition).

The composition of one or more embodiments of the present invention may advantageously have a high content of insoluble dietary fiber without exhibiting rough texture. Although the reason is not clear, it is estimated that the high-temperature and high-pressure severe kneading treatment accelerates the interaction of the dietary fiber with the protein and starch in the composition to form a network structure, whereby the texture resulting from the insoluble dietary fiber is improved.

The lower limit of the content of insoluble dietary fiber in the composition of one or more embodiments of the present invention in terms of dry mass basis may typically be 2.0 mass % or more, preferably 3 mass % or more, particularly 4 mass % or more, still particularly 5 mass % or more, or 6 mass % or more, or 7 mass % or more, or 8 mass % or more, or 9 mass % or more, especially 10 mass % or more. With the content of insoluble dietary fiber higher than the lower limit mentioned above, the composition of one or more embodiments of the present invention may more likely have a structure in which insoluble dietary fiber is homogeneously dispersed at an appropriate size in the starch spread in a matrix-like structure, whereby the rubbery texture tends to be suppressed. The "dry mass" herein refers to the mass obtained by subtracting from the entire mass of an object such as a composition its moisture content (dry mass basis moisture content) calculated according to the method explained below. The "dry mass basis" herein refers to the content ratio of each component calculated with the dry mass of the composition as the denominator and the content of each component as the numerator.

The upper limit of the content of insoluble dietary fiber in the composition of one or more embodiments of the present invention is not particularly limited, but from the viewpoint of industrial production efficiency, the content in terms of dry mass basis may preferably be 50 mass % or less, particularly 40 mass % or less, more particularly 30 mass % or less.

The origin of the insoluble dietary fiber contained in the composition of one or more embodiments of the present invention is not particularly limited, and may be derived from various natural materials containing insoluble dietary fiber or, alternatively, may be synthesized fiber. When insoluble dietary fiber derived from natural materials is used, insoluble dietary fiber contained in various materials may be isolated and purified before use in one or more embodiments of the present invention. Alternatively, such materials containing insoluble dietary fiber may be used as a whole. Insoluble dietary fiber can be, for example, derived from cereals, pulse, potatoes, vegetables, seeds, and fruits, among which those derived from cereals and pulse are more preferable from the viewpoint of texture of the composition, and those derived from pulse are even more preferable, especially pea-derived ones are preferred, and yellow pea-derived ones are most preferred. In the case of pulse-derived products, they may be used with or without skin.

The insoluble dietary fiber in the composition of one or more embodiments of the present invention to be incorporated into the composition may be an isolated pure product or, preferably, may be in the form of being contained in edible plant. Specifically, the ratio of the content of insoluble dietary fiber contained in edible plant (especially pulse) to the total insoluble dietary fiber content of the composition may preferably be 50 mass % or more, particularly 60 mass % or more, more particularly 70 mass % or more, still particularly 80 mass % or more, or 90 mass % or more, especially 100 mass %.

The constituents of the insoluble dietary fiber contained in the composition of one or more embodiments of the present invention is not particularly limited. However, the ratio of lignin (especially acid-soluble lignin) to the total insoluble dietary fiber may preferably be above a certain value, since this will render the effect of improving the texture more pronounced. Specifically, the ratio of lignin (especially acid-soluble lignin) to the total insoluble dietary fiber may preferably be 5 mass % or more, more preferably 10 mass % or more, even more preferably 30 mass % or more on a dry mass basis.

*Size of Insoluble Dietary Fiber (Particle Size $d_{90}$ and $d_{50}$):

The insoluble dietary fiber contained in the solid paste composition of one or more embodiments of the present invention should have a predetermined size. Specifically, when the starch and protein in the solid paste composition are degraded via amylase and protease treatment, and the remainder is subjected to ultrasonic treatment and then to the measurement for its particle size distribution, the obtained particle size d90 and/or d50 may preferably be below predetermined limits. It is deemed that such treatment degrades starch and protein among the constituents of the composition, and the particle size distribution of the resulting degraded product reflects the particle size distribution of the insoluble dietary fiber-dominated structure. On the other hand, the particle size ($d_{90}$ and/or $d_{50}$) of dietary fiber in randomly-crushed pulse powder is likely to exceed 450 μm (since insoluble dietary fiber contained in pulse typically has a rod-like shape, the laser diffraction particle size distribution measurement used to measure the particle size in one or more embodiments of the present invention is likely to yield a larger value for the particle size). In particular, when ingredients containing hard tissues, such as beans with seed skins, are used as raw materials, the dietary fibers in the seed skin portions are coarse and more difficult to crush compared to the edible portions. Therefore, the dietary fiber used in one or more embodiments of the present invention may preferably have undergone a specific crushing process in advance so as to meet a specific range of dietary fiber size.

Specifically, the particle size $d_{90}$ of the insoluble dietary fiber prepared via the procedure mentioned above for use in the composition of one or more embodiments of the present invention may preferably be 450 μm or less, more preferably 400 μm or less, more preferably 350 μm or less, more preferably 300 μm or less, more preferably 250 μm or less, more preferably 200 μm or less, more preferably 150 μm or less, more preferably 100 μm or less, more preferably 80 μm or less, more preferably 60 μm or less, more preferably 50 μm or less. Likewise, the particle size $d_{50}$ of the insoluble dietary fiber may preferably be 450 μm or less, more preferably 400 μm or less, more preferably 350 μm or less, more preferably 300 μm or less, more preferably 250 μm or less, more preferably 200 μm or less, more preferably 150 μm or less, more preferably 100 μm or less, more preferably 80 μm or less, more preferably 60 μm or less, more preferably 50 μm or less. If the particle size $d_{90}$ and/or particle size $d_{50}$ of insoluble dietary fiber contained in the composition exceeds the above range, the effect of one or more embodiments of the present invention may be difficult to achieve. The reason for this is not clear, but presumably because the coarse insoluble dietary fiber interferes with the formation of the matrix structure of starch, etc., making it difficult to achieve the effect of one or more embodiments of the present invention. On the other hand, the lower limit of the particle diameter $d_{90}$ and/or $d_{50}$ is not particularly limited, but may typically be 1 μm or more, more preferably 3 μm or more.

The amylase and protease treatment of the solid paste composition can specifically be carried out by treating 6 mass % water suspension of the composition with 0.4 volume % of protease and 0.02 mass % of α-amylase at 20° C. for 3 days. More specifically, 300 mg of the composition is placed with 5 mL of water in a plastic tube and swollen at 20° C. for about 1 hour, and then homogenized using a small Hiscotron (Microtech Nichion homogenizer NS 310E3) until it exhibits porridge-like properties (at 100 00 rpm for about 15 seconds). Then a 2.5 mL fraction of the treated sample is separated and caused to react with 10 μL of protease (proteinase K from Takara Bio) and 0.5 mg of α-amylase (α-amylase from *Bacillus subtilis* from Sigma) at 20° C. for 3 days. After the amylase/protease treatment, the treated composition is subjected to ultrasonic treatment before being used for particle size distribution measurement.

The "ultrasonic treatment" herein refers to a treatment with ultrasonic waves of 40 kHz frequency at an output of 40 W for 3 minutes, unless otherwise specified.

The particle size distribution of a composition can be measured using a laser diffraction particle size analyzer according to the following conditions. Ethanol is used as the solvent for the measurement, which has little effect on the structure of the composition. The laser diffraction particle size analyzer used for the measurement is not limited to any particular type, an example being Microtrac MT3300 EXII system marketed by Microtrac Bell Inc. The measurement application software used for the measurement is not limited, an example being DMS2 (Data Management System version 2, Microtrac Bell Inc.). When the device and the application software mentioned above are used, the measurement can be carried out by: carrying out cleaning by pressing the Wash button of the software; carrying out calibration by pressing the Set Zero button of the software; and directly loading the sample via the Sample Loading feature until the sample concentration is within the proper range. After the sample is loaded, the measurement sample is subjected to ultrasonic treatment by the measurement device, followed by measurement. Specifically, a sample that has not been subjected to ultrasonic treatment is put into the measurement solvent (ethanol) circulating in the measurement system, the concentration is adjusted to within the appropriate range using the Sample Loading feature, and then the ultrasonic treatment is performed by pressing the Ultrasonic Treatment button of the software. Then, after three times of defoaming, the sample loading can be carried out again to adjust the concentration to within the appropriate range. Thereafter, the sample is promptly laser diffracted at a flow rate of 60% with a measurement time of 10 seconds, and the result is used as the measurement value. The parameters for the measurement may be, e.g., Distribution indication: Volume; Particle refractive index: 1.60; Solvent refractive index: 1.36; Upper limit of measurement: 2,000.00 µm; Lower limit of measurement: 0.021 µm.

The "particle size $d_{90}$" and "particle size $d_{50}$" of a measurement object such as a composition herein refer to, when the particle size distribution of the object is measured on a volume basis and divided into two parts at a certain particle size, the particle sizes at which the ratios between the cumulative value of the particle frequency % on the larger side to that on the smaller side are 10:90 and 50:50, respectively.

*Shape of Insoluble Dietary Fiber (Average Longest Diameter and Aspect Ratio of CFW-Stained Sites):

The insoluble dietary fiber contained in the solid paste composition of one or more embodiments of the present invention may preferably have a predetermined shape. In this regard, a compositions using randomly-crushed edible plant (e.g., pulse) powder as a raw material, the CFW-stained sites of insoluble dietary fiber in the composition are likely to have an longest diameter of greater than 4.5 µm and an aspect ratio of greater than 5.0 on average (this is especially the case when pulse is used, since the insoluble dietary fiber in pulse is typically rod-shaped). In addition, since wind sorting of edible plant (e.g., pulse) powder, for example, removes edible plant particles with specific shapes, the aspect ratios of the CFW-stained sites of insoluble dietary fiber in the final paste composition tend to be too high or too low compared to the above-mentioned range. Therefore, for use in the composition of one or more embodiments of the present invention, edible plant (e.g., pulse) powder may preferably have been subjected to a specific crushing process in advance as a raw material such that the arithmetic mean(s) of the longest diameter and/or the aspect ratio of the CFW-stained sites, which represent insoluble dietary fiber, are/is adjusted to within a specific range. Using such edible plant (e.g., pulse) powder makes it possible to obtain a composition in which the CBB-stained sites are properly developed. Specifically, when the composition is subjected to the amylase and protease treatment mentioned above and then to CFW (Calcofluor white) staining and observed under fluorescence microscope, the average of the longest diameters and/or the average of the aspect ratios of the CFW-stained sites may preferably be less than or equal to the predetermined upper limit(s). The CFW-stained sites thus obtained are deemed to have insoluble fiber-dominated structures. Incidentally, the average value (also referred to simply as the average or arithmetic mean value) herein refers to the additive mean value unless otherwise specified. In the present disclosure, the "mean" or "average" (sometimes referred to as, e.g., "mean" or "arithmetic mean") refers to an arithmetic (additive) mean value, unless otherwise specified.

The arithmetic average of the longest diameters of the CFW-stained sites in the composition of one or more embodiments of the present invention determined in accordance with the aforementioned manner may preferably be 450 µm or less, more preferably 400 µm or less, more preferably 350 µm or less, more preferably 300 µm or less, more preferably 250 µm or less, more preferably 200 µm or less, more preferably 150 µm or less, more preferably 100 µm or less, more preferably 80 µm or less, more preferably 60 µm or less, more preferably 50 µm or less. If the average of the longest diameters of the CFW-stained sites exceeds the above range, the effect of one or more embodiments of the present invention may be difficult to achieve. The reason for this is not clear, but presumably because insoluble dietary fibers with large longest diameters interfere with the formation of matrix structures such as starch, making it difficult to achieve the effect of one or more embodiments of the present invention. On the other hand, the lower limit of the arithmetic average of the longest diameters of the CFW-stained sites is not limited, but may preferably be 2 µm or more, more preferably 3 µm or more.

The arithmetic average of the aspect ratios of the CFW-stained sites in the composition of one or more embodiments of the present invention determined in accordance with the aforementioned manner may preferably be 5.0 or less, more preferably 4.5 or less, more preferably 4.0 or less, more preferably 3.5 or less, more preferably 3.0 or less, more preferably 2.5 or less, more preferably 2.0 or less. If the average of the aspect ratios of the CFW-stained sites exceeds the above range, the effect of one or more embodiments of the present invention may be difficult to achieve. The reason for this is not clear, but presumably because insoluble dietary fibers with large aspect ratios interfere with the formation of matrix structures such as starch, making it difficult to achieve the effect of one or more embodiments of the present invention. On the other hand, the lower limit of the arithmetic average of the aspect ratios of the CFW-stained sites is not limited, but may preferably be 1.1 or more, more preferably 1.3 or more.

Specifically, the arithmetic average of the longest diameters and the arithmetic average of the aspect ratios of the CFW-stained sites in a composition can be determined in accordance with the following matter. A 6 mass % aqueous suspension of the composition is treated with 0.4 volume % of protease and 0.02 mass % of α-amylase for 3 days at 20°

C. One drop of the resulting post-treatment composition is placed on a clean glass slide, to which 1 μL of CFW (Calcofluor White: 18909-100 ml-F Sigma-Aldrich) is added and mixed, and a cover glass is placed on the glass and observed under a magnified field of view with a fluorescence microscope (e.g., BZ-9000 fluorescence microscope from Keyence) using an appropriate filter. The magnification of the fluorescence microscope during observation is not limited, but may be 100× or 200×, of which 200× is preferable. In the Examples described below, particles whose longest diameters are 1 μm or more and which are visible by the method mentioned above were observed. The measurement area is not limited, but when measurement is made at a magnification of 200×, for example, a color photograph with pixel counts of 1360×1024 can be taken for analysis.

The "longest diameter" of each CFW-stained site can also be determined as the maximum distance between two arbitrary points on the contour line of each CFW-stained area in the image. When two or more CFW-stained sites overlap with each other, the longest diameter for each CFW-stained site can obtained by distinguishing the contour lines of each CFW-stained site with the naked eye. The "aspect ratio" of each CFW-stained site is a value indicating the aspect ratio of the contour of each CFW-stained site on the image, and can be determined as "{the longest diameter of each CFW-stained site image} divided by {the distance between two straight lines parallel to the longest diameter of each CFW-stained site and tangent to the contour of the CFW-stained site}". CFW-stained sites with elongated contours have larger aspect ratios.

*Starch:

The composition of one or more embodiments of the present invention contains starch. In particular, the composition of one or more embodiments of the present invention contains starch in a predetermined range or more, which serves to provide the composition with elasticity after heat cooking and promote the formation of a structure containing CBB-stained sites described below in its interior, whereby the resulting composition involves a less rubbery texture, and exhibits a texture that passes smoothly through the teeth when chewed. The reason for this is not clear, but presumably because the high-temperature, high-pressure, and strong kneading treatment causes the dietary fiber in the composition to interact with starch and protein to form a network structure, resulting in the above-mentioned effects.

Specifically, the lower limit for the starch content in the composition of one or more embodiments of the present invention in terms of dry mass basis may typically be 15 mass % or more, preferably 20 mass % or more, more particularly 25 mass % or more, still particularly 30 mass % or more, or 35 mass % or more, or 40 mass % or more, or 45 mass % or more, especially 50 mass % or more. The upper limit of the starch content in the composition of one or more embodiments of the present invention is not particularly limited, but may be, in terms of dry mass basis, 85 mass % or less, particularly 80 mass % or less, or 70 mass % or less, or 60 mass % or less.

The origin of the starch in the composition of one or more embodiments of the present invention is not particularly limited. Examples include plant-derived starch and animal-derived starch, of which starch of plant origin (especially pulse) is preferred. Specifically, the ratio of the plant-derived starch content to the total starch content in the composition may typically be 50 mass % or more, particularly 60 mass % or more, more particularly 70 mass % or more, still particularly 80 mass % or more, or 90 mass % or more, especially 100 mass %. Examples of plant-derived starches include those derived from cereals, pulse, potatoes, vegetables, seeds, and fruits. From the viewpoint of texture of the composition, those derived from cereals and pulse are more preferred, those derived from pulse are even more preferred, especially those derived from peas, and those derived from yellow peas are most preferred.

The starch incorporated in the composition of one or more embodiments of the present invention may be in the form of an isolated pure product or, preferably, may be present in the state of being contained in edible plant. Specifically, the ratio of the content of starch contained in edible plant (especially pulse) to the total starch content of the composition may preferably be 50 mass % or more, particularly 60 mass % or more, more particularly 70 mass % or more, still particularly 80 mass % or more, or 90 mass % or more, especially 100 mass %.

The starch content in a solid paste composition herein can be measured by the method such as AOAC 996.11 in the Japan Standard Tables for Food Composition 2015 (7th revised edition), which involves extraction treatment with 80% ethanol for removing soluble carbohydrates (glucose, maltose, maltodextrin, etc.) that may affect the measured values.

*Protein:

The composition of one or more embodiments of the present invention contains protein. In particular, the composition of one or more embodiments of the present invention contains protein in a predetermined range or more, which serves to provide the composition with improved firmness after heat cooking and promote the formation of a structure containing CBB-stained sites described below in its interior, whereby the resulting composition involves a less rubbery texture (which originates mainly from matrix starch), and exhibits a texture that passes smoothly through the teeth when chewed. The reason for this is not clear, but presumably because the starch structure spread out in the form of a matrix throughout the composition is heated and melted due to the high-temperature, high-pressure, and strong kneading treatment in the presence of a certain amount of water and thereby develops liquid-like properties and yields a structure including CBB-stained sites, presumably composed mainly of proteins, which develop into preferred shapes and sizes with the help of dietary fiber and cause an interaction that forms a structure that is completely different from the previously known gluten and other protein networks. This may result in the formation of a structure in which less elastic protein-dominated CBB-stained sites are present in highly-elastic starch matrix, changing the rubbery texture resulting from the starch matrix structure to achieve the effect of one or more embodiments of the present invention.

Specifically, the lower limit of the protein content in the composition of one or more embodiments of the present invention in terms of dry mass basis may be 5.5 mass % or more, preferably 6 mass % or more, more particularly 7 mass % or more, still particularly 8 mass % or more, or 9 mass % or more, or 10 mass % or more, or 11 mass % or more, or 12 mass % or more, or 13 mass % or more, or 14 mass % or more, or 15 mass % or more, or 16 mass % or more, or 17 mass % or more, or 18 mass % or more, or 19 mass % or more, or 20 mass % or more, or 21 mass % or more, especially 22 mass % or more. On the other hand, the upper limit vis not particularly limited, but may be, in terms of dry mass basis, typically 85 mass % or less, preferably 80 mass % or less, more preferably 75 mass % or less, more preferably 70 mass % or less, more preferably 65 mass % or less, more preferably 60 mass % or less.

The origin of the protein in the composition of one or more embodiments of the present invention is not particularly limited. Examples include plant-derived protein and animal-derived protein, of which protein of plant origin (especially pulse) is preferred. Specifically, the ratio of the plant-derived protein content to the total protein content in the composition may typically be typically 50 mass % or more, particularly 60 mass % or more, more particularly 70 mass % or more, still particularly 80 mass % or more, or 90 mass % or more, especially 100 mass %. Examples of plant-derived proteins include those derived from cereals, pulse, potatoes, vegetables, seeds, and fruits. From the viewpoint of forming the CBB-stained sites explained below, those derived from cereals and pulse are more preferred, those derived from pulse are even more preferred, especially those derived from peas, and those derived from yellow peas are most preferred.

The protein incorporated in the composition of one or more embodiments of the present invention may be in the form of an isolated pure product or, preferably, may be present in the state of being contained in edible plant. Specifically, the ratio of the content of protein contained in edible plant (especially pulse) to the total protein content of the composition may preferably be 50 mass % or more, particularly 60 mass % or more, more particularly 70 mass % or more, still particularly 80 mass % or more, or 90 mass % or more, especially 100 mass %.

Typically 50 mass % or more, particularly 60 mass % or more, more particularly 70 mass % or more, still particularly 80 mass % or more, or 90 mass % or more, especially 100 mass %, of each of the protein and the starch contained in the composition of one or more embodiments of the present invention may preferably be derived from pulse, more preferably from the same species of pulse, still more preferably from the same individual of pulse. Likewise, typically 50 mass % or more, particularly 60 mass % or more, more particularly 70 mass % or more, still particularly 80 mass % or more, or 90 mass % or more, especially 100 mass %, of each of the protein and the starch contained in the composition of one or more embodiments of the present invention may preferably be present in the composition in the form of being contained in edible plant.

The protein content in a solid paste composition herein can be measured by a method, e.g., according to the Japan Standard Tables for Food Composition 2015 (7th revised edition)," which involves multiplying the amount of nitrogen quantified by the modified Kjeldahl method by the "nitrogen-protein conversion factor."

*Total Oil and Fat Content:

The total oil and fat content in the composition of one or more embodiments of the present invention is not particularly limited, but may preferably be, in terms of dry mass basis, typically less than 17 mass %, particularly less than 15 mass %, more particularly less than 13 mass %, still particularly less than 10 mass %, or less than 8 mass %, or less than 7 mass %, or less than 6 mass %, or less than 5 mass %, or less than 4 mass %, or less than 3 mass %, or less than 2 mass %, or less than 1 mass %, especially less than 0.8 mass %. On the other hand, the lower limit of the total oil and fat content is not particularly limited, but may preferably be, in terms of dry mass basis, typically 0.01 mass % or more. The total oil and fat content in a solid paste composition can be measured by a method, e.g., according to the Japan Standard Tables for Food Composition 2015 (7th revised edition), using the Soxhlet extraction method with diethyl ether.

The origin of the oil and fat in the composition of one or more embodiments of the present invention is not particularly limited. Examples include plant-derived oil and fat and animal-derived oil and fat, of which oil and fat of plant origin (especially pulse) is preferred. Specifically, the ratio of the plant-derived oil and fat content to the total oil and fat content in the composition may typically be typically 50 mass % or more, particularly 60 mass % or more, more particularly 70 mass % or more, still particularly 80 mass % or more, or 90 mass % or more, especially 100 mass %. Examples of plant-derived oils and fats include those derived from cereals, pulse, potatoes, vegetables, seeds, and fruits. From the viewpoint of forming the CBB-stained sites explained below, those derived from cereals and pulse are more preferred, those derived from pulse are even more preferred, especially those derived from peas, and those derived from yellow peas are most preferred.

The oil and fat to be incorporated in the composition of one or more embodiments of the present invention may be in the form of an isolated pure product or, preferably, may be present in the state of being contained in edible plant. Specifically, the ratio of the content of oil and fat contained in edible plant (especially pulse) to the total oil and fat content of the composition may preferably be 50 mass % or more, particularly 60 mass % or more, more particularly 70 mass % or more, still particularly 80 mass % or more, or 90 mass % or more, especially 100 mass %.

Typically 50 mass % or more, particularly 60 mass % or more, more particularly 70 mass % or more, still particularly 80 mass % or more, or 90 mass % or more, especially 100 mass %, of the oil and fat contained in the composition of one or more embodiments of the present invention may preferably be derived from pulse, more preferably from the same species of pulse, still more preferably from the same individual of pulse. Likewise, typically 50 mass % or more, particularly 60 mass % or more, more particularly 70 mass % or more, still particularly 80 mass % or more, or 90 mass % or more, especially 100 mass %, of the oil and fat contained in the composition of one or more embodiments of the present invention may preferably be present in the composition in the form of being contained in edible plant.

*Dry Mass Basis Moisture Content:

Conventional solid paste compositions for heat cooking having a low moisture content in terms of dry mass basis tend to have voids in the starch structure that serves as the matrix during heat cooking, causing the aforementioned problems to occur. On the other hand, the composition of one or more embodiments of the present invention has elasticity after heat cooking, involves less rubbery texture, and exhibits a texture that passes smoothly through the teeth when chewed. Accordingly, the composition of one or more embodiments of the present invention is particularly useful when applied to compositions with a dry weight basis moisture content below a certain value.

Specifically, the dry mass basis moisture content in the composition of one or more embodiments of the present invention is not particularly limited, but may be 60 mass % or less, particularly 50 mass % or less, or 40 mass % or less, or 30 mass % or less, or 20 mass % or less, or 15 mass % or less. On the other hand, the lower limit of the dry mass basis moisture content in the composition of one or more embodiments of the present invention is not limited, but from the viewpoint of industrial production efficiency, it may be 0.5 mass % or more, or 1 mass % or more, or 2 mass % or more. The dry mass basis moisture content in the composition of one or more embodiments of the present invention may either be derived from the ingredients of the composition and/or result from water added externally.

The "dry mass basis moisture content" herein refers to the ratio of the total amount of moisture in the composition of the present disclosure which either originates from the raw materials or was added externally to the total amount of solids in the solid paste composition of one or more embodiments of the present invention. The value can be measured by a method, for example, according to the Japan Standard Tables for Food Composition 2015 (7th revised edition), by heating to 90° C. using the decompression heating and drying method. Specifically, an appropriate amount of sample ($W_1$) is put in a pre-weighed weighing vessel ($W_0$) and weighed, the weighing vessel with the lid removed or opened is placed in a reduced pressure electric constant temperature dryer adjusted to a predetermined temperature (more specifically, 90° C.) at normal pressure, the door is closed, and the vacuum pump is operated to dry the sample at a predetermined reduced pressure for a predetermined period of time. The vacuum pump is then stopped, dry air is sent to bring the pressure back to normal, the weighing vessel is removed, the lid is put on, the vessel is left to cool in a desiccator, and the mass is then weighed. The process of drying, cooling, and weighing ($W_2$) is repeated until a constant amount is reached, and the water content (moisture content based on dry weight) (mass %) is determined using the following formula.

$$\text{Moisture content (mass \%)} = (W_1 - W_2)/(W_2 - W_0) \times 100 \quad \text{[Formula 1]}$$

where $W_0$ is the mass (g) of the pre-weighed weighing vessel, $W_1$ is the mass (g) of the weighing vessel with the sample before drying, and $W_2$ is the mass (g) of the weighing vessel with the sample after drying.

*Pulse:

When pulse is used as edible plant in the composition of one or more embodiments of the present invention, preferable examples of pulse species include one or more species selected from *Pisum, Glycine, Phaseolus, Cajanus, Vigna, Vicia, Cicer, Lens, Lupinus, Lathyrus, Cyamopsis, Mucuna, Ceratonia*, and *Parkia* species. Specific examples of pulse species include, although not limited to: peas (in particular, yellow peas, white peas, and green peas, which are immature seeds), kidney beans, red kidney beans, white kidney beans, black beans, pinto beans, toramame (a variation of kidney beans: concord paul), lima beans, scarlet runner beans, pigeon peas, mung beans, cowpeas, azuki beans, broad beans (*Vicia faba*), soybeans (especially edamame, which are immature seeds of soybeans harvested with their pods in their immature state and characterized by the green appearance of the beans), chickpeas, lentils, blue peas, scarlet runner beans, peanuts, lupin beans, glass peas, locust beans (carob), twisted cluster beans, African locust beans, coffee beans, cacao beans, and Mexican jumping beans.

*Particle Size of Pulse Flour:

When pulse in the form of flour is used as edible plant in the composition of one or more embodiments of the present invention, the particle size of the pulse flour may preferably satisfy the following ranges. The particle size $d_{90}$ of the pulse flour after ultrasonic treatment may preferably be 500 μm or less, more preferably 450 μm or less, particularly preferably 400 μm or less, or 350 μm or less, or 300 μm or less, or 250 μm or less, or 200 μm or less, or 150 μm or less, or 100 μm or less, or 90 μm or less, or 80 μm or less, or 70 μm or less, or 60 μm or less, or still more preferably 50 μm or less. Likewise, the particle size $d_{50}$ of the pulse flour after ultrasonic treatment may preferably be 500 μm or less, more preferably 450 μm or less, particularly preferably 400 μm or less, or 350 μm or less, or 300 μm or less, or 250 μm or less, or 200 μm or less, or 150 μm or less, or 100 μm or less, or 90 μm or less, or 80 μm or less, or 70 μm or less, or 60 μm or less, or still more preferably 50 μm or less. In particular, if the particle size of the composition is larger than a certain size during extrusion, the composition tends to pulsate during molding and worsen productivity, and the surface of the composition tends to become uneven. It is therefore preferable to use powdered pulse of a certain size or smaller. For the same reason, the particle size of the paste dough composition, which will be described later, may preferably have substantially the same size as that of the powdered pulse mentioned above.

*Other Food Ingredients:

The composition of one or more embodiments of the present invention may further contain any one or more food ingredients. Examples of such food ingredients include vegetable ingredients (vegetables, potatoes, mushrooms, fruits, algae, grains, seeds, etc.), animal ingredients (seafood, meat, eggs, milk, etc.), and microbial food products. The amount of these food ingredients can be set appropriately as long as they do not undermine the purpose of one or more embodiments of the present invention.

*Seasonings and Food Additives:

The composition of one or more embodiments of the present invention may contain any one or more seasonings, food additives, etc. Examples of seasonings and food additives include: soy sauce, miso (Japanese fermented soybean paste), alcohols, sugars (e.g., glucose, sucrose, fructose, glucose-fructose liquid sugar, glucose-fructose liquid sugar, etc.), sugar alcohols (e.g., xylitol, erythritol, maltitol, etc.), artificial sweeteners (e.g., sucralose, aspartame, saccharin, acesulfame K, etc.), minerals (e.g., calcium, potassium, sodium, iron, zinc, magnesium, etc., and their salts), flavoring agents, pH adjusters (e.g., sodium hydroxide, potassium hydroxide, lactic acid, citric acid, tartaric acid, malic acid and acetic acid), cyclodextrins, antioxidants (e.g., vitamin E, vitamin C, tea extract, green coffee bean extract, chlorogenic acid, spice extract, caffeic acid, rosemary extract, vitamin C palmitate, rutin, quercetin, peach extract, sesame extract, etc.), emulsifiers (e.g., glycerin fatty acid esters, acetic acid monoglycerides, lactic acid monoglycerides, citric acid monoglycerides, diacetyl tartaric acid monoglycerides, succinic acid monoglycerides, polyglycerin fatty acid esters, polyglycerin condensed linosylate esters, chiraya extracts, soybean saponins, chia seed saponins, sucrose fatty acid esters, lecithin, etc.), colorants, thickening stabilizers, etc.

However, in view of the recent increase in nature consciousness, the composition of one or more embodiments of the present invention may preferably not contain any additives of any one category, more preferably any two categories, most preferably all three categories, of the so-called emulsifiers, colorants, and thickening stabilizer (e.g., those listed in the "Table of food additive substance names for labeling" section of the "Pocket Book of Food Additives Labeling (2011 edition)" as "colorants," "thickening stabilizers," and "emulsifiers").

In particular, the composition of one or more embodiments of the present invention may preferably not contain a gelling agent, since the composition can be given elasticity without any gelling agent while being prevented from having excessive elasticity. The composition of one or more embodiments of the present invention may preferably not contain an emulsifier, from the viewpoint of making the natural tastes of the ingredients easily perceptible. In addition, the composition of one or more embodiments of the present invention may preferably not contain any food additives (e.g., e.g., those listed in the "Table of food additive substance names for labeling" section of the "Pocket Book of Food Additives Labeling (2011 edition) used for food additive applications). From the perspective of making it easier to perceive the sweetness of the food itself, the composition of one or more embodiments of the present invention may preferably not contain added sugars (glucose, sucrose, fructose, glucose fructose liquid sugar, fructose dextrose liquid sugar, etc.).

Conventional solid paste compositions for heat cooking (especially those containing gluten having network structure) were provided with elasticity via addition of sodium chloride, affecting the taste and excessive salt intake. This is especially pronounced in dry compositions (dried udon, dried hiyamugi, etc.), where sodium chloride is usually used at a level of 3% by mass or higher to maintain compositional elasticity. On the other hand, the composition of one or more embodiments of the present invention is advantageous since even if little or no amount of sodium chloride is added, it can maintain a good quality without losing its elasticity. It is also desirable to apply one or more embodiments of the present invention to solid paste compositions for heat cooking such as pasta, udon, bread, etc., which are usually provided with adhesion and elasticity via addition of gluten and sodium chloride, since they can be made into compositions of good quality without the addition of sodium chloride. Specifically, the sodium chloride content in the composition of one or more embodiments of the present invention on a dry mass basis may typically be 3% by mass or lower, preferably 2% by mass or lower, more preferably 1% by mass or lower, even more preferably 0.7% by mass or lower, particularly preferably 0.5% by mass or lower. The lower limit of the sodium chloride content in the composition of one or more embodiments of the present invention is not particularly limited, and may be 0% by mass. The sodium chloride content in a solid paste composition is calculated by a method, e.g., in accordance with the "Salt equivalent" section of the Japan Standard Tables for Food Composition 2015 (7th revised edition), by measuring the amount of salt using the atomic absorption method and multiplying the measured value by 2.54.

(3) Physical Properties of CBB- and CFW-Stained Frozen Sections after Treated in Heated Water:

The composition of one or more embodiments of the present invention has the features described below when made into frozen sections under specific conditions and observed with CBB (Coomassie Brilliant Blue) staining or CFW (Calcofluor-white) staining.

*Preparation of Frozen Sections after Treated in Heated Water and Observation with CBB or CFW Staining:

In order to measure these properties of a composition, the composition is heated in water at 90° C. for 6 minutes, then frozen at −25° C., and cut into a section with a thickness of 30 μm along a specific cut plane, and the frozen section is observed with CBB or CFW staining.

Specifically, preparation of a frozen section of a composition and observation thereof with CBB staining is not limited, but may preferably be carried out in accordance with the following procedure. The composition is placed in a 1000-fold volume of water heated to 90° C. or higher (more specifically, in water at 90° C.) for 6 minutes, and then frozen at −25° C. and cut into a section with a thickness of 30 μm according to Kawamoto method described in "Use of a new adhesive film for the preparation of multi-purpose fresh-frozen sections from hard tissues, whole-animals, insects and plants", Arch. Histol. Cytol., (2003), 66[2]:123-43. The thus-obtained frozen section of the composition is stained with, e.g., CBB solution (Coomassie Brilliant Blue R250: 0.1 mass % l; methanol: 40 mass %; acetic acid: 10 mass %). More specifically, the frozen section of the composition is adsorbed on a glass slide, onto which 15 μL of CBB solution is dropped, and a cover glass is quickly placed. After left stand for 3 minutes, the stained frozen section is then placed under the field of view of a microscope with a magnification of 200×, for example, and a color photograph with pixel counts of 1360×1024 is taken for analysis.

The method for preparation of a frozen section of a composition and observation thereof with CFW staining is not limited, but they may preferably be carried out in accordance with the following procedure. The frozen section is prepared in accordance with the same method as mentioned above. The thus-obtained frozen section of the composition is stained with, e.g., CFW (Calcofluor-white: 18909-100 ml-F, from Sigma-Aldrich). More specifically, the frozen section of the composition is adsorbed on a glass slide, onto which 1 μL of CFW is added and mixed, and a cover glass is placed. The resulting sample is observed under a magnified field of view with a fluorescence microscope (e.g., BZ-9000 fluorescence microscope from Keyence) using an appropriate filter. The magnification of the fluorescence microscope during observation is not limited, but for example, the sample may be placed under the field of view of a microscope with a magnification of 200×, and a color photograph of, for example, 1360×1024 pixels may be taken for analysis.

*Determination of Shapes of CBB-Stained Sites or CFW-Stained Sites in Frozen Composition Section:

The CBB-stained photograph of the frozen composition section taken by the above procedure is used for determining the shape (perimeter, area, roundness, etc.) of each stained site by the following method. First, among the areas stained blue in the photograph taken by the above procedure, areas which do not partially or fully overlap the outer edges of the field of view, whose shapes of the entire areas can be confirmed, and which have a certain area or more that can be analyzed (specifically, the areas of the stained sites are 30 $\mu m^2$ or more: for example, in the case of a photograph with 200× magnification and 1360×1024 pixels, the particle areas of 100 dots or more) are chosen as the object of analysis.

Specifically, the stained sites to be analyzed are determined by the following method: a CBB-stained frozen composition sections observed under a fluorescence microscope with a 200× field of view, and a photograph with CBB staining taken is grayscaled, binarized, and black-white inverted. From the white-out pixels (i.e., pixels that correspond to stained sites in the original photograph with CBB staining), each and every assembly of pixels connected to each other on any of their four sides that is independent of other pixel assemblies is extracted. The binarization is carried out using the discriminant analysis method to determine a threshold value so that the variance ratio of the within-class variance to the between-class variance for the background and pattern regions become maximum when binarized. Specifically, the grayscaled image can be binarized using Particle Analysis Ver. 3.5 (Nittetsu Technology). From the extracted pixel assemblies, those that partially or fully overlap with any of the outer edges of the field of view and those that have an area of less than 30 $\mu m_2$ (e.g., in the case of a photograph with 200× magnification and 1360× 1024 pixels, those having a particle area of less than 100 dots) are excluded, and the remaining pixel assemblies are chosen as the stained sites for analysis. If there is an independent black pixel inside a white-out pixel assembly (i.e., if there is a spot-like non-stained dot inside a stained site during imaging), the area is calculated by ignoring the pixel corresponding to the non-stained dot.

Each of the thus-chosen stained sites is then subjected to measurement of parameters related to its shape, such as area, area ratio, perimeter, and degree of roundness. These parameters can be measured by using various known image analysis software used for analysis of shapes in an image.

The "area" of a stained site herein refers to the area corresponding to the total number of pixels forming the stained site.

The "area ratio" of stained sites herein refers to the ratio of the total area of all stained sites having specific shapes to the total area of the sectional image of the composition. The more dominant the stained sites are in the sectional image of the composition, the larger the area ratio value.

The "degree of roundness" of a stained site is a value that decreases as the shape of the stained site deviates from a perfect circle, and is calculated by the equation: "the degree of roundness=$4\pi \cdot \{(\text{area})/(\text{perimeter})^2\}$." The more complex the shape of the stained site image, the smaller the degree of roundness.

The "perimeter" of a stained site herein refers to a value calculated by converting the length of the contour of the stained site with wounded corners into a number of pixels, counting the length of one side of each pixel as "one pixel." The smaller "perimeter" value is obtained for a stained site which has a less intricate contour. Specifically, the "perimeter" of a stained site is calculated, in principle, by counting, from the pixels that make up the stained site image (2 pixels×2 pixels at minimum), the number of pixels that form the contour of the stained area and are not in contact with other pixels. However, as an exception, for a pixel that is in contact with other pixels only on its two orthogonal sides, its diagonal length is calculated as the number of the pixel in order to round off the corners of the contour.

The same procedure can also be used for determining the shape-related parameters of a CFW-stained frozen section. A CFW-stained frozen section is observed and photographed under a fluorescence microscope with a 200× field of view, and the taken photograph is subjected to image analysis for extracting CFW-stained sites as pixel clusters. Specifically, the maximum distance between two points on the contour line for each CFW-stained site (with the longest diameter of 1 μm or more) on the obtained image is determined as the "longest diameter" of each CFW-stained site. In addition, "{the longest diameter of each CFW-stained site image} divided by {the distance between two straight lines parallel to the longest diameter of each CFW-stained site and tangent to the contour of the CFW-stained site}" is determined as the "aspect ratio" of each CFW stained site. The arithmetic average is calculated for each of the longest diameters and the aspect ratios of the CFW-stained sites on the obtained image and used for evaluation.

For analyzing each of the above parameters related to the shape of the stained sites in consideration of the magnified image of the microscope, the respective values can be converted to actual measurements based on the pixel count of the image of a known length (e.g., a scale bar).

*Feature (a): Ratio of the Number of Specific CBB-Stained Sites:

The composition of one or more embodiments of the present invention may be characterized in that when it is made into a frozen section and observed with CBB staining according to the procedure explained above, the ratio of [the number of stained sites having areas of 200 μm² or more and degrees of roundness of 0.3 or more] to [the number of stained sites having areas of 30 μm² or more] is equal to or higher than a predetermined value (feature (a)). This physical property is desirable since when heat-cooked, the composition of one or more embodiments of the present invention satisfying this feature tends to have an appropriate degree of elasticity, with its rubbery texture being suppressed, and exhibit a texture that passes smoothly through the teeth when chewed. The principle of this is unknown, but presumably because the presence of structures of the specific stained sites (which are thought to be mainly composed of protein) in the starch structure that serves as a matrix results in production of voids at the interface (which are mechanically weak) of the stained site structures when the starch structure swells during heat cooking, thereby changing the overall texture of the composition after cooking.

Specifically, when the composition of one or more embodiments of the present invention is made into a frozen section and observed with CBB staining according to the procedure explained above, the ratio of [the number of stained sites having areas of 200 μm² or more and degrees of roundness of 0.3 or more] to [the number of stained sites having areas of 30 μm² or more] may typically be 3% or more, preferably 4% or more, more particularly 5% or more, still particularly 6% or more, or 7% or more, or 8% or more, or 9% or more, especially 10% or more. On the other hand, the upper limit of that ratio is not particularly limited, but from the viewpoint of industrial productivity, it may preferably be typically 65% or less.

*Feature (b): Total Area Ratio of Specific CBB-Stained Sites:

The composition of one or more embodiments of the present invention may also be characterized in that when it is made into a frozen section and observed with CBB staining according to the procedure explained above, the ratio of the total area of stained sites having areas of 200 μm² or more and degrees of roundness of 0.3 or more to the area of the composition section image is equal to or higher than a predetermined value (feature (b)). This physical property is desirable since when heat-cooked, the composition of one or more embodiments of the present invention satisfying this feature tends to exhibit a texture that passes smoothly through the teeth when chewed. The principle of this is unknown, but presumably because the presence of structures of the specific stained sites (which are thought to be mainly composed of protein) in the starch structure that serves as a matrix results in production of voids at the interface (which are mechanically weak) of the stained site structures when the starch structure swells during heat cooking, thereby changing the overall texture of the composition after cooking.

Specifically, the composition of one or more embodiments of the present invention is made into a frozen section and observed with CBB staining according to the procedure explained above, the ratio of the total area of stained sites having areas of 200 μm² or more and degrees of roundness of 0.3 or more to the area of the composition section image may preferably be typically 0.3% or more, preferably 0.4% or more, more particularly 0.5% or more, still particularly 0.6% or more, or 0.7% or more, or 0.8% or more, or 0.9% or more, especially 1.0% or more. On the other hand, the upper limit of that ratio is not particularly limited, but from the viewpoint of industrial productivity, it may preferably be typically 20% or less.

*Feature (c): 90th Percentile Score of Areas of Specific CBB-Stained Sites:

The composition of one or more embodiments of the present invention may also preferably be characterized in that when it is made into a frozen section and observed with CBB staining according to the procedure explained above, the 90th percentile score of the areas of stained sites having areas of 30 µm² or more is equal to or lower than a predetermined value (feature (c)). This physical property is desirable since when heat-cooked, the composition of one or more embodiments of the present invention satisfying this feature tends to exhibit a smooth texture.

Specifically, the composition of one or more embodiments of the present invention is made into a frozen section and observed with CBB staining according to the procedure explained above, the 90th percentile score of the areas of stained sites having areas of 30 µm² or more may preferably be typically 3500 µm² or less, particularly 3000 µm² or less, more particularly 2500 µm² or less, or 2000 µm² or less, or 1500 µm² or less, especially 1000 µm² or less. On the other hand, the lower limit of that ratio is not particularly limited, but may preferably be typically more than 200 µm², particularly more than 300 µm².

The "Nth-percentile score" herein refers to a value that is ranked at a specific percentile (or nearest neighbor rank if there is no perfect match) counting from the smallest number in a distribution of measurements (in this case, the areas of stained sites) ordered from the smallest number to the largest number. For example, the 90th percentile score for the areas of 1000 stained sites is the area of the stained site that is ranked at the 900th position counting from the smallest area.

*Feature (d): Number of Specific Large CBB-Stained Sites:

The composition of one or more embodiments of the present invention may also be characterized in that when it is made into a frozen section and observed with CBB staining according to the procedure explained above, the number of stained sites having areas of 30 µm² or more and longest diameters of 200 µm or more in the composition section image is equal to or lower than a predetermined value (feature (d)). This physical property is desirable since when heat-cooked, the composition of one or more embodiments of the present invention satisfying this feature tends to retain the continuity of the matrix-like starch structure spread in the composition, with increased elasticity and reduced fuzzy texture.

Specifically, the composition of one or more embodiments of the present invention is made into a frozen section and observed with CBB staining according to the procedure explained above, the number of stained sites having areas of 30 µm² or more and longest diameters of 200 µm or more in the composition section image may preferably be typically 40 or less, particularly 30 or less, more particularly 20 or less, or 10 or less, or 5 or less, or 3 or less, or 1 or less, especially 0.

The "longest diameter" of a stained site herein can be calculated from the maximum distance between two points on the contour of the stained site image that can be observed visually (if two or more stained sites overlap with each other, the contour line of each of the stained sites should be identified visually for calculating the longest diameter for each stained site).

*Feature (e): Longest Diameters and/or Aspect Ratios of CFW-Stained Sites:

The composition of one or more embodiments of the present invention may also preferably be characterized in that when it is made into a frozen section with CFW staining frozen section and observed under fluorescence microscope, the CFW-stained sites have specific shapes. Specifically, each of the average of the longest diameters of CFW-stained sites and/or the average of the aspect ratios may preferably be equal to or lower than a predetermined value. The thus-obtained CFW-stained sites are deemed to have insoluble dietary fiber-dominated structures.

Specifically, the arithmetic average of the longest diameters of the CFW-stained sites in the frozen section according to the procedure explained above may preferably be 450 µm or less, more preferably 400 µm or less, more preferably 350 µm or less, more preferably 300 µm or less, more preferably 250 µm or less, more preferably 200 µm or less, more preferably 150 µm or less, more preferably 100 µm or less, more preferably 80 µm or less, more preferably 60 µm or less, more preferably 50 µm or less. If the average of the longest diameters of the CFW-stained sites exceeds the aforementioned limits, the effect of one or more embodiments of the present invention may be difficult to achieve. The principle of this is unknown, but presumably because insoluble dietary fiber particles with large longest diameters interfere with the formation of starch and other matrix structures, making it difficult to achieve the effects of one or more embodiments of the present invention. On the other hand, the lower limit of the arithmetic average of the longest diameters of the CFW-stained sites is not particularly limited, but it may preferably be typically 2 µm or more, more preferably 3 µm or more.

Likewise, the arithmetic average of the aspect ratios of the CFW-stained sites in the frozen section according to the procedure explained above may preferably be 5.0 or less, more preferably 4.5 or less, more preferably 4.0 or less, more preferably 3.5 or less, more preferably 3.0 or less, more preferably 2.5 or less, more preferably 2.0 or less. If the average of the aspect ratios of the CFW-stained sites exceeds the aforementioned limits, the effect of one or more embodiments of the present invention may be difficult to achieve. The principle of this is unknown, but presumably because insoluble dietary fiber particles with large aspect ratios interfere with the formation of starch and other matrix structures, making it difficult to achieve the effects of one or more embodiments of the present invention. On the other hand, the lower limit of the arithmetic average of the aspect ratios of the CFW-stained sites is not particularly limited, but it may preferably be typically 1.1 or more, more preferably 1.3 or more.

The CFW staining of frozen sections and the measurement of the arithmetic averages of the longest diameters and the aspect ratios of CFW-stained sites in the frozen sections can be performed according to the conditions described above.

*Cut Plane of Frozen Sections:

The composition of one or more embodiments of the present invention is characterized in that when it is cryo-sectioned and observed with CBB staining and/or CFW staining according to the procedure mentioned above, it satisfies the features (a) and (b) mentioned above, and also preferably the feature(s) (c) and/or (d) and/or (e) mentioned above. In this regard, the composition of one or more embodiments of the present invention may satisfy the features (a) and (b) above (and preferably the feature(s) (c) and/or (d) and/or (e) above) for a frozen section obtained by cutting the frozen composition along any cut plane.

However, the composition of one or more embodiments of the present invention may preferably satisfy the features (a) and (b) above (and preferably the feature(s) (c) and/or (d) and/or (e) above) at least for a frozen section A1, which is obtained by cutting the frozen composition along a cut plane A1 orthogonal to the longitudinal axis of the composition. For example, in the case of compositions manufactured via extrusion, e.g., using an extruder, the extruded direction of the composition corresponds to the longitudinal axis.

The composition of one or more embodiments of the present invention may more preferably be characterized in that when the parameters related to the shapes of stained sites are measured according to the procedure mentioned above for both a frozen section A1, which is obtained by cutting the frozen composition along an arbitrary cut plane A1, and a frozen section A2, which is obtained by cutting the frozen composition along a cut plane A2 orthogonal to the cut plane A1, the averages of the parameters obtained for the frozen sections A1 and A2 satisfy the features (a) and (b) above (and preferably the feature(s) (c) and/or (d) and/or (e) above). The composition of one or more embodiments of the present invention may still more preferably be characterized in that both the parameters obtained for the frozen section A1 and the parameters obtained for the frozen section A2 satisfy the features (a) and (b) above (and preferably the feature(s) (c) and/or (d) and/or (e) above). In this case, the cut plane A1 may preferably be a plane orthogonal to the longitudinal axis of the composition, while the cut plane A2 may preferably be a plane parallel to the longitudinal axis of the composition.

If the distribution of stained sites in a composition is uniform, the structure of the entire composition can be estimated by observing the structure of an arbitrary section as a representative site. However, if the distribution of stained sites is uneven, the stained sites on multiple cut surfaces can be observed, and the results of these observations can be added together to obtain a measurement of the stained sites of the entire composition.

(4) Properties Related to Smooth Tissue Part in the Frozen Section of the Composition:

The composition of one or more embodiments of the present invention may preferably be characterized in that when its frozen section obtained under specific conditions is observed, it satisfies the features related to smooth tissue part explained below.

*Production of Frozen Section of the Composition and Observation of its Smooth Tissue Part:

For the measurement of these features, the composition is frozen at −25° C. (without heating in water as described in Section (3) above), and then cut into a section with a thickness of 30 μm along a specific cut plane and observed.

Specifically, the procedure for preparing and observing the frozen section of the composition is not limited, but may preferably be as follows. The composition is cut into sections with a thickness of 30 μm at −25° C. according to the Kawamoto method described above. The frozen sections of the composition thus obtained are then placed under the field of view of a microscope with a magnification of 200×, for example, and color photographs with pixel counts of 136 0×1024 color photographs are taken for analysis.

*Feature (f): Smooth Tissue Part Along the Contour of the Composition:

The composition of one or more embodiments of the present invention may preferably be characterized in that when the frozen sections obtained by freezing and sectioning in the procedure described above are observed, it has a smooth tissue part with an average thickness of a predetermined value or more, along a predetermined percentage or more of the periphery of the composition on the cut surface (feature (f)). This physical property is desirable since the composition of one or more embodiments of the present invention satisfying this feature tends to prevent its components from leaking out during heat cooking. The reason for this is unknown, but presumably because of the following mechanism. When the composition is held for a certain period of time with a dry mass basis moisture content of a predetermined value or higher (e.g., 25 mass % or more), the starch on the surface of the composition ages locally, forming a structure along the periphery of the composition that can be cut relatively smoothly compared to the interior of the composition, and this structure is observed as a smooth tissue part when the composition is cryosectioned.

The "smooth portion" herein refers to a layer structure with an average thickness of a predetermined value or more, observed along the periphery of the frozen composition section image, and having a lighter color and less uneven appearance than the non-smooth portion. The "average thickness" of the smooth tissue part herein refers to the average value of the width of the smooth tissue part in the direction perpendicular to the periphery of the composition on the cut surface, when measured along the periphery of the composition.

Specifically, the smooth tissue part may preferably be formed along 30% or more, or 40% or more, or 50% or more, particularly 60% or more, more particularly 70% or more, still particularly 80% or more, or 90% or more, especially 100% (i.e., along the entire periphery of the composition on the cut plane) of the periphery of the composition on the cut plane. The smooth tissue part may also have an average thickness of typically 18 μm or more, or 20 μm or more, particularly 25 μm or more, more particularly 30 μm or more.

*Feature (g): Ratio of the Number of Specific CBB-Stained Sites in Smooth Tissue Part:

The composition of one or more embodiments of the present invention may also be characterized in that when the frozen sections obtained by freezing and sectioning in the procedure described above are observed, it has CBB-stained sites in its smooth tissue part. The composition having CBB-stained sites, which are deemed to be mainly composed of proteins, inside the smooth tissue part tends to have a good quality that prevents the composites from binding to each other.

Specifically, the composition of one or more embodiments of the present invention is made into a frozen section and observed with CBB staining according to the procedure explained above, the ratio of [the number of stained sites having areas of 200 μm$^2$ or more and degrees of roundness of 0.3 or more] to [the number of stained sites having areas of 30 μm$^2$ or more] in the smooth tissue part may preferably be typically 3% or more, preferably 4% or more, more particularly 5% or more, still particularly 6% or more, or 7% or more, or 8% or more, or 9% or more, especially 10% or more. On the other hand, the upper limit of that ratio is not particularly limited, but from the viewpoint of industrial productivity, it may preferably be typically 65% or less.

The conditions for CBB staining are as described in Section (3) above, and the details of the smooth tissue part is as described for Feature (f) above.

*Feature (h): Average Crystallinity According to X-Ray Diffraction Method:

In addition to the formation of smooth tissue parts confirmed in the frozen section as described above, the composition of one or more embodiments of the present invention may preferably be characterized in that the average crystallinity measured by the X-ray diffraction method is higher in the non-smooth tissue part in the interior of the composition (e.g., around the center of the composition)

than in the smooth tissue part, which is along the periphery of the composition. Specifically, the average crystallinity at a predetermined number (e.g., two or more, e.g., five or ten) of measurement points in the non-smooth tissue part (e.g., around the center of the composition) may preferably be higher than the average crystallinity of a predetermined number (e.g., two or more, e.g., five or ten) of measurement points in the smooth tissue part.

Specifically, the composition of one or more embodiments of the present invention may preferably may preferably be characterized in that when the average crystallinity is determined by measuring the cross-section of the composition by X-ray diffraction method, the average crystallinity in the non-smooth tissue part in the interior of the composition (e.g., around the center of the composition) is higher than that in the smooth tissue part at the periphery of the composition. It may be more preferable that the average crystallinity of the smooth tissue part is zero (i.e., no peaks are detected) or that the average crystallinity ratio (i.e., the ratio of the average crystallinity in the non-smooth tissue part to the average crystallinity in the smooth tissue part) is greater than 1. The average crystallinity ratio may more preferably be particularly 1.1 or more, more particularly 1.3 or more, or 1.5 or more, or 1.7 or more, or 2.0 or more, or 2.5 or more, or 3.0 or more. The upper limit of the average crystallinity ratio is not particularly limited, but may be 100 or less. The average crystallinity in the smooth tissue part may be 0, but it may preferably be higher than 0 (i.e., any peak may preferably be detected). It is still more preferred that both the average crystallinity in the smooth tissue part and the average crystallinity in the non-smooth tissue part (e.g., around the center of the composition) are higher than 0. The "periphery" of a composition herein refers to a region adjacent to the contour of the composition on a cross section thereof, while the "center" of a composition herein refers to a region including the midpoint between the entrance point and the exit point of a virtual line that penetrates vertically from the surface of the composition through the interior in a cross section of the composition. For example, if a section of the composition cut by a plane perpendicular to the longitudinal axis of the composition is circular, the center point of the circle and its surrounding area correspond to the center of the composition. The method of measuring the average crystallinity by the X-ray diffraction method will be described in detail later.

*Cut Plane of Frozen Sections:

The composition of one or more embodiments of the present invention may preferably be characterized in that when it is cryosectioned according to the procedure mentioned above, it satisfies the feature (f) mentioned above, and also preferably the feature(s) (g) and/or (h) mentioned above. In this regard, the composition of one or more embodiments of the present invention may satisfy the feature (f) above (and preferably the feature(s) (g) and/or (h) above) for a frozen section obtained by cutting the frozen composition along any cut plane.

However, the composition of one or more embodiments of the present invention may preferably satisfy the feature (f) above (and preferably the feature(s) (g) and/or (h) above) at least for a frozen section B1, which is obtained by cutting the frozen composition along a cut plane B1 orthogonal to the longitudinal axis of the composition. The "longitudinal axis" of a composition herein refers to a longitudinal direction of a hypothetical rectangle with a minimum volume inscribed in the composition, while the "transverse axis" of a composition herein refers to a line perpendicular to the longitudinal axis. For example, in the case of a composition manufactured using extrusion, e.g., using an extruder, the extrusion direction of the composition in the state before being cut corresponds to the longitudinal axis.

The composition of one or more embodiments of the present invention may more preferably be characterized in that when the parameters related to the smooth tissue part are measured according to the procedure mentioned above for both a frozen section B1, which is obtained by cutting the frozen composition along an arbitrary cut plane B1, and a frozen section B2, which is obtained by cutting the frozen composition along a cut plane B2 orthogonal to the cut plane B1, the averages of the parameters obtained for the frozen sections B1 and B2 satisfy the feature (f) above (and preferably the feature(s) (g) and/or (h) above). The composition of one or more embodiments of the present invention may still more preferably be characterized in that both the parameters obtained for the frozen section B1 and the parameters obtained for the frozen section B2 satisfy the feature (f) above (and preferably the feature(s) (g) and/or (h) above). In this case, the cut plane B1 may preferably be a plane orthogonal to the longitudinal axis of the composition, while the cut plane B2 may preferably be a plane parallel to the longitudinal axis of the composition.

If the distribution of stained sites in a composition is uniform, the structure of the entire composition can be estimated by observing the structure of an arbitrary section as a representative site. However, if the distribution of stained sites is uneven, the stained sites on multiple cut surfaces can be observed, and the results of these observations can be added together to obtain a measurement of the smooth tissue part of the entire composition.

(5) Other Properties of the Composition:
*Starch Grain Structure:

The composition of one or more embodiments of the present invention may preferably be further characterized in that the number of starch grain structures observed under specific conditions is equal to or lower than a predetermined value, since the CBB-stained sites in the CBB-stained frozen section described above tend to develop into preferable shapes. The principle of this is unknown, but it is presumably because of the reason as follows. When a composition whose starch grain structures have been disrupted is subjected to strong kneading treatment under high-temperature and high-pressure conditions, CBB-stained site structures can easily develop into desirable shapes and sizes in three dimensions in the starch structure which serves as the matrix, whereby the texture improvement effect described above can be expressed more strongly, resulting in a more desirable quality.

The starch grain structure herein refers to an iodine-stained structure that has a circular shape with a diameter of 1 to 50 μm on a flat image, and can be observed under a magnified field of view of, e.g., a 6% water suspension of a crushed product of the composition in water. Specifically, a 6% suspension of the composition powder is prepared by screening the pulverized product of the composition through a sieve with a mesh opening of 150 μm, and suspending 3 mg of the composition powder which has passed through the 150-μm sieve in 50 μL of water. A sample is prepared by placing this suspension on a slide, and observed either using a phase contrast microscope under polarized light or under an optical microscope with iodine-staining the sample. The magnification ratio is not limited, but may be, for example, 100× or 200×. If the starch grain structure is uniformly distributed in the prepared sample, the percentage of starch grain structure in the entire sample can be estimated by observing a representative field of view of the sample. On the other hand, if the distribution of the starch grain structure in the sample is uneven, a predetermined number of fields of view (e.g., two or more, e.g., five or ten) in the sample may be observed, and the results of the observations may be added together as the measurement for the entire sample.

Specifically, the number of the starch grain structures in the composition of one or more embodiments of the present invention observed under the conditions mentioned above may preferably be typically 300/mm$^2$ or less, particularly 250/mm$^2$ or less, more particularly 200/mm$^2$ or less, still particularly 150/mm$^2$, or 100/mm$^2$ or less, or 50/mm$^2$ or less, or 30/mm$^2$ or less, or 10/mm$^2$ or less, especially 0/mm$^2$.

The terms "crushed product" of a composition, "composition crushed product," or "crushed composition" herein refers to, unless otherwise specified, a composition crushed so as to have a particle size $d_{50}$ (preferably both $d_{50}$ and $d_{90}$) after ultrasonic treatment of about 1000 μm or less. The lower limit of the particle size $d_{50}$ and/or $d_{90}$ (preferably both the particle size $d_{50}$ and $d_{90}$) after ultrasonic treatment is not particularly limited, but it may preferably be typically 1 μm or more.

*Soluble γ-Amino Butyric Acid (GABA) and Soluble Leucine (LEU) in the Composition:

The composition of one or more embodiments of the present invention may preferably be characterized in that each of the content(s) of soluble γ-amino butyric acid (GABA) and/or soluble leucine (LEU) in the composition in terms of mass is equal to or lower than a predetermined value, since this feature serves to provide the broth after heat cooking with good flavor and less bitterness. The principle of this is unknown, but presumably because the starch in the composition structure becomes matrix-like via kneading and incorporates certain amino acids in their insoluble forms.

Specifically, the soluble GABA content in the composition of one or more embodiments of the present invention may preferably be typically 25 mg % or less, particularly 20 mg % or less, more particularly 15 mg % or less, especially 10 mg % or less, and the soluble leucine content in the composition of one or more embodiments of the present invention may preferably be typically 10 mg % or less, particularly 8 mg % or less, more particularly 6 mg % or less. The lower limits of the soluble GABA and soluble leucine contents are not particularly limited, but each of these contents may preferably be typically 0.1 mg % or more.

In addition, the ratio of each of the soluble GABA and/or soluble leucine content(s) to the total contents of soluble amino acids in the composition of one or more embodiments of the present invention in terms of mass may preferably be equal to or lower than a predetermined value. Specifically, the ratio of the soluble GABA content to the total contents of soluble amino acids in the composition of one or more embodiments of the present invention in terms of mass may preferably be typically 1.5 mass % or less, particularly 1.3 mass % or less, more particularly 1.0 mass % or less, especially 0.7 mass % or less. The ratio of the soluble leucine content to the total contents of soluble amino acids in the composition of one or more embodiments of the present invention in terms of mass may preferably be 1.0 mass % or less, particularly 0.9 mass % or less, more particularly 0.8 mass % or less. The lower limits of the ratios of the soluble GABA and the soluble leucine contents to the total contents of soluble amino acids are not particularly limited, but each of these contents may preferably be typically 0.1 mass % or more.

The term "soluble AA (where AA means a specific amino acid name)" content in a composition herein refers to a value obtained by immersing one mass of the composition in 19 masses of water and treating it at 20° C. for 2 hours, and then measuring the amount of the specific amino acid leached into the water using the HPLC method. Even if the amino acid itself has a hydrophilic property, a low soluble amino acid content value may be obtained if the amino acid is present in its insoluble form in the composition. The total content of soluble amino acids in a composition herein refers to a total content of 23 amino acids (22 proteinogenic amino acids (including leucine) and GABA) leached into water by the above procedure. The 22 proteinogenic amino acids herein refers to alanine, cysteine, asparaginic acid, glutamic acid, phenylalanine, glycine, histidine, isoleucine, lysine, leucine, methionine, asparagine, pyrrolysine, proline, glutamine, arginine, serine, threonine, selenocysteine, valine, tryptophan, and tyrosine. The unit "mg %" herein refers to the mass of a solute in a 100 g solution expressed in mg.

The composition of one or more embodiments of the present invention may especially be characterized in that the soluble GABA and/or soluble leucine content(s) in the composition in the non-crushed state corresponds to a predetermined ratio or less relative to the soluble GABA and/or soluble leucine content(s) in the composition after crashed such that its $d_{90}$ value is within a range of from 50 μm to 1000 μm, since this feature serves to provide the composition with the desired properties of not adhering to each other after heat cooking while maintaining its good taste when eaten. The principle of this is unknown, but presumably because this feature represents that some starch near the surface of the composition forms a starch layer with different characteristics than normal, which is less permeable to moisture and less enzymatically reactive. Specifically, the ratio(s) of the soluble GABA and/or soluble leucine content(s) in the composition of after crushed to the soluble GABA and/or soluble leucine content(s) before crushed may preferably be typically 60 mass % or less, particularly 50 mass % or less, more particularly 40 mass % or less.

*Soluble Ingredients (Difference in Absorbance (500 nm) of 10 Volumes of Iodine Solution (0.25 mM)):

It may not be preferred to subject the composition of one or more embodiments of the present invention to a certain amount of heat or more during its production, since this may change the properties of the soluble ingredients present in the starch matrix of the composition and thereby result in an undesirable quality. The present composition's property of not causing its soluble constituents to easily leak off can be determined by treating the composition before and after crushed with iodine solutions (0.25 mM) and then measuring the absorbance of the solutions in the manner mentioned below. The "iodine solution" herein refers to a diluted solution of potassium iodide solution containing 0.05 mol/L of iodine (also referred to as "0.05 mol/L iodine solution" or "0.05 mol/L iodine liquid"). Unless otherwise specified, the iodine solution herein may be a diluted solution of a potassium iodide solution containing 93.7% by mass of water, 0.24 mol/L (4.0% by mass) of potassium iodide, and 0.05 mol/L (1.3% by mass) of iodine (e.g., "0.05 mol/L iodine solution" Fujifilm Wako Pure Chemical Co., Ltd.). A "0.25 mM iodine solution" can be prepared by diluting the 0.05 mol/L iodine solution 2,000 times with water When measuring a non-crushed composition, one mass of the composition (if there is any powder or other material adhering to the surface prior to the measurement, it should be removed so as not to scratch the surface of the composition) is put into 9 masses of iodine solution (25 mM) and, after left stand at room temperature (20° C.) for 3 minutes, the mixture is filtered through a 0.20 μm filter (Millex-LG, 0.20 μm hydrophilic polytetrafluoroethylene (PTFE), 13 mm), and the resulting filtrate is used for absorbance measurement. On the other hand, when measuring a crushed product of a composition, one mass of the crushed composition is soaked in 9 masses of iodine solution (25 mM) at 20° C. for 3 minutes, and then filtered through a 0.20 μm filter (Millex-LG, 0.20 μm hydrophilic polytetrafluoroethylene (PTFE), 13 mm), and the resulting filtrate is stained with iodine solution (final concentration: 0.25 mM) and subjected to absorbance measurement. The absorbance measurement is carried out using both the iodine solution before the addition of the non-crushed composition or the crushed composition (as the blank for calibration) and the filtrate of the iodine solution after the addition of the non-crushed composition or the crushed composition, and the absorbance (500 nm) of each solution is measured with a conventional spectrophotometer (e.g. Shimadzu UV-1800) using a square cell with an optical path length of 10 mm, and the difference in absorbance between the two solutions {(absorbance of the filtrate)–(absorbance of the iodine solution (calibration blank))} is determined as the content of soluble ingredients in the composition.

The composition of one or more embodiments of the present invention may preferably be characterized in that its difference in absorbance explained above is equal to or lower than a predetermined value, since the composition satisfying this feature has a texture which does not easily adhere to each other and does not become sticky after heat cooking. It is especially desirable to adjust the absorbance difference of the composition within a predetermined range from the viewpoint of preventing the cell tissue of the composition from being damaged due to drying of the composition and avoiding outflow of soluble ingredients.

Specifically, the absorbance difference in the iodine solution treated with the composition of one or more embodiments of the present invention in the non-crushed state as determined according to the above method may preferably be typically 0.70 or less, particularly 0.65 or less, more particularly 0.60 or less, still particularly 0.50 or less, or 0.40 or less, or 0.30 or less, or 0.25 or less, especially 0.20 or less. The absorbance difference in the iodine solution treated with the composition of one or more embodiments of the present invention in the crushed state as determined according to the above method may preferably be typically 1.20 or less, particularly 1.10 or less, more particularly 1.00 or less, still particularly 0.90 or less, or 0.80 or less, or 0.70 or less, or 0.60 or less, or 0.50 or less, or 0.40 or less, especially 0.30 or less. The lower limit of the absorbance difference in the iodine solution treated with the composition of one or more embodiments of the present invention either in the non-crushed state or in the crushed state is not particularly limited, but may be typically −0.20 or more for the composition in each state.

When producing the composition of one or more embodiments of the present invention, process conditions such as temperature, pressure, SME value, dwell time, etc. can be adjusted as appropriate using the absorbance difference as an indicator so that the absorbance difference measured for the resulting composition satisfies the aforementioned range. The specific conditions will be described later. However, from the viewpoint of adjusting the absorbance difference to within the predetermined range, it may particularly be preferred to set the heating temperature to a predetermined temperature (e.g., 200° C.) or lower. Specifically, if a raw material of the composition is heated (e.g., at 80° C. or higher) in a powder state with a large surface area and a low dry mass basis moisture content (25 mass % or lower), the starch not only on the surface of the composition but also inside the composition may be decomposed and solubilized due to heating, resulting in a composition from which the decomposed starch can easily leak out. It is therefore preferable to use a raw material that has not been heated (e.g., at 80° C. or higher) in its powder form.

*Degree of Gelatinization of Starch:

The degree of gelatinization of starch in the composition of one or more embodiments of the present invention may preferably be equal to or higher than a predetermined value, from the viewpoint of improving the formability of the composition. Specifically, the degree of gelatinization of starch in the composition of one or more embodiments of the present invention may preferably be typically 30% or more, particularly 40% or more, more particularly 50% or more, still particularly 60% or more, especially 70% or more. The upper limit of the degree of gelatinization is not particularly limited, but this this value is too high, then the starch may decompose and render the resulting composition sticky. Therefore, the upper limit of the degree of gelatinization may preferably be 99% or less, particularly 95% or less, more particularly 90% or less. The degree of gelatinization in a composition herein can be measured using the Glucoamylase No. 2 method, which is modified from the Central Customs Analysis Office method (following the method of Japan Food Research Laboratories: https://www.jfrl.or.jp/storage/file/221.pdf).

It may also be preferred that the starch in the composition before the gelatinization step (step (i) below) has been pre-heated beforehand at a certain temperature or more. The pre-heating temperature may preferably be 80° C. or more, particularly 90° C. or more, more particularly 100° C. or more, or 110° C. or more, or 120° C. or more. The upper limit of the pre-heating temperature is not particularly limited, but it may be typically 200° C. or less, or 180° C. or less. In addition, starch pre-heated at a high temperature with a dry mass basis moisture content of a predetermined value or less may have low processability characteristics due to pyrolysis. Therefore, the starch subjected to the pre-heating may preferably have a dry mass basis moisture content of a predetermined value or less. Specifically, the dry mass basis moisture content of the starch subjected to the pre-heating may preferably be typically more than 40 mass %, particularly more than 45 mass %, more particularly more than 50 mass %, still particularly more than 55 mass %, or more than 60 mass %, or more than 65 mass %, or more than 70 mass %, or more than 75 mass %, especially more than 80 mass %. The upper limit of the dry mass basis moisture content is not particularly limited, but it may be typically 200 mass % or less, or 175 mass % or less, or 150 mass % or less.

*Glucoamylase Treatment:

The composition of one or more embodiments of the present invention may preferably be characterized in that when the composition is subjected to glucoamylase treatment and then the glucose content in the treatment solution is measured under predetermined conditions, the resulting glucose content is equal to or lower than a predetermined value, since the composition satisfying this feature may have the property of preventing its ingredients from easily leaking off during heat cooking. The principle of this is unknown, but presumably because the composition with such property is deemed to have a compositional structure with low enzymatic reactivity on the compositional surface. Specifically, when the composition is maintained with a high dry mass basis moisture content (e.g., 25 mass % or more) for a certain amount of time, the starch on the surface of the composition may be locally aged to form a starch layer with low enzymatic reactivity. This suggests that a part of the starch near the surface of the composition may form a starch layer with different characteristics than usual (especially a starch layer enclosing therein CBB-stained sites, which are thought to be mainly composed of protein) that is less permeable to water and less enzymatically reactive, thus resulting in the composition having the desirable property of preventing its ingredients from easily leaking off during heat cooking.

Specifically, when one mass of the composition of one or more embodiments of the present invention is put into 9 masses of 1% glucoamylase (Amyloglucosidase solution from *Aspergillus niger*: Product Number A9913, available from Sigma) aqueous solution at 20° C. treated for 2 hours, the glucose content in the resulting reaction solution may preferably be typically less than 2.40 mass %, particularly 2.30 mass % or less, more particularly 2.20 mass % or less, still particularly 2.10 mass % or less, or 2.00 mass % or less, or 1.90 mass % or less, or 1.80 mass % or less, or 1.70 mass % or less, or 1.60 mass % or less, or 1.50 mass % or less, or 1.40 mass % or less, or 1.30 mass % or less, or 1.20 mass % or less, or 1.10 mass % or less, or 1.00 mass % or less, or 0.90 mass % or less, or 0.80 mass % or less, or 0.70 mass % or less, or 0.60 mass % or less, or 0.50 mass % or less, especially 0.40 mass % or less. In addition, the ratio of the glucose content in the 1% glucoamylase reaction solution (10 mass % of the sample is treated at 20° C. for 2 hours) to the starch content in the composition in terms of dry mass basis (mass %) may preferably be less than 5 mass %, more preferably less than 4 mass %, still more preferably less than 3 mass %. The lower limit of the ratio is not particularly limited, but typically 0 mass % or more. Incidentally, when a composition is crushed upon measurement of the glucose content as explained above, the cross-section of the composition exposes the internal structure where the glucoamylase reaction is likely to occur. Accordingly, when the glucose content of a composition is measured, the composition should be put into the 1% glucoamylase solution as it is, with as little destruction made as possible.

The composition of one or more embodiments of the present invention may also preferably be characterized in that when the composition either in a non-crushed state or in a crushed state (specifically, the composition crushed so as to adjust its $d_{90}$ and/or $d_{50}$ value(s) after ultrasonic treatment to about 100 µm) is subjected to glucoamylase treatment and then the glucose content in the treatment solution is measured under predetermined conditions as explained above, the ratio of the glucose content obtained from the non-crushed composition to the glucose content obtained from the crushed composition is equal to or lower than a predetermined value, since the composition satisfying this feature may require only a short period of heat cooking. The principle of this is unknown, but considering that enzymatic reactivity is enhanced in powder compositions, this is presumably because when the dough composition is maintained with a high dry mass basis moisture content (e.g., 25 mass % or more) for a certain amount of time, the starch on the surface of the composition locally ages and forms a starch layer with low enzymatic reactivity relative to the entire composition. In other words, the presence of an aged starch layer near the surface of the composition, which has different characteristics from normal starch layers with low moisture penetration and low enzymatic reactivity, is deemed to result in the composition that can be cooked quickly without leaking ingredients during cooking.

Specifically, when one mass of the composition of one or more embodiments of the present invention either in the non-crushed state and in the crushed state is put into 9 mass parts of 1% glucoamylase aqueous solution and treated at 20° C. for 2 hours, the ratio of the glucose content in the reaction solution (mass %) treated with the non-crushed composition to the glucose content in the reaction solution (mass %) treated with the crushed composition may preferably be typically 50% or less, particularly 45% or less, more preferably 40% or less, more preferably 35% or less, more preferably 30% or less, still more preferably 25% or less.

The heat-cooking time required for the composition of one or more embodiments of the present invention to exhibit a desirable taste may preferably be 10 minutes or less, more preferably 8 minutes or less, and even more preferably 6 minutes or less.

*Average Crystallinity According to X-Ray Diffraction Method:

The composition of one or more embodiments of the present invention may be characterized in that when an average crystallinity is measured according to the X-ray diffraction at different parts on a cross-section of the composition, the resulting average crystallinity is higher at the center of the composition than at the periphery of the composition. The composition of one or more embodiments of the present invention satisfying this feature has the property of preventing its ingredients from easily flowing out from inside the composition during heat cooking. The reason for this is not clear, but presumably because among the matrixed starch structures in the composition, the structure consisting mainly of highly crystalline starch (considered to be mainly aged starch) localized near the center of the composition may inhibit the outflow of the ingredients inside the composition.

Specifically, when a cross-section of the composition of one or more embodiments of the present invention is measured according to the X-ray diffraction method to determine an average crystallinity at different parts on the cross-section, the resulting average crystallinity may preferably be higher at the center of the composition than at the periphery of the composition. The composition may more preferably be characterized in that the average crystallinity in the smooth tissue part is 0 (i.e., no peak is detected). The average crystallinity ratio (i.e., the ratio calculated as (the average crystallinity at the center of the composition)/(the average crystallinity at the periphery of the composition)) may preferably be 1 or more, particularly 1.1 or more, more particularly 1.3 or more, or 1.5 or more, or 1.7 or more, or 2.0 or more, or 2.5 or more, or 3.0 or more. The upper limit of the average crystallinity ratio is not particularly limited, but may be 100 or less. The average crystallinity at the periphery of the composition may be 0, but may preferably be higher than 0 (i.e., any peak is detected). More particularly, the composition may more preferably have an average crystallinity of higher than 0 both at the periphery of the composition and the average crystallinity at the center of the composition. The "periphery" of a composition herein refers to a region adjacent to the contour of the composition on a cross section thereof, while the "center" of a composition herein refers to a region including the midpoint between the entrance point and the exit point of a virtual line that penetrates vertically from the surface of the composition through the interior in a cross section of the composition. For example, if a section of the composition cut by a plane perpendicular to the longitudinal axis of the composition is circular, the center point of the circle and its surrounding area correspond to the center of the composition.

The "crystallinity" herein can be determined according to the X-ray diffraction method using a microparticle X-ray diffractometer, by measuring the peak intensity of a diffracted X-ray peak detected in a range at a diffraction angle 2θ of from 16 degrees (deg) to 18 degrees (the peak top is typically detected in the range of from 17 to 17.5 degrees, more typically near 17 degrees). Specifically, the "crystallinity" can be determined for a flat cut section of the composition cut vertically from its surface to its interior, according to the X-ray diffraction method using a microparticle X-ray diffractometer, by measuring the peak intensity of a diffracted X-ray peak at each of a limited number of measurement points (e.g., two or more, e.g., five or ten) for each of a region near the periphery of the composition and a region near the center of the composition on the cut surface, and integrating the peak areas. For more specific measurement conditions, for example, a D8 DISCOVER with VANTEC2000 manufactured by Bruker AXS can be used as the microparticle X-ray diffractometer, and the peak areas in the diffracted X-ray graph obtained from the measurement can be integrated under the following conditions, and the value obtained can be used as the average crystallinity.

(Optical System Conditions on the Incident Side)
Source: Cu Kα (λ=1.54056 Å), Output: 50 kV, 100 mA
Divergence angle: 0.1 deg, Irradiation system: 50 μmφ, Incident angle (ω): 3 deg, Step width: 0.0200 deg, Measurement range: 4 deg to 34 deg
(Optical System Conditions on the Receiving Side)
Acquisition angle: Header direction (χ)±15 deg
Counter: VANTEC2000 (2048 pixel mode)
Distance between sample and counter: 20 cm
Measurement time: 600 sec/frame

*Non-Swollen Composition:

The composition of one or more embodiments of the present invention may preferably be characterized in that it does not correspond to a swollen food (especially not to a swollen food whose density specific gravity is less than 1.0 due to swelling). In this regard, the composition of one or more embodiments of the present invention can be produced using a method in which after the dough is kneaded under high-temperature, high-pressure conditions, the temperature is usually lowered while preventing swelling with the pressure applied, and then the pressure is reduced to about atmospheric pressure.

[II: Method for Producing Solid Paste Composition for Heat Cooking]

One or more embodiments of the present invention relate to a method of producing the composition of one or more embodiments of the present invention (hereinafter also referred to as "the production method of the present invention").

(1) Summary:

The method for producing the composition of one or more embodiments of the present invention is not particularly limited, and may be any method so long as it can produce a composition satisfying the requirements mentioned above. Specifically, the aforementioned ingredients of the composition of the invention, for example, edible plants such as legumes, can be mixed with other ingredients, seasonings, and other components used as desired. If necessary, the mixture may be subjected to heating, molding, or other processing. Among others, The composition of one or more embodiments of the present invention can be efficiently produced by a specific method involving preparing a paste dough composition by mixing the aforementioned materials so as to satisfy the aforementioned requirements, kneading the paste dough composition under predetermined high-temperature and high-pressure conditions, and then lowering the temperature of the composition so as not to swell (hereinafter also referred to as the "production method of one or more embodiments of the present invention" as appropriate).

Specifically, the production method of one or more embodiments of the present invention includes steps (i) to (iii) below, and may further include step (iv) below.

(i) The step of preparing a paste dough composition having an insoluble dietary fiber content of 1.5 mass % or more in terms of wet basis, a starch content of 5.0 mass % or more in terms of wet basis, a protein content of 3.0 mass % or more in terms of wet basis, and a dry mass basis moisture content of 25 mass % or more.

(ii) The step of kneading the composition prepared in step (i) above at a temperature of from 100° C. to 200° C. with an SME value of 350 kJ/kg or more.

(iii) The step of cooling the composition kneaded in step (ii) above to a temperature at which the composition does not swell.

(iv) The step of maintaining the composition cooled in step (iii) above at a temperature at which the composition does not swell with a dry mass basis moisture content of 25 mass % or more for 0.1 hour or more.

The production method of one or more embodiments of the present invention will be explained in details below.

(2) Step (i): Preparation of Paste Dough Composition:

Step (i) is the step of preparing a paste dough composition having an insoluble dietary fiber content of 1.5 mass % or more in terms of wet basis (which may preferably be 2.0 mass % or more, more particularly 3 mass % or more, still particularly 4 mass % or more, or 5 mass % or more, or 6 mass % or more, or 7 mass % or more, or 8 mass % or more, or 9 mass % or more, especially 10 mass % or more, while the upper limit thereof is not particularly limited, but may be typically 25 mass % or less, or 20 mass % or less), a starch content of 5.0 mass % or more in terms of wet basis (which may preferably be 10 mass % or more, more particularly 15 mass % or more, still particularly 20 mass % or more, or 25 mass % or more, or 30 mass % or more, or 35 mass % or more, or 40 mass % or more, or 45 mass % or more, especially 50 mass % or more, while the upper limit thereof is not particularly limited, but typically 80 mass % or less, or 70 mass % or less), a protein content of 3.0 mass % or more in terms of wet basis (which may preferably be 4.0 mass % or more, more particularly 5.0 mass % or more, still particularly 6.0 mass % or more, or 7.0 mass % or more, or 8.0 mass % or more, or 9.0 mass % or more, or 10 mass % or more, or 11 mass % or more, or 12 mass % or more, or 13 mass % or more, or 14 mass % or more, or 15 mass % or more, or 16 mass % or more, or 17 mass % or more, or 18 mass % or more, or 19 mass % or more, or 20 mass % or more, or 21 mass % or more, especially 22 mass % or more, while the upper limit thereof is not particularly limited, but typically 70 mass % or less, or 60 mass % or less, or 50 mass % or less), and a dry mass basis moisture content of 25 mass % or more (which may preferably be 30 mass % or more, more particularly 35 mass % or more, still particularly 40 mass % or more, or 45 mass % or more, or 50 mass % or more, or 55 mass % or more, or 60 mass % or more, while the upper limit thereof is not particularly limited, but typically 200 mass % or less, or 175 mass % or less, or 150 mass % or less). The method for preparing the paste dough composition is not particularly limited, but the aforementioned raw materials for the composition of one or more embodiments of the present invention, preferably at least one or more kinds of pulse, may be mixed optionally with other one or more kinds of edible plant and/or other raw materials, and the mixture may be used as the paste dough composition. The "content" of insoluble dietary fiber, starch, or protein in the paste dough composition herein refers to a wet mass basis ratio calculated using the mass of the entire paste dough composition as the denominator and the content of each ingredient as the numerator, and can be adjusted so that each ingredient derived from the raw materials such as edible plants (e.g., pulse, which may preferably be used) satisfies the range specified above. The "wet mass" herein refers to the mass of the entire composition, etc., including the moisture content, and the content in terms of "wet mass basis" herein refers to the content ratio of each ingredient, calculated with the wet mass of the composition as the denominator and the content of each ingredient as the numerator.

When edible plant (e.g., pulse, which may preferably be used) is used as the raw material for the paste dough composition, the insoluble dietary fiber derived from such edible plant (e.g., pulse) may preferably have a size of a predetermined value or lower, since the kneading process does not significantly change the shape of the insoluble dietary fiber. In this connection, the size of insoluble fiber ($d_{90}$ and/or $d_{50}$) in randomly crushed pulse flour tends to be usually larger than 4.5 µm (this is because the shape of insoluble dietary fiber in pulse is usually rod-shaped, while the laser diffraction particle size distribution measurement used to measure the particle size herein tends to give a larger value for the particle size). Therefore, the raw materials used in one or more embodiments of the present invention (especially those containing hard tissues, such as pulse with seed skins) may preferably have undergone a specific crushing process in advance such that whose size insoluble dietary fiber is in a specific range. Specifically, as in the case of insoluble dietary fiber in the composition, when starch and protein of pulse (and optionally other edible plants) are degraded by amylase and protease treatment, and the remainder is subjected to ultrasonic treatment before its particle size distribution is measured, the resulting particle size $d_{90}$ and/or $d_{50}$ may preferably be equal to or lower than a predetermined range. Since this treatment degrades starch and protein among the ingredients of pulse (and optionally in other edible plants), and the particle size distribution of the resulting product is expected to reflect the particle size distribution of the insoluble fiber-dominated structure.

Specifically, the particle size $d_{90}$ of insoluble dietary fiber obtained by the above procedure for the edible plant (e.g., pulse) used as the raw material for the paste dough composition may preferably be 450 µm or less, more preferably 400 µm or less, more preferably 350 µm or less, more preferably 300 µm or less, more preferably 250 µm or less, more preferably 200 µm or less, more preferably 150 µm or less, more preferably 100 µm or less, more preferably 80 µm or less, more preferably 60 µm or less, more preferably 50 µm or less. Likewise, the particle size $d_{90}$ of insoluble dietary fiber in the edible plant (e.g., pulse) may preferably be 450 µm or less, more preferably 400 µm or less, more preferably 350 µm or less, more preferably 300 µm or less, more preferably 250 µm or less, more preferably 200 µm or less, more preferably 150 µm or less, more preferably 100 µm or less, more preferably 80 µm or less, more preferably 60 µm or less, more preferably 50 µm or less. If the particle size $d_{90}$ and/or the particle size $d_{50}$ of insoluble dietary fiber contained in the edible plant (e.g., pulse) exceeds the aforementioned range, it may be difficult to achieve the effects of the invention. The reason for this is not clear, but presumably because coarse insoluble fiber interferes with the formation of starch and other matrix structures, making it difficult to achieve the effects of the invention. On the other hand, the lower limit of each of the particle size $d_{90}$ and/or the particle size $d_{50}$ is not particularly limited, but it may preferably be usually 1 µm or more, and more preferably 3 µm or more.

In addition, the insoluble dietary fiber contained in the edible plant (e.g., pulse) used as the raw material of the paste dough composition may preferably have an aspect ratio of a predetermined value or lower, since the kneading process in step (ii) below does not significantly change the shape of the insoluble dietary fiber. In this connection, the aspect ratio of the CFW-stained sites observed in randomly crushed edible plant (e.g., pulse) tends to be usually larger than 5.0 (this is because the shape of insoluble dietary fiber in pulse is usually rod-shaped). In addition, since wind sorting of edible plant (e.g., pulse) flour removes edible plant particles with specific shapes, the aspect ratio of the CFW-stained sites of insoluble fiber in the resulting powder tends to be too high or too low. Therefore, it may be preferred to use edible plant (e.g., pulse) flour that has undergone a specific crushing process beforehand so as to adjust the arithmetic average of the aspect ratios of CFW-stained sites representing insoluble dietary fiber to within a specific range. Specifically, as in the case of the insoluble dietary fiber contained in the composition, when the edible plant (e.g., pulse) is subjected to the aforementioned amylase and protease treatment and then observed under a fluorescence microscope with CFW (Calcofluor White) staining, then the average value of the longest diameters and/or the average value of the aspect ratios of the CFW-stained sites may preferably be equal to or lower than a predetermined value. The CFW-stained areas thus obtained are deemed to have an insoluble fiber-dominated structure.

The arithmetic average of the longest diameters of the CFW-stained sites in the edible plant (e.g. pulse) measured by the above procedure may preferably be 450 µm or less, more preferably 400 µm or less, more preferably 350 µm or less, more preferably 300 µm or less, more preferably 250 µm or less, more preferably 200 µm or less, more preferably 150 µm or less, more preferably 100 µm or less, more preferably 80 µm or less, more preferably 60 µm or less, more preferably 50 µm or less. If the average of the longest diameters of the CFW-stained sites exceeds the above range, the effect of one or more embodiments of the present invention may be difficult to achieve. The reason for this is not clear, but presumably because insoluble dietary fiber particles having large longest diameters interfere with the formation of matrix structure such as starch, making it difficult to achieve the effect of the invention. On the other hand, the lower limit of the arithmetic average of the longest diameters of the CFW-stained sites is not particularly limited, but it may preferably be typically 2 µm or more, more preferably 3 µm or more.

The arithmetic average of the aspect ratios of the CFW-stained sites in the edible plant (e.g. pulse) measured by the above procedure may preferably be 5.0 or less, more preferably 4.5 or less, more preferably 4.0 or less, more preferably 3.5 or less, more preferably 3.0 or less, more preferably 2.5 or less, more preferably 2.0 or less. If the average of the aspect ratios of the CFW-stained sites exceeds the above range, the effect of one or more embodiments of the present invention may be difficult to achieve. The reason for this is not clear, but presumably because insoluble dietary fiber particles having large aspect ratios interfere with the formation of matrix structure such as starch, making it difficult to achieve the effect of the invention. On the other hand, the lower limit of the arithmetic average of the aspect ratios of the CFW-stained sites is not particularly limited, but it may preferably be typically 1.1 or more, more preferably 1.3 or more.

The specific conditions and procedures for measuring various parameters related to insoluble dietary fiber in an edible plant (e.g., pulse) to be used a raw material for the paste dough compositions, i.e., amylase and protease treatment, ultrasonic treatment, particle size distribution (particle size $d_{90}$ and $d_{50}$) measurement, CFW staining, fluorescence microscope observation, etc., may be determined in accordance with the aforementioned methods for measuring various parameters related to insoluble dietary fiber in a composition.

When an edible plant (e.g., pulse) is used as a raw material for the paste dough composition, the edible plant (e.g., pulse) may preferably be miniaturized and powdered before use. The means and conditions for the miniaturization and powdering process are not particularly limited. Specifically, the temperature during the miniaturization and powdering process is not particularly limited, but it may preferably be dried at a temperature of 200° C. or lower, for example, since if the powder is exposed to too high temperatures, the elasticity of the composition of one or more embodiments of the present invention tends to decrease. However, when pulse is used as the edible plant and heated before subjected to miniaturization and powdering for use, the temperature is not particularly limited since the heat load is reduced. The pressure during the miniaturization and powdering process is not limited, and may be chosen from high pressures, normal pressures, and low pressures. Examples of devices for the miniaturization process include, but are not limited to, blenders, mixers, mills, kneaders, crushers, disintegrators, and grinders. Specific examples that can be used include, for example, media stirring mills such as dry bead mills ball mills (rolling, vibrating, etc.), jet mills, high-speed rotating impact mills (pin mills, etc.), roll mills, hammer mills, etc.

The starch and/or protein to be incorporated into the paste dough composition of one or more embodiments of the present invention may be pre-heated under conditions that include water. Specifically, it may be preferable to use starch and/or protein that has been heated at 100° C. to 200° C. in an environment with a dry mass basis moisture content of 25 mass % or more (more preferably 30 mass % or more, more preferably 40 mass % or more, more preferably 50 mass % or more, especially preferably 60 mass % or more, while the upper limit thereof is not particularly limited, but typically 200 mass % or less, or 175 mass % or less, or 150 mass % or less), as this may facilitate the formation of the characteristic structure in the final solid paste composition for heat cooking. More preferably, both starch and protein have been heated beforehand (heating can be made, e.g., via steam heating). In addition, when powdered (e.g., to have a $d_{90}$ of <1000 µm or less) starch-containing material is used, it may not be desirable to pre-heat the starch-containing raw powder (e.g., at 90° C. or more) in a dry environment with a dry mass basis moisture content of less than 25 mass %, since the local heating of starch promotes the solubilization of amylose in its structure, resulting in a sticky quality of the composition.

Therefore, when an edible plant (e.g., pulse) containing starch and/or protein is used as a raw material for the paste dough composition of one or more embodiments of the present invention, the edible plants may be preheated under water-containing conditions as a pretreatment. In particular, it is preferable to use a material that has been heated in an environment with a dry weight basis moisture content of a predetermined value or higher (wet heating), as this may facilitate the formation of the CBB-stained site structure in the final solid paste composition for heat cooking. Specifically, the dry mass basis moisture content of the edible plant during heating is not limited, but may preferably be typically 25 mass % or more, particularly 30 mass % or more, or 40 mass % or more, especially 50 mass % or more. The upper limit of the dry mass basis moisture content is not particularly limited, but it may be typically 200 mass % or less, particularly 175 mass % or less. The heating temperature for the edible plant is not limited, but may be typically 100° C. or more, and typically 200° C. or less.

In one or more embodiments of the present invention, it is more preferable to pre-hydrate and heat both starch-containing and protein-containing edible plants before using them, and it is even more preferable to pre-hydrate and heat both starch- and protein-containing edible plants before use. Such pre-heating of an edible plant with hydration can be carried out via, e.g., steam heating. On the other hand, when a starch-containing edible plant (e.g., pulse), especially powdered (e.g., to have a $d_{90}$ and/or $d_{50}$ value(s) of ≤1000 µm), is used, it may not be desirable to pre-heat it (e.g., at 90° C. or higher) in a dry environment with a dry mass basis moisture content of less than 25 mass %, since the starch may be locally heated, resulting in overheating and accelerated pyrolysis of amylopectin in its structure, resulting in a sticky quality of the composition. In particular, it may not be preferable to use a raw material that has been powdered and kneaded under a high temperature with a low moisture content in terms of dry mass basis, since pyrolysis of starch may significantly be accelerated in such a raw material compared to the starch in a raw material that has not been powdered and exposed to a high temperature.

Specifically, Referential Examples 3 and 4 indicate that dough compositions were heated to a high temperature (90° C. or 100° C.) to be in an overheated state and stirred while in a powdered state with a dry weight basis moisture content of 25% or less, and then subjected to the kneading in the extruder, and at stage (2) "Temperature Condition at Each Barrel Part" in the tables below, i.e., immediately after the kneading at a high temperature (90° C. or 100° C.) was completed, the compositions were subjected to the measurement of the absorbance difference in accordance with the same method as described in the section [Difference in Absorbance (500 nm) of 10-Time Volume Iodine Solution]. The resulting values were all above 0.70. Therefore, from the viewpoint of controlling overheating of starch in the raw material, the dry mass basis moisture content in the dough composition (i) may preferably be equal to or higher than a predetermined value. Specifically, the dry mass basis moisture content of the dough composition in step (i) may preferably be typically 25 mass % or more, or 30 mass % or more, particularly 35 mass % or more, more particularly 40 mass % or more, or 45 mass % or more, or 50 mass % or more, or 55 mass % or more, or 60 mass % or more, or 65 mass % or more, or 70 mass % or more, or 75 mass % or more, especially 80 mass % or more. The upper limit of the dry mass basis moisture content is not particularly limited, but may preferably be typically 200 mass % or less, or 175 mass % or less, or 150 mass % or less. In this connection, one or more embodiments of the present invention include a method of producing a solid paste composition for heat cooking, with controlling the composition throughout the manufacturing process such that the difference in the absorbance (500 nm) of the 10-time volume iodine solution (0.25 mM) treated with the composition difference in the starch does not exceed 0.70.

In addition, when a composition is made from such an overheated starch-containing material powder, or from powder derived from a material overheated in its un-powdered state, the resulting composition may be characterized in that the absorbance difference in the iodine solution (0.25 mM) treated with the composition in the non-crushed state and the crushed state are higher than 0.70 and 1.20, respectively, and the composition exhibits a sticky quality. Therefore, the absorbance difference in the iodine solution (0.25 mM) treated with the composition in the non-crushed state and the crushed state may preferably be 0.70 or lower and 1.20 or lower, respectively. The absorbance difference for the non-crushed composition may more preferably be 0.65 or less, more preferably 0.60 or less, more preferably 0.55 or less, more preferably 0.50 or less, more preferably 0.45 or less, more preferably 0.40 or less, more preferably 0.35 or less, more preferably 0.30 or less, more preferably 0.25 or less, still more preferably 0.20 or less. The absorbance difference for the crushed composition may more preferably be 1.10 or less, more preferably 1.00 or less, more preferably 0.90 or less, more preferably 0.80 or less, more preferably 0.70 or less, more preferably 0.60 or less, more preferably 0.50 or less, more preferably 0.40 or less, more preferably 0.30 or less. The lower limit of the absorbance difference in the iodine solution treated with the composition either in the non-crushed state or in the crushed state is not particularly limited, but may be typically −0.20 or more for the composition in each state. The detailed measurement method of the absorbance difference should be in accordance with the method described above [Soluble Ingredients (Difference in Absorbance (500 nm) of 10 Volumes of Iodine Solution (0.25 mM))].

In this connection, one or more embodiments of the present invention include a method of producing a solid paste composition for heat cooking, with controlling the heat history of starch throughout the manufacturing process such that the difference in the absorbance (500 nm) of the 10-time volume iodine solution (0.25 mM) treated with the composition in the starch in the non-crushed state and the crushed state to 0.70 or lower and 1.20 or lower, respectively.

(3) Step (ii): Kneading Treatment Under High-Temperature Conditions

The paste dough composition obtained in step (i) above is kneaded at a certain strength under specific high-temperature conditions. This strong kneading under high temperature conditions allows the CBB-stained site structure in the composition to develop properly, whereby the effect of the invention is achieved. In particular, kneading under predetermined high-temperature and high-pressure conditions is more desirable since it enhances the effect of preventing insoluble ingredients from flowing out. The reason for this is not clear, but presumably because processing under specific high-temperature conditions, preferably under high-temperature and high-pressure conditions with a predetermined dry mass basis moisture content, may cause the proteins, starches, and insoluble dietary fibers in the paste dough composition to form a composite structure (more specifically, smooth tissue parts with CBB-stained sites inside) on the surface of the composition, which may particularly reduce the outflow of insoluble components. On the other hand, ordinary noodles made of refined starch as a raw material, such as cold noodles, contain only a very small amount of dietary fiber in particular, so the CBB-stained sites according to the invention do not develop properly, whereby the effect of the invention may not be achieved.

As for the specific conditions during kneading, the SME (specific mechanical energy) value calculated according to Equation I below may be equal to or higher than a predetermined value, since this may serve to break down the starch grains sufficiently to develop the properties of a matrix. Specifically, the SME value with which the kneading is carried out may preferably be typically 350 kJ/kg or more, more preferably 400 kJ/kg or more, more preferably 450 kJ/kg or more, more preferably 500 kJ/kg or more, more preferably 550 kJ/kg or more, more preferably 600 kJ/kg or more, more preferably 700 kJ/kg or more, still more preferably 800 kJ/kg or more. When an extruder is used for the kneading, screw rotation speed may preferably be set at higher than 150 rpm, more preferably higher than 200 rpm, still more preferably higher than 250 rpm. In addition, the aforementioned kneading may more preferably be carried out at such a high temperature as 100° C. or more (more preferably 110° C. or more, more preferably 120° C. or more), since the starch grain structure is more likely to be destroyed. When an extruder is used, the kneading at a high temperature with a high SME value as described above may preferably be carried out at 3% or more (more preferably 5% or more, still more preferably 8% or more, still more preferably 10% or more, still more preferably 15% or more, still more preferably 20% or more) of the total barrel length. Since the starch grain structures derived from pulse and seeds are more robust, the kneading at a high temperature with a high SME value as described above is more useful. The upper limit of the kneading temperature may preferably be 200° C. or less, more preferably 190° C. or less, more preferably 180° C. or less, more preferably 170° C. or less, more preferably 160° C. or less.

When the above kneading is carried out under pressurized conditions relative to atmospheric pressure, it is more desirable to carry out the kneading under conditions in which a higher pressure than usual is applied, as this will facilitate the development of the stained site structure according to one or more embodiments of the present invention. When an extruder is used, the pressure during the kneading can be measured by measuring the outlet pressure of the extruder. When kneading is carried out under pressurized conditions relative to atmospheric pressure, the lower limit of the pressure to be applied may preferably be typically 0.1 MPa or more, preferably 0.3 MPa or more, more preferably 0.5 MPa or more, more preferably 1 MPa or more, more preferably 2 MPa or more, more preferably 3 MPa or more. The upper limit of the pressure is not particularly limited, but it may be 50 MPa or less.

[Formula 2]

$$SME = \frac{\frac{N}{N_{max}} \times \frac{\tau - \tau_{empty}}{100}}{Q} \times P_{max} \times 3600 \quad \text{Equation I}$$

N: Screw rotation speed during kneading (rpm)
$N_{max}$: Maximum screw speed (rpm)
τ: Kneading torque/maximum torque (%)
$\tau_{empty}$: Idling torque/maximum torque (%)
Q: Total mass flow rate (kg/hr)
$P_{max}$: Maximum power of the agitator (e.g. extruder) (kW)

The kneading time can be determined appropriately based on various conditions such as the kneading temperature and pressure and the size of the kneading vessel. In particular, since the amount of heat applied to the composition varies greatly depending mainly on the characteristics of the apparatus used, it is preferable to determine the processing time such that the physical properties of the composition before and after the processing are adjusted to within their respective desired ranges mentioned above.

Specifically, since the soluble GABA and soluble leucine contents decrease as the CBB-stained sites in the composition develop due to high-temperature conditions and strong kneading, the kneading in step (ii) may preferably be carried out until each of the soluble GABA and/or soluble leucine content(s) in the composition decreases to less than 50% of the soluble GABA and/or soluble leucine content(s) in the composition before the previous step (ii).

Generally, the lower limit of the kneading time may be typically 0.1 minutes or more, preferably 0.2 minutes or more, more preferably 0.3 minutes or more, more preferably 0.4 minutes or more, more preferably 0.5 minutes or more, more preferably 0.8 minutes or more, more preferably 1 minutes or more, more preferably 2 minutes or more, while the upper limit of the kneading time may be typically 60 minutes or less, preferably 30 minutes or less, more preferably 15 minutes or less.

It is a surprising finding completely unknown in the past that kneading a paste dough compositions under such severe high-temperature and high-pressure conditions serves to form a complex structure of proteins, starches, insoluble dietary fibers, etc., and improve the texture of the compositions, whereby the outflow of insoluble and soluble ingredients of the composition may be suppressed.

(4) Step (iii): Cooling Treatment

If the composition after step (ii) above is depressurized without lowering the temperature, the water in the composition unfavorably evaporates rapidly, causing the composition to swell. Therefore, after the kneading under high temperature conditions, the composition temperature may be lowered to typically less than 110° C., preferably less than 105° C., more preferably less than 102° C., more preferably less than 100° C., to prevent the composition from swelling. In particular, this step of lowering the temperature may preferably be carried out under constant pressure conditions. In this case, the pressurization conditions during this temperature-lowering step are not particularly limited as long as swelling of the composition can be prevented, although they may preferably be the same as those during the kneading step. Specifically, the lower limit of the pressure to be applied during the temperature-lowering step (pressure to be further applied in addition to the atmospheric pressure) may preferably be typically 0.1 MPa or more, preferably 0.3 MPa or more, more preferably 0.5 MPa or more, more preferably 1 MPa or more, more preferably 2 MPa or more, more preferably 3 MPa or more. On the other hand, the upper limit of the pressure to be applied during the temperature-lowering step may be 50 MPa or less.

It may further be preferable to lowering the outlet temperature setting of the extruder further while keeping the total mass flow rate to a predetermined level or more, since it increases the pressure during the kneading in step (ii) and promotes structure formation in the composition. If an extruder is used, these conditions can be adjusted as necessary so that the outlet pressure is adjusted to such a predetermined level or more, but the outlet temperature of the extruder may preferably be set at less than 95° C., more preferably less than 90° C., more preferably less than 85° C., more preferably less than 80° C., more preferably less than 75° C., more preferably less than 70° C., more preferably less than 65° C., more preferably less than 60° C., more preferably less than 55° C., more preferably less than 50° C., more preferably less than 45° C., still more preferably less than 40° C. The total mass flow rate may preferably be 0.5 kg/hour or more, more preferably 0.7 kg/hour or more, still more preferably 1.0 kg/hour or more.

The temperature difference between the maximum heating temperature during the kneading in step (ii) and the lowering temperature in step (iii) may preferably be a predetermined value or more. Specifically, the temperature difference between the maximum heating temperature during the kneading in step (ii) (when an extruder is used, the temperature of the maximum heating area) and the lowering temperature in step (iii) (when an extruder is used, the outlet temperature) may preferably be 15° C. or more, particularly preferably 20° C. or more, more particularly preferably 25° C. or more, especially preferably 30° C. or more. The upper limit thereof is not particularly limited, but may typically be 150° C. or less, or 100° C. or less. The temperature difference set at or above the lower limit mentioned above is preferable because this will inhibit the outflow of insoluble and soluble ingredients from the resulting composition, which in turn will inhibit the binding of the composition, resulting in a composition with better properties that retains its elasticity.

Conventional extruders have been used to produce puffs and other swollen products, but their production conditions have been chosen such that the temperature during the temperature-lowering step (as in step (iii) of one or more embodiments of the present invention) is above the composition swelling temperature, and such conditions cannot be applied to the production method of paste-like compositions without swelling such as the composition of one or more embodiments of the present invention. This is because the internal temperature transition of the extruder occurs continuously, and if, for example, only the kneading temperature is set at a high value while the outlet temperature is set at a much lower value, the entire internal temperature of the extruder, including the kneading temperature, tends to drop due to the low temperature setting of the outlet, so that the temperature control of the extruder becomes very difficult even for a person skilled in the art. In addition, when manufacturing puffs and other swollen products, it was technical common knowledge among those skilled in the art that the percentage of water in the total mass flow rate should be kept low in order to allow rapid swelling upon decompression, so that there was no motivation to increase the water content in the total mass flow rate as in the paste-like composition without swelling as in one or more embodiments of the present invention.

(5) Step (iv): Water Retention Treatment

The composition obtained through steps (i) to (iii) mentioned above may be used as the composition of one or more embodiments of the present invention as it is, but may preferably be subjected to a predetermined water retention treatment as a post-treatment after the above step (iii).

Specifically, the composition may preferably be retained with a dry mass basis moisture content 25 mass % or more at a temperature where the composition does not swell, for 0.02 hours or more, more preferably 0.03 hours or more, or 0.05 hours or more, or 0.08 hours or more, or 0.1 hours or more, or 0.2 hours or more, 0.3 hours or more, or 0.4 hours or more, or 0.5 hours or more, or 0.6 hours or more, or 0.7 hours or more, or 0.8 hours or more, or 0.9 hours or more, or 1.0 hours or more, since this may provide the composition with preferred quality. The upper limit is not particularly limited, but may be typically 24 hours or less, or 16 hours or less. This treatment can be achieved by a method involving adding moisture to the composition at any of the steps (i) to (iii) above to adjust the dry mass basis moisture content of the dough composition to 50 mass % or more. More specifically, adding water to the composition at step (i) is preferable. Water can be added either in the form of liquid water or in the form of steam, although it is preferable to add it in the form of liquid water.

When an extruder is used, it may be preferable to mix a predetermined ratio or more of the total amount of water to be blended during its production with other raw material before the interior of the extruder is heated to 20° C. or more, as this may prevent the starch from changing its properties due to overheating. Specifically, of the total amount of water to be blended during production, typically 50 mass % or more, particularly 60 mass % or more, more particularly 70 mass % or more, or 80 mass % or more, or 90 mass % or more, especially 100 mass %, may preferably be mixed with other raw material before the interior of the extruder is heated to 20° C. or more. When moisture is mixed with other raw material, the aforementioned ratio of water may preferably be mixed with the raw material in advance before feeding the raw materials into the extruder.

Furthermore, the degree of gelatinization of the composition may preferably decrease during this step (iv) from the degree of gelatinization of the composition after the kneading in step (ii) by at least 6 mass % (i.e., this aging process may preferably be carried out until the degree of gelatinization decreases by at least 6 mass %). Specifically, the degree of gelatinization of the composition may more preferably decrease during step (iv) by particularly 7 mass % or more, or 8 mass % or more, or 9 mass % or more, particularly 10 mass % or more. On the other hand, the upper limit of the lowering difference of the degree of gelatinization during step (iv) is not particularly limited, but may be typically 50 mass % or less.

Water may also be added at step (iv). Although water may be added either in the form of liquid water or in the form of steam, spraying the composition in the form of liquid water (especially in the form of mist) may be preferable, because it is expected to increase the dry mass basis moisture content in the composition. Furthermore, even when the dry mass basis water content of the composition once decreases to 25 mass % or less, the water retention treatment may be continuously carried out by rehydrating to the composition to increase the dry mass basis water content. When the once-dried composition is rehydrated, the majority of the subsequent retention time may preferably be 60° C. or less, more preferably 50° C. or less, still more preferably 40° C. or less.

It is also possible to use a method of increasing the ambient humidity at step (iv) to thereby lengthen the time until the dry mass basis moisture content decreases to 25 mass %.

It is also possible to use a method of decreasing the composition temperature to a predetermined temperature or less at step (iv) to thereby lengthen the time until the dry mass basis moisture content decreases to 25 mass %. More specifically, during the majority of the time until the dry mass basis moisture content decreases to 25 mass %, the composition temperature may preferably be kept at 80° C. or less, particularly 70° C. or less, more preferably 60° C. or less, or 50° C. or less, or 40° C. or less. When the composition is produced using an extruder, the composition temperature may preferably have reached the temperature range mentioned above at least when the composition is extruded from the outlet of the extruder, and may more preferably be produced in the state where the outlet temperature is adjusted to the temperature range mentioned above.

It is also possible to use a method in which the duration period from the time when the interior temperature of the extruder is decreased to preferably less than 95° C. (more preferably less than 90° C., or less than 85° C., or less than 80° C., or less than 75° C., or less than 70° C., or less than 65° C., or less than 60° C., or less than 55° C., or less than 50° C., or less than 45° C., or less than 40° C.) at step (ii) to the time when the dry mass basis moisture content decreases to less than 25 mass % at step (iii) is adjusted to 0.02 hours or more (more preferably 0.03 hours or more, or 0.05 hours or more, or 0.08 hours or more, or 0.1 hours or more, or 0.2 hours or more, 0.3 hours or more, or 0.4 hours or more, or 0.5 hours or more, or 0.6 hours or more, or 0.7 hours or more, or 0.8 hours or more, or 0.9 hours or more, or 1.0 hours or more, while the upper limit is not particularly limited but may be typically 24 hours or less, or 16 hours or less).

The composition temperature at step (iv) may preferably be 90° C. or less, more preferably 80° C. or less, more preferably 70° C. or less, still more preferably 60° C. or less. The pressure at step (iv) may preferably be a normal pressure.

(6) Extruder

When an extruder is used, 50 mass % or more of the total amount of moisture to be added during the production process may preferably be mixed with other ingredients before the interior of the extruder is heated to at least 20° C. (more preferably, this fraction of moisture may preferably be mixed with other ingredients to form a dough composition before being fed into the extruder), since this may serve to prevent the starch from changing its properties due to overheating. This fraction of moisture to be mixed with other ingredients may more preferably be 60 mass % or more, more preferably 70 mass % or more, more preferably 80 mass % or more, more preferably 90 mass % or more, still more preferably 100 mass %. When the fraction of moisture is mixed with other raw materials in advance, this mixing may preferably be carried out to feed the mixture into the extruder. In addition, if water is fed into the extruder while the interior of the extruder is heated to 100° C. or higher, the water may boil off and damage the composition structure. Therefore, the aforementioned fraction of moisture may preferably be mixed with the raw material powder when the interior temperature of the extruder is less than 100° C. (more preferably less than 90° C., more preferably less than 80° C., more preferably less than 70° C., more preferably less than 60° C., more preferably less than 50° C., still more preferably less than 40° C.). In addition, the dough composition processed according to the above conditions (e.g., using an extruder) may be subjected to the step (i) mentioned above to produce the paste composition of one or more embodiments of the present invention. In this case, a part of the high-temperature severe kneading required for producing the paste composition of one or more embodiments of the present invention may be applied during the process of preparing the dough composition.

In addition, 50 mass % or more of the total amount of moisture to be added during the production process may preferably be mixed with other ingredients before the interior of the extruder is pressurized (more preferably, this fraction of moisture may preferably be mixed with other ingredients to form a dough composition before being fed into the extruder), since this may serve to prevent the starch from changing its properties due to overheating. This fraction of moisture to be mixed with other ingredients may more preferably be 60 mass % or more, more preferably 70 mass % or more, more preferably 80 mass % or more, more preferably 90 mass % or more, still more preferably 100 mass %. This fraction of moisture may more preferably be mixed with other ingredients before the interior of the extruder is heated to 100° C. or more or pressurized.

The type of the extruder to be use is not limited, but may preferably be one which allows for the steps of water addition, severe kneading (with an SME value of at least 350 kJ/kg or more), heating, cooling, and extrusion molding in a single unit. Particularly preferred is an extruder with a structure that can add water to the raw material before heating and pressurization. Specifically, either a uniaxial extruder or a biaxial extruder can be used, but instead of a common uniaxial extruder, it is preferable to use a uniaxial extruder or a biaxial extruder which employs a special barrel described below to increase the kneading strength. In particular, a uniaxial extruder is preferred from an economic viewpoint, while a biaxial extruder is preferred from the viewpoint of obtaining higher kneading strength. On the other hand, extruders using ordinary barrels, screw extruders using ordinary screws (driving screws), and ordinary spiral propulsion devices may not be suitable for the production method of one or more embodiments of the present invention, since their main purpose is to rapidly feed the contents, so that their kneading forces may not be sufficient. On the other hand, the devices commonly referred to as uniaxial screw extruders or biaxial screw extruders (especially the devices referred to as extruder or twin screw extruder overseas) include extruders that merely has mixer and kneader functions, but such devices are not desirable in one or more embodiments of the present invention, since they cannot achieve strong kneading to form the composition structure of one or more embodiments of the present invention.

In addition, when a raw material having a starch grain structure is used, the structure is so strong that a sufficient kneading force may not be achieved by using an ordinary extruder with a limited flight screw part in order for the starch grain structure to be completely destroyed. Therefore, it may be even more preferable to use an extruder that has a significantly higher number of barrel parts than usual that have a kneading effect. Specifically, the ratio of the length of the flight screw part to the total barrel length in the extruder may preferably be 95% or lower, since this serves to achieve the strong kneading of the composition and thereby accelerate the formation of the characteristic structure of the composition of one or more embodiments of the present invention. The flight screw part, also referred to as the transport element, means a part of the barrel having the most common shape. The higher its ratio to the total barrel length, the stronger the ability to push the dough composition toward the die, but the weaker the ability to knead the dough composition and promote its reaction. The ratio of the flight screw part to the total barrel length may more preferably be 90% or lower, even more preferably 85% or lower. Incidentally, when puffs and other swollen products are produced using an extruder, the composition must be extruded vigorously at high pressure (even when kneading is carried out at high SME values), which provides a motivation to increase the ratio of the flight screw part to the total barrel length, which is normally set at 95% to 100%. The part having the kneading effects may account for 5% or higher, more preferably 7% or higher, even more preferably 10% or higher, even more preferably 12% or higher of the total barrel length. On the other hand, extruders using an ordinary barrel, screw extruders using an ordinary screw (drive screw), and ordinary screw propelling type devices usually do not have a ratio of the flight screw part to the total barrel length meeting the range mentioned above, since these devices are intended mainly for the purpose of promptly feeding the contents and not designed to achieve strong kneading.

(7) Post-Treatment

The solid paste composition of one or more embodiments of the present invention can be obtained via steps (i) to (iii) above, and optionally through step (vi) above. However, the composition may be subjected to a further post treatment as necessary.

Examples of such post-treatments include molding treatment and drying treatment.

Examples of molding treatments include molding the solid paste composition into a desired form (e.g., pasta, Chinese noodles, udon, inaniwa udon, kishimen, houtou, suiton, hiyamugi, somen, soba, soba gaki, bee-hun, pho, reimen, vermicelli, oatmeal, couscous, kiritanpo, tteok, and gyoza skins, as mentioned above). Such a molding treatment can be carried out using methods normally known in the art. For example, in order to produce compositions in elongated shapes such as pasta, Chinese noodles, or other noodles, the composition can be extruded into elongated forms using an extruder or other devices described above. On the other hand, in order to produce compositions in flat plate shapes, the composition may be molded into flat plate shapes. Furthermore, the composition can be made into any shape such as elongated, granular, or flaky shapes, by, e.g., press-molding the composition or cutting or die-cutting the flat-plate shaped composition.

Drying treatment can be carried out by using any method generally used for drying foods. Examples include solar drying, drying in the shade, freeze drying, air drying (e.g., hot air drying, fluidized bed drying, spray drying, drum drying, low temperature drying, etc.), pressurized drying, decompressed drying, microwave drying, and oil heat drying. Preferable among these are air-drying (e.g., hot air drying, fluidized bed drying, spray drying, drum drying, low-temperature drying, etc.) and freeze-drying, since the degree of change in the color tone and flavor inherent in the food materials is small, and non-food aroma (e.g., burnt smell) can be controlled.

[III: Crushed Product of Solid Paste Composition for Heat Cooking and its Agglomerate]

The solid paste composition for heating and cooking of one or more embodiments of the present invention may be used after grinding the same. In other words, the production method of one or more embodiments of the present invention mentioned above may be modified by adding, after lowering the temperature in step (iii) above, the step of (v) crushing the composition to prepare a crushed composition. The thus-obtained crushed product of the composition of one or more embodiments of the present invention (hereinafter also referred to as "the crushed composition of one or more embodiments of the present invention") also belongs to the subject matter of one or more embodiments of the present invention. When the composition of one or more embodiments of the present invention is crushed to produce the crushed composition of one or more embodiments of the present invention, the conditions for crushing are not particularly limited, but may preferably be adjusted such that the $d_{90}$ and/or $d_{50}$ of the resulting crushed composition is within the range of from 50 μm to 1000 μm.

In addition, the crushed composition of one or more embodiments of the present invention may be used as a raw material and subjected to the high-temperature severe-kneading treatment according to the production method of one or more embodiments of the present invention to thereby prepare an agglomerate. In other words, the production method of one or more embodiments of the present invention mentioned above may be modified by adding, after the crushing in step (v), the step of (vi) agglomerating the crushed composition to prepare a crushed composition agglomerate. The thus-obtained agglomerate of the crushed composition of one or more embodiments of the present invention (hereinafter also referred to as "the crushed composition agglomerate of one or more embodiments of the present invention") tends to accelerate the formation of the CBB-stained site structure mentioned above, and is therefore suitable for use as a solid paste composition for heat cooking. The crushed composition agglomerate of one or more embodiments of the present invention also belongs to the subject matter of one or more embodiments of the present invention. When the composition of one or more embodiments of the present invention is crushed to prepare the crushed composition agglomerate of one or more embodiments of the present invention, the manufacture conditions therefor are the same as explained in Section [II] above.

EXAMPLES

One or more embodiments of the present invention will now be described in further detail by way of Examples. These examples are shown merely for convenience of the description, and should not be construed as limitations to one or more embodiments of the present invention in any sense.

[Method of Preparing Paste Dough Composition]

Dough compositions were prepared using raw materials which had been pre-processed under the conditions described in "Pre-Processing of Raw Materials" in the attached tables. The doughs were prepared by adding water as appropriate to achieve the "Measurements of Paste Dough Compositions" at the pre-processing step.

[Preparation of Solid Paste Compositions for Heat Cooking]

Samples of solid paste compositions for heat cooking of Test Examples, Comparative Examples, and Referential Examples were produced under the conditions described in the "Processing Conditions" column of the attached tables. Specifically, each sample was prepared using the equipment of the type indicated in the "Equipment Used" column and the barrel satisfying the parameter indicated in the "Flight Screw Part Ratio" section for kneading, with changing a part of the barrel sections ((1) to (9) in the attached tables) specified in the "Kneading Part" column to a part having a shape with a stronger kneading capacity, and setting the temperature of the part corresponding to "temperature conditions" to the values indicated in the attached tables (where (1) in the tables corresponds to the raw material inlet temperature and (9) in the tables corresponds to the outlet temperature). The biaxial extruder used was HAAKE Process11 from Thermo Fisher Scientific (screw diameter 11 mm×2, screw length 41 cm, segmented, co-directionally rotating screw), and the uniaxial extruder used as the one from NP Foods (screw diameter 70 mm×screw length 140 cm). The water was added by the method indicated in the "Water Injection Method" column, and the processing was carried out using the conditions indicated in the "Barrel Rotation Speed," "Mixing Strength (SME Value)," and "Internal Pressure (Pressure at the Outlet)" columns. No venting was performed during processing.

The processed compositions were subjected to post-processing under the conditions indicated in the "Post-processing" columns in the attached tables. Specifically, the drying process was carried out under the conditions indicated in the "Drying Conditions" column for the time period indicated in "Retention Time with Dry Mass Basis Moisture Content of 25 Mass % or more".

The samples of the solid paste compositions for heat cooking of Test Examples, Comparative Examples, and Referential Examples as well as their raw materials were also subjected to the analysis and the sensory evaluation shown below.

[Enzyme (Amylase/Protease) Treatment]

300 mg of each raw material sample or each composition sample was placed in a plastic tube with 5 mL of water, swollen at 20° C. for about one hour, and then processed using a small Hiscotron (Microtech Nichion homogenizer NS-310E3) until porridge-like properties were obtained (about 15 seconds at 1000 rpm). 2.5 mL of the treated sample was then collected and mixed with 10 μL of protease (proteinaseK from Takara Bio Inc.) and 0.5 mg of α-amylase (Sigma's α-Amylase from *Bacillus subtilis*), and incubate at 20° C. for 3 days to thereby carry out amylase/protease treatment.

[Particle Size $d_{50}$ Measurement after Enzyme Treatment and Ultrasonic Treatment]

Each raw material sample or each composition sample that had undergone amylase/protease treatment according to the above procedure was subjected to ultrasonic treatment, and then to the particle size distribution measurement using a laser diffraction particle size analyzer according to the following conditions. Ethanol was used as the solvent for the measurement. A Microtrac MT3300 EXII system from Microtrac Bell Inc. was used as the laser diffraction particle size analyzer. DMS2 (Data Management System version 2, Microtrac Bell Inc.) was used as the measurement application software. For the measurement, the sample was cleaned by pressing the Wash button of the software, followed by zero-calibration by pressing the Set zero button of the software, and the sample was directly loaded in the sample loading mode until the sample concentration reaches within the appropriate range. Subsequently, the sample was de-aerated three times and then subjected to the sample loading process again. After confirming that the concentration was still within the appropriate range, the result of laser diffraction was promptly measured at a flow rate of 60% with a measurement time of 10 seconds. The parameters for the measurement were, e.g., Distribution indication: Volume; Particle refractive index: 1.60; Solvent refractive index: 1.36; Upper limit of measurement: 2,000.00 μm; Lower limit of measurement: 0.021 μm. The thus-obtained particle size distribution was used for calculating the particle size d50.

[Observation with CFW-Staining after Enzyme Treatment]

A drop of 6 mass % aqueous suspension of each raw material sample which had undergone the amylase/protease treatment according to the above procedure was placed on a clean glass slide, to which 1 μL of CFW (Calcofluor White: 18909-100 ml-F, Sigma-Aldrich) was added and mixed. A cover glass was placed on the surface and observed with a fluorescence microscope (Keyence BIOREVO BZ-9000) at a magnification of 200×. Each CFW-stained site with a longest visible diameter of 1 μm or more was observed, and the maximum distance between two points on the contour line thereof was determined as its longest diameter. The arithmetic mean of the obtained longest diameters was calculated for all observed CFW-stained sites in the field of view.
[Starch, Protein, Insoluble Dietary Fiber, and Dry Mass Basis Moisture Contents]

The "Starch" content was determined in accordance with the Japanese Standard Tables of Food Composition 2015 (7th revision) using the AOAC 996.11 method, after 80% ethanol extraction process to remove soluble carbohydrates (glucose, maltose, maltodextrin, etc.) that might otherwise have affect the measurement value. The "Protein" content was determined in accordance with the Japanese Standard Tables of Food Composition 2015 (7th revision) by multiplying the amount of nitrogen determined by the modified Kjeldahl method by the "nitrogen-protein conversion factor." The "Insoluble Dietary Fiber" content was determined in accordance with the Japanese Standard Tables of Food Composition 2015 (7th revision) using the Prosky method. The "Dry Mass Basis Moisture" content was determined in accordance with the Japanese Standard Tables of Food Composition 2015 (7th revision) using the decompression heating and drying method with heating to 90° C.
[Treatment in Heated Water at 90° C. for 6 Minutes, Preparation of Frozen Section, and 200× Magnification Image Analysis]
(Method for Preparing Sample)

For the analytical sample, about 1 g of the composition was put into about 1.0 L of heated distilled water (90° C.) and boiled for 6 minutes, after which the sample was cut into about 2 mm by about 5 mm in lengths using dissecting scissors, and used for preparing a frozen block.
(Method for Producing Frozen Block)

Frozen blocks were prepared using a freeze embedding agent (SCEM from SECTION-LAB) for the Kawamoto method (described above) as the embedding agent, and Tissue-Tek<Cryomold 2>(from Sakura Finetech Japan Inc.) as the embedding dish.

The freeze-embedding agent was put into the embedding dish for frozen-section preparation, in which each sample was placed so that when the frozen section was prepared, the cut surface coincided with either the longitudinal axis of the composition (which corresponded to the direction of extrusion of the composition in the production process via extruder extrusion) or the transverse axis of the composition (which was perpendicular to the longitudinal axis).

Immediately after the sample was placed in the embedding medium, it was quickly frozen using a spray for rapid freezing of pathological tissues (White Freezer S for cryostat: UI Chemical Co., Ltd.) to maintain the installation state, and the frozen block was left in the freezing microtome (−25° C.) environment until section preparation.
(Method for Producing Section)

The resulting frozen block of each composition sample was fixed to a sample holder using Tissue-Tek OCT compound (from Sakura Finetech Japan Inc.) as the embedding agent for frozen section preparation. Then 30 μm-thick sections were prepared using a freezing microtome (Cryostar N X20, Thermo Fisher Scientific, Inc.) at −25° C.

The obtained post-heated-water-treatment frozen sections of each composition sample were adsorbed onto glass slides and stored in a glass slide holder at room temperature until they were ready for microscopic observation.
[Observation of Post-Heated-Water-Treatment Frozen Section with CBB-Staining]

Each post-heated-water-treatment frozen section adsorbed on a glass slide was stained by dropping 15 μL of CBB solution (Coomassie Brilliant Blue R-250: 0.1%, methanol: 40%, acetic acid: 10%, from Bio-Rad Laboratories) thereon, quickly covering it with a cover glass, and leaving it stained for 3 minutes.

The obtained CBB-stained samples were observed with a fluorescence microscope (Keyence BIOREVO BZ-9000) in bright field at room temperature under the specified magnification. For observation, each of the longitudinal and transverse sections of the composition sample was observed for the outer and inner parts of the composition, and the average of the results for each longitudinal or transverse section was calculated.

The shapes of the CBB-stained sites in the 200× field of view of each frozen composition section were determined by the following method. The CBB-stained frozen composition section was observed and photographed under a microscope field of view of 200×. Of the blue-dark stained sites in the 1360×1024 pixel planar image, the sites which did not partially or completely overlap with the outer edges of the field of view and whose entire shapes could be recognized were selected. Of the selected sites, those which had certain areas and whose shapes could be analyzed (specifically, the stained sites having areas of 30 μm2 or more: 100 dots or more in 1360 pixels×1024 pixels) were subjected to analysis, and their perimeters, areas, and degrees of roundness were measured.

More specifically, the area, area ratio, perimeter, and degree of roundness of each stained site were determined using image analysis software (Particle Analysis ver. 3.5, Nittetsu Technology Co., Ltd.) to analyze the specific shape of such site. More specifically, a 1360 pixel×1024 pixel image of a CBB-stained composition frozen section observed and photographed under a microscope field of view of 200× was grayscaled, binarized by the discriminant analysis method, and black-white inverted. From the white-out pixels (i.e., pixels that correspond to stained sites in the original photograph with CBB staining), each and every assembly of pixels connected to each other on any of their four sides that was independent of other pixel assemblies was extracted. From the extracted pixel assemblies, those that partially or fully overlap with any of the outer edges of the field of view and those that have an area of less than 30 μm2 (e.g., in the case of a photograph with 200× magnification and 1360×1024 pixels, those having a particle area of less than 100 dots) were excluded, and the remaining pixel assemblies were chosen as the stained sites for analysis. When there was an independent black pixel inside a white-out pixel assembly (i.e., if there is a spot-like non-stained dot inside a stained site during imaging), the area was calculated by ignoring the pixel corresponding to the non-stained dot. The thus-obtained CBB-stained sites (pixel sets) extracted by the above analysis were screened for various conditions such as "CBB-stained sites with degrees of roundness of 0.3 or more and areas of 2,000 μm2 or more," "90th percentile score of the stained sites," and "the number of stained sites with longest diameters of 200 μm or greater, and the screened data were used for calculating various ratios such as "the ratio of the number of specific stained sites to the total number of stained sites" and "the total area of stained sites to the total area of the field of view."
[Observation of Post-Heated-Water-Treatment Frozen Section with CFW-Staining]

The post-heated-water-treatment frozen section of each composition sample was placed on a clean glass slide, mixed with 1 μL of CFW (Calcofluor White: 18909-100 ml-F, Sigma-Aldrich), covered with a cover glass, and observed with a fluorescence microscope (Keyence BIOREVO BZ-9000) at 200× magnification. Each CFW stained site whose longest visible diameter is 1 μm or more was observed, and the maximum distance between two points on the contour line thereof was defined as the "longest diameter" thereof, and "{the longest diameter of each CFW-stained site image} divided by {the distance between two straight lines parallel to the longest diameter of each CFW-stained site and tangent to the contour of the CFW-stained site}" was determined as the "aspect ratio" thereof. The arithmetic mean values of the obtained longest diameters and aspect ratios were calculated for all the observed CFW-stained sites in the field of view.

[Number of Starch Grain Structures]

The composition sample was crushed with a mill and filtered through a 150-μm pass opening. 3 mg of the resulting composition powder was suspended in 5 μL of water to prepare 6% aqueous suspension, which was dropped onto a glass slide, on which a cover glass was placed and lightly pressurized over to produce a preparative plate.

The number of starch grain structures in the field of view was determined by polarized light observation of representative sites in the preparative plate using a phase contrast microscope (ECLIPSE80i, Nikon) at 200× magnification.

[Difference in Absorbance (500 nm) of 10-Volumes of Iodine Solution (0.25 mM)]

Upon measurement of the composition in the non-crushed state, one mass of each composition (if there was any powder or other material adhering to the surface prior to the measurement, it was removed so as not to scratch the surface of the composition) was put into 9 masses of iodine solution (25 mM) and, after left stand at room temperature (20° C.) for 3 minutes, the mixture was filtered through a 0.20 μm filter (Millex-LG, 0.20 μm hydrophilic polytetrafluoroethylene (PTFE), 13 mm), and the resulting filtrate was used for absorbance measurement. On the other hand, when measuring a crushed product of the composition, one mass of the crushed product of each composition was soaked in 9 masses of iodine solution (25 mM) at 20° C. for 3 minutes, and then filtered through a 0.20 μm filter (Millex-LG, 0.20 μm hydrophilic polytetrafluoroethylene (PTFE), 13 mm), and the resulting filtrate was stained with iodine solution (final concentration: 0.25 mM) and subjected to absorbance measurement. The absorbance measurement was carried out using both the iodine solution before the addition of the non-crushed composition or the crushed composition (as the blank for calibration) and the filtrate of the iodine solution after the addition of the non-crushed composition or the crushed composition, and the absorbance (500 nm) of each solution was measured with a spectrophotometer (Shimadzu UV-1800) using a square cell with an optical path length of 10 mm. The difference in absorbance between the two solutions {(absorbance of the filtrate)−(absorbance of the iodine solution (calibration blank))} was determined as the content of soluble ingredients in the composition.

[Analysis of 1% Glucoamylase Reaction Solution]

One mass of each composition in the non-crushed state was mixed with 9 masses of 1% glucoamylase (Sigma Amyloglucosidase solution from *Aspergillus niger*: Product Number A9913) aqueous solution for 2 hours at 20° C., and the glucose content in the resulting reaction solution was determined by HPLC. On the other hand, one mass of a crushed product (d90=100 μm) of the composition was treated in 9 parts by mass of 1% glucoamylase solution for 2 hours at 20° C., and the glucose content in the resulting reaction solution was determined by HPLC. Thus, the glucose content (mass %) in the reaction solution with which one mass of the non-crushed composition was treated, and the glucose content (mass %) in the reaction solution with which one mass of the crushed composition was treated, and the ratio of glucose contents {(the reaction solution treated with the non-crushed composition)/(the reaction solution treated with the crushed composition)} was calculated.

[Soluble γ-Amino Butyric Acid (GABA) and Soluble Leucine (LEU) Contents in the Composition]

One mass of the composition was immersed in 19 masses of water and treated at 20° C. for 2 hours, and the total contents of soluble amino acids in the resulting solution were measured by the HPLC method, whereby the contents of soluble GABA in the composition ("Soluble GABA (Composition)") and soluble LEU ("Soluble LEU (composition)"), as well as their ratios to the total content of soluble proteinogenic amino acids ("(Soluble GABA (Composition))/(Total Content of Soluble Amino Acids (Composition))" and "(Soluble LEU (Composition))/(Total Content of Soluble Amino Acids (Composition))") were measured. Likewise, the soluble GABA and soluble LEU contents were also measured for the raw materials before processing, and the ratios of the soluble GABA and soluble LEU contents before and after the processing were calculated ("(Soluble GABA (Composition))/(Soluble GABA (Raw Material before Processing)" and "(Soluble LEU (Composition))/(Soluble LEU (Raw Material before Processing))"). The "raw material before processing" herein refers to a composition before the kneading in step (ii) of the production method of one or more embodiments of the present invention described above.

[Confirmation of Smooth Tissue Part by 200× Magnified Image Analysis of Frozen Section (without Treatment in Heated Water)]

A frozen section of each composition sample for observing its smooth tissue part was prepared in the same manner as for the composition sample treated in heated water, except that in order to prevent the sample from disintegrating during cutting, an adhesive film was attached to the surface of the frozen block for supporting the section before sections were prepared according to the Kawamoto method. After the frozen sections were prepared, those cut along the transverse axis and those cut along the longitudinal axis were observed under a phase contrast microscope (ECLIPSE80i, Nikon) at a magnification of 200× to measure the "Average Thickness of Smooth Tissue Part" and the "Smooth Tissue Part/Composition Contour (Ratio of the Contour Length with Smooth Tissue Part to the Total Contour Length of the Composition)."

[Measurement of Crystallinity in Frozen Section by X-Ray Diffraction Method]

Diffracted X-ray graphs were measured on the frozen section of each composition sample for the confirmation of smooth tissue part prepared by the procedure described above, using a Bruker AXS D8 DISCOVER with VANTEC2000 as a microparticle X-ray diffractometer. For each frozen section, 10 points in the smooth tissue part along the composition contour and 10 points in the area surrounded by the smooth tissue part (non-smooth tissue part) were selected for measurement. The conditions for the microparticle X-ray diffraction measurement were as follows.

(Optical System Conditions on the Incident Side)
    Source: Cu Kα ($\lambda$=1.54056 Å), Output: 50 kV, 100 mA
    Divergence angle: 0.1 deg, Irradiation system: 50 μmφ, Incident angle (w): 3 deg, Step width: 0.0200 deg, Measurement range: 4 deg to 34 deg (Optical System Conditions on the Receiving Side)
    Acquisition angle: Header direction ($\chi$)±15 deg
    Counter: VANTEC2000 (2048 pixel mode)
    Distance between sample and counter: 20 cm Measurement time: 600 sec/frame The obtained diffracted X-ray graphs of each measurement points were analyzed, and peaks with peak tops detected within the range of diffraction angle (2θ) of from 17 degrees to 17.5 degrees were selected. The area of the selected peak was integrated to obtain the crystallinity value for each measurement point. The arithmetic mean of the crystallinity obtained for 10 measurement points in each of the smooth and non-smooth tissue parts was calculated and used as the average crystallinity of the smooth tissue part and that of the non-smooth tissue part, respectively.

[Sensory Evaluation]

One mass of each composition sample prepared as described above and one mass of commercially available mung bean harusame (Japanese vermicelli) as a comparative sample were cooked in 9 masses of water at 90° C. for 5 minutes. Sensory evaluation was conducted on each of the cooked products. Specifically, the cooked compositions were placed on paper plates, and 10 trained sensory inspectors observed and tasted the dishes to evaluate the physical properties and eating quality of the compositions, from the viewpoints of "elasticity," "a texture that passes smoothly through the teeth when chewed," "ease of biting through," "overall evaluation," "rough texture," and "surface stickiness of the composition," based on the following criteria. In addition, after the compositions were stored at room temperature for 15 minutes, the "smoothness after storage (after 15 minutes)" and "fragrance after storage (after 15 minutes)" were evaluated based on the following criteria. The following criteria were used for evaluation. The average of the scores of 10 sensory inspectors was calculated for each evaluation item, and rounded off to the first decimal place to obtain the final score. For some Test Examples and Comparative Examples, the taste of the broth was also evaluated, and comments thereon were noted. Sensory inspectors who conducted each sensory test were selected from inspectors who had been trained in advance to distinguish taste, texture, and appearance of food products, had particularly excellent performance, had experience in product development, were knowledgeable about the quality of the taste, texture, and appearance of food products, and were capable of performing absolute evaluation for each sensory test item. For any of the aforementioned evaluation items, all the inspectors evaluated the standard samples in advance and standardized the scores for each of the evaluation criteria before conducting an objective sensory inspection.

*Evaluation Criteria for "Elasticity":

The property of each composition sample was evaluated in comparison to the texture of commercial mung bean harusame on the following one-to-five scale.
  5: Elasticity is sufficiently felt, equal to the commercially available product.
  4: Elasticity is slightly impaired, slightly inferior to commercially available product.
  3: Elasticity is inferior to that of the commercially available product.
  2: Elasticity is hard to feel, considerably inferior to the commercially available product.
  1: Elasticity is not felt at all, clearly inferior to the commercially available product.

*Evaluation Criteria for "Texture that Passes Smoothly Through the Teeth when Chewed":

The property of each composition sample was evaluated in comparison to the texture of commercial mung bean harusame on the following one-to-five scale.
  5: The texture that passes smoothly through the teeth is sufficiently felt when chewed, clearly superior to the commercial product.
  4: The texture that passes smoothly through the teeth is felt when chewed, considerably superior to the commercially available product.
  3: The texture that passes smoothly through the teeth is slightly when chewed, superior to the commercially available product.
  2: The texture that passes smoothly through the teeth is slightly difficult to feel when chewed, slightly superior to the commercially available product.
  1: The texture that passes smoothly through the teeth is not felt at all when chewed, equal to the commercially available product.

*Evaluation Criteria for "Ease of Biting Through":

The property of each composition sample was evaluated in comparison to the texture of commercial mung bean harusame on the following one-to-five scale.
  5: Rubbery texture is suppressed and easy to bite through, clearly superior to the commercially available product.
  4: Slightly less rubbery texture and generally easy to bite through, considerably superior to the commercially available product.
  3: Rubbery texture is moderate and superior to the commercially available product.
  2: Rubbery texture and slightly difficult to bite through, but slightly better than the commercially available product.
  1: Rubbery texture remains and difficult to bite through, equal to the commercially available product.

*Evaluation Criteria for "Overall Evaluation":

The property of each composition sample was evaluated in comparison to the texture of commercial mung bean harusame on the following one-to-five scale.
  5: Very good balance between elasticity and good tooth texture, clearly superior to the commercially available product.
  4: Good balance between elasticity and good texture, considerably superior to the commercially available product.
  3: Moderate balance between elasticity and good tooth feel, superior to the commercially available product.
  2: Slightly poor balance between elasticity and good tooth-floss texture, slightly superior to the commercially available product.
  1: Poor balance between elasticity and good tooth-grip texture, equal to the commercially available product.

*Evaluation Criteria for "Rough Texture":

The property of each composition sample was evaluated in comparison to the texture of commercial mung bean harusame on the following one-to-five scale.
  5: Rough texture sufficiently suppressed, clearly superior to the commercial product.
  4: Rough texture generally suppressed, considerably superior to the commercially available product.
  3: Rough texture moderately suppressed, superior to the commercially available product.
  2: Rough texture slightly felt, slightly superior to the commercially available product.
  1: Rough texture felt, equal to the commercially available product.

*Evaluation Criteria for "Stickiness of Composition Surface":

About 10 noodles of the composition sample were eaten, and the ratio of the noodles got stuck together was evaluated.

5: No noodles got stuck together.
4: Some noodles got stuck together.
3: About half noodles got stuck together.
2: Most noodles got stuck together.
1: Almost all noodles got stuck together.

*Evaluation Criteria for "Surface Smoothness after Storage (after 15 Minutes)":

The property of each composition sample stored for 15 minutes at ordinary temperatures was evaluated in comparison to the texture of commercial mung bean harusame on the following one-to-five scale.
  5: Surface smoothness sufficiently felt, clearly superior to the commercial product.
  4: Surface smoothness considerably felt, considerably superior to the commercially available product.
  3: Surface smoothness moderately felt, superior to the commercially available product.
  2: Surface smoothness little felt, slightly superior to the commercially available product.
  1: Surface smoothness not felt at all, equal to the commercially available product.

*Evaluation Criteria for "Fragrance after Storage (after 15 Minutes)":

The property of each composition sample stored for 15 minutes at ordinary temperatures was evaluated in comparison to the texture of commercial mung bean harusame on the following one-to-five scale.
  5: No decrease in fragrance during storage.
  4: Little decrease in fragrance during storage.
  3: Slight decrease in fragrance during storage, but acceptable in quality.
  2: Moderate decrease in fragrance during storage.
  1: Large decrease in fragrance during storage.

[Constituents, Manufacture Conditions, and Evaluation Results]

The manufacture conditions, constituents, properties, and evaluation results for the composition samples of Test Examples, Comparative Examples, and Referential Examples are shown in Table 1 (FIGS. 1A to 1F), Table 2 (FIGS. 2A to 2D), Table 3 (FIGS. 3A to 3F), Table 4 (FIGS. 4A to 4D), Table 5 (FIG. 5), and Table 6 (FIG. 6).

Figure 8:
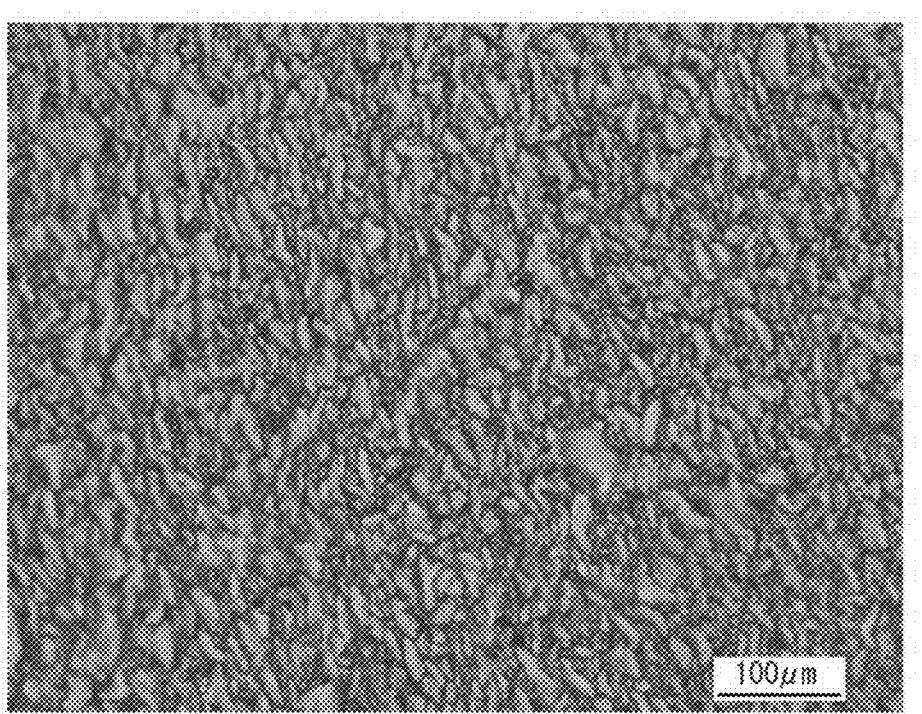
FIG. 8 is a CBB-stained photograph of a frozen section of the composition sample prepared in Comparative Example 8, which section was prepared by heating the composition at 90° C. for 6 minutes, freezing it at −25° C., and cutting it into 30-μm thick sections along a cut plane perpendicular to the longitudinal axis.

In order to observe the CBB stained area, some composition samples were heated in water at 90° C. for 6 minutes, and then frozen at −25° C., and the frozen sections were cut into 30 μm thick sections perpendicular to the longitudinal axis (i.e., along the transverse axis). As examples of photographs of CBB-stained samples, the photographs of the composition samples of Test Example 42 and Comparative Example 8 are shown as FIG. 7 and FIG. 8, respectively. It can be seen from FIG. 7 and FIG. 8 that unlike the composition sample of Comparative Example 8, a significantly larger number of CBB-stained sites were formed in the composition sample of Test Example 42 . . . .

Figure 9A:
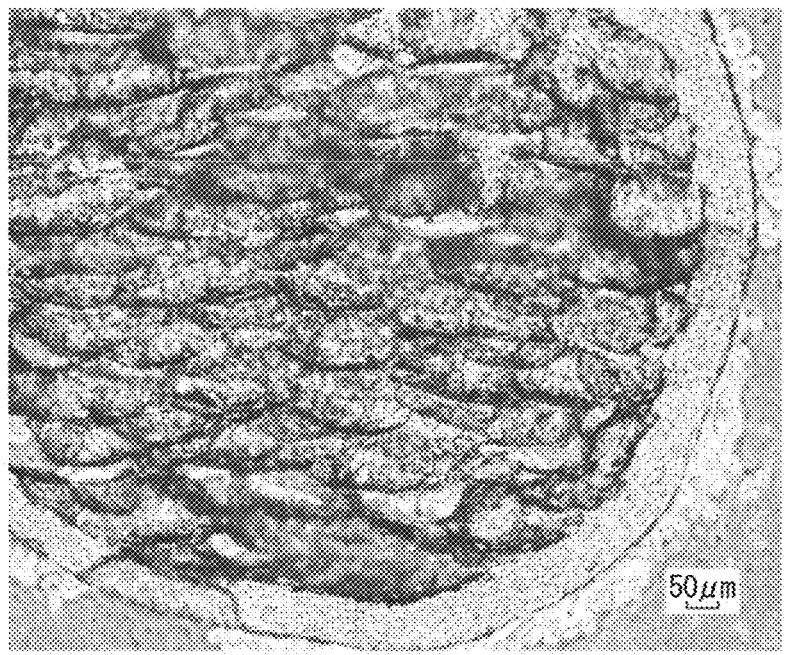
FIGS. 9A and 9B are photographs of frozen sections of the composition sample prepared in Test Example 47, which sections were prepared by heating the composition at 90° C. for 6 minutes, freezing it at −25° C., and cutting it into 30-μm thick sections along a cut plane perpendicular to the longitudinal axis.
Figure 9B:
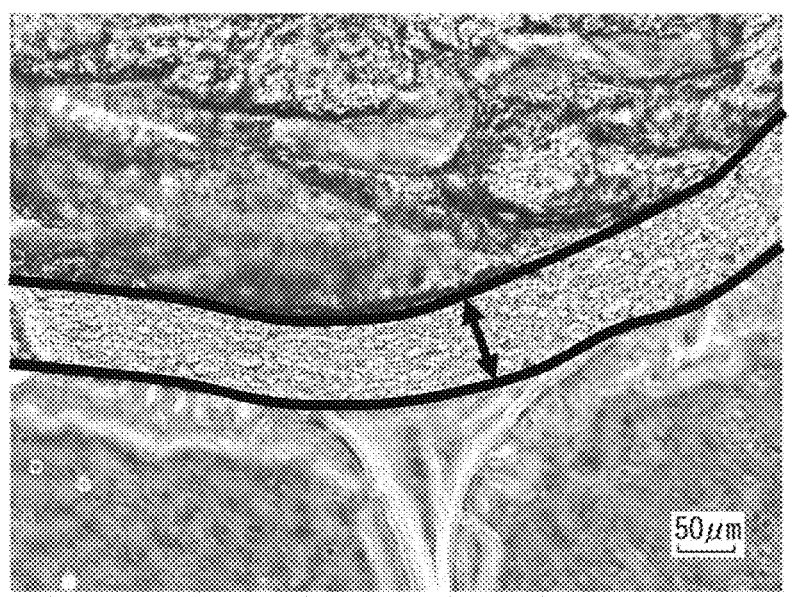

In order to observe the smooth tissue part, some composition samples were frozen at −25° C., and the frozen samples were cut into 30 μm thick sections in the cut plane along the transverse axis. As an example of photographs of such frozen sections, photographs of the composition sample of Test Example 47 are shown in FIGS. 9A and 9B. FIG. 9B is a magnified version of a portion of the photograph in FIG. 9A. It can be seen that a smooth tissue part of a certain thickness was formed along the contour of the cross section of the composition.

Figure 10:
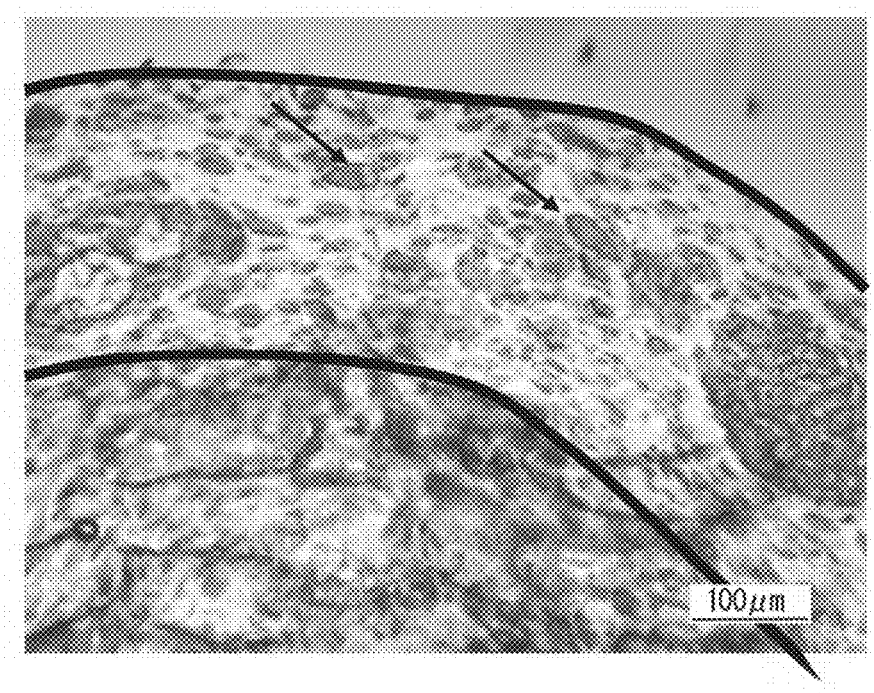
FIG. 10 is a CBB-stained photograph of a frozen section of the composition sample prepared in Test Example 47, which section was prepared by heating the composition at 90° C. for 6 minutes, freezing it at −25° C., and cutting it into 30-μm thick sections along a cut plane perpendicular to the longitudinal axis.

In order to observe the CBB-stained sites in the smooth tissue part, some composition samples were frozen at −25° C., and the frozen samples were cut into 30 μm thick sections in the cut plane along the transverse axis. As an example of photographs of CBB-stained 30 μm thick frozen sections, a photograph of the composition sample of Test Example 47 is shown in FIG. 10. It can be seen that the CBB-stained sites were formed in the smooth tissue part.

The solid paste composition of one or more embodiments of the present invention for heat cooking has elasticity with less rubbery texture, and exhibits a texture that passes smoothly through the teeth when chewed, and is therefore expected to be widely applied in food industries.

Although the disclosure has been described with respect to only a limited number of embodiments, those skilled in the art, having benefit of this disclosure, will appreciate that various other embodiments may be devised without departing from the scope of the present disclosure. Accordingly, the scope of the invention should be limited only by the attached claims.

What is claimed is:

1. A process of producing a solid paste composition for heat cooking, the process comprising the steps of:
  (i) preparing a paste dough composition having an insoluble dietary fiber content of 1.5 mass % or more in terms of wet basis, a starch content of 5.0 mass % or more in terms of wet basis, a protein content of 3.0 mass % or more in terms of wet basis, and a dry mass basis moisture content of 25 mass % or more;
  (ii) kneading the paste dough composition prepared in step (i) at a temperature of from 100° C. to 200° C. with a specific mechanical energy (SME) of 350 KJ/kg or more to form a kneaded paste dough composition; and
  (iii) cooling the kneaded paste dough composition to a temperature of less than 90° C.,
  thereby forming the solid paste composition, wherein
  the kneading in step (ii) and the cooling in step (iii) are both carried out with an extruder, and
  a temperature difference between a maximum heating temperature during the kneading in step (ii) and a lowering temperature in step (iii) is 30° C. or more.

2. The process according to claim 1, wherein
  the paste dough composition comprises a pulse flour, and
  the pulse flour satisfies at least either (11a) or (11b) after subjecting the pulse flour to treatment D:
    (11a) the pulse flour after treatment D that is further subjected to an ultrasonic treatment has a particle size distribution $d_{50}$ of 450 μm or less, and
    (11b) the pulse flour after treatment D that is further subjected to a CFW (Calcofluor-white) staining and observed under fluorescence microscope has an average of a longest diameters of CFW-stained sites is 450 μm or less, and
    in treatment D, 6 mass % water suspension of the pulse flour is treated with 0.4 volume % of protease and 0.02 mass % of α-amylase at 20° C. for 3 days.

3. The process according to claim 1, wherein a length of a flight screw part to a total length of a barrel of the extruder is 95% or less.

4. The process according to claim 1, further comprising, after step (iii):
  (iv) maintaining the composition with a dry mass basis moisture content of 25 mass % or more after the cooling in step (iii) at a temperature of less than 90° C. for 0.02 hours or more.

5. The process according to claim 4, wherein step (iv) includes adding water to the composition.

6. The process according to claim 1, wherein in step (i), the dry mass basis moisture content of the paste dough composition is more than 45 mass %.

7. The process according to claim 1, wherein 50 mass % or more of water to is mixed with other ingredients to form the paste dough composition before feeding the paste dough composition to the extruder.

8. The process according to claim 1, wherein in step (i), the paste dough composition is prepared by mixing water with other ingredients before feeding the paste dough composition to the extruder.

9. The process according to claim 1, wherein 50 mass % or more of water to be added during the process is mixed with other ingredients before an interior of the extruder is heated by 20° C. or more.

10. The process according to claim 1, further comprising, after step (iii), drying a cooled kneaded paste dough composition obtained in step (iii), thereby obtaining a solid paste composition.

11. The process according to claim 1, wherein in step (ii), kneading the paste dough composition prepared in step (i) with the specific mechanical energy (SME) of 550 KJ/kg or more.

12. The process according to claim 1, wherein the solid paste composition has a density specific gravity of 1.0 or more.

13. The process according to claim 1, wherein the paste dough composition comprises a raw material consisting of a pulse.

14. The process according to claim 1, wherein the paste dough composition consists of a pulse.

15. The process according to claim 1, wherein the solid paste composition is noodles.

16. A process of producing a solid paste composition for heat cooking, the process comprising the steps of:
(i) preparing a paste dough composition having an insoluble dietary fiber content of 1.5 mass % or more in terms of wet basis, a starch content of 5.0 mass % or more in terms of wet basis, a protein content of 3.0 mass % or more in terms of wet basis, and a dry mass basis moisture content of more than 25 mass %;
(ii) kneading the paste dough composition prepared in step (i) at a temperature of from 100° C. to 200° C. with a specific mechanical energy (SME) of 350 KJ/kg or more to form a kneaded paste dough composition;
(iii) cooling the kneaded paste dough composition to a temperature of less than 90° C. to form a cooled kneaded paste dough composition; and
(iv) after the cooling in step (iii), maintaining the cooled kneaded paste dough composition at a temperature of less than 90° C. in an atmosphere with a dry mass basis moisture content of 25 mass % or more for 0.02 hours or more, wherein step (iv) includes adding water to the paste dough composition,
thereby forming the solid paste composition, wherein
the kneading in step (ii) and the cooling in step (iii) are both carried out with an extruder,
in step (i), the paste dough composition is prepared by mixing 50 mass % or more of water with other ingredients before feeding the paste dough composition to the extruder,
an interior of the extruder is heated by 20° C. or more,
a temperature difference between a maximum heating temperature during the kneading in step (ii) and a lowering temperature in step (iii) is 30° C. or more, and
the solid paste composition comprises at least a pulse as a raw material and satisfying the requirements (1) to (4), (7), and (12):

(1) the solid paste composition has an insoluble dietary fiber content of 2.0 mass % or more in terms of dry mass basis;
(2) the solid paste composition has a starch content of 15 mass % or more in terms of dry mass basis;
(3) the solid paste composition has a protein content of 5.5 mass % or more in terms of dry mass basis; and
(4) when at least one frozen composition section A of the solid paste composition prepared under condition A is subjected to CBB (Coomassie Brilliant Blue) staining and observed, at least either (4a) or (4b) is satisfied:
  (4a) a ratio of a number of CBB-stained sites having areas of 200 $\mu m^2$ or more and degree of roundness of 0.3 or more to a number of CBB-stained sites having areas of 30 $\mu m^2$ or more is 3% or more,
  (4b) a ratio of a total area of CBB-stained sites having areas of 200 $\mu m^2$ or more and degrees of roundness of 0.3 or more to a total section area of the solid paste composition is 0.3% or more, and
the condition A is when the solid paste composition is heated in water at 90° C. for 6 minutes and then frozen at −25° C., and a frozen composition is cut along a certain cut plane A into a section having a thickness of 30 $\mu m$, which the section is used as the frozen composition section A,
(7) the solid paste composition satisfies at least either (7a) or (7b):
  (7a) when one mass part of the solid paste composition is immersed in 9 mass parts of iodine solution (0.25 mM) at 20° C. for 3 minutes and filtered through a 0.20 $\mu m$ filter, a difference in absorbance (500 nm) of the iodine solution is 0.65 or less, and
  (7b) when the one mass part of the composition is immersed in 9 mass parts of the iodine solution (0.25 mM) at 20° C. for 3 minutes and filtered through a 0.20 $\mu m$ filter and a filtrate stained with iodine (final concentration 0.25 mM), the difference in absorbance (500 nm) of the iodine solution is 1.2 or less, and
(12) when a 6% suspension of a crushed product of the solid paste composition is observed, a number of starch grain structures observed is 300/$mm^2$ or less.

17. A process of producing a solid paste composition for heat, the process comprising the steps of:
(i) preparing a paste dough composition having an insoluble dietary fiber content of 1.5 mass % or more in terms of wet basis, a starch content of 5.0 mass % or more in terms of wet basis, a protein content of 3.0 mass % or more in terms of wet basis, and a dry mass basis moisture content of 45 mass % or more;
(ii) kneading the paste dough composition prepared in step (i) at a temperature of from 100° C. to 200° C. with a specific mechanical energy (SME) of 550 KJ/kg or more to form a kneaded paste dough composition; and
(iii) cooling the kneaded paste dough composition to a temperature of less than 90° C. to form a cooled kneaded paste dough composition,
(vi) after step (iii), drying the cooled kneaded paste dough composition, thereby forming the solid paste composition, wherein
the kneading in step (ii) and the cooling in step (iii) are both carried out with an extruder,
a temperature difference between a maximum heating temperature during the kneading in step (ii) and a lowering temperature in step (iii) is 30° C. or more,
the paste dough composition comprises a raw material consisting of pulse, the solid paste composition has a density specific gravity of 1.0 or more, and
the solid paste composition is noodles.

\* \* \* \* \*